(12) United States Patent
Ahiska et al.

(10) Patent No.: US 9,517,410 B2
(45) Date of Patent: Dec. 13, 2016

(54) ADAPTIVE APPLICATION STREAMING IN CLOUD GAMING

(75) Inventors: Yavuz Ahiska, Esher (GB); Bartu Ahiska, Esher (GB)

(73) Assignee: Numecent Holdings, Inc., Irvine, CA (US)

( * ) Notice: Subject to any disclaimer, the term of this patent is extended or adjusted under 35 U.S.C. 154(b) by 371 days.

(21) Appl. No.: 13/458,437

(22) Filed: Apr. 27, 2012

(65) Prior Publication Data

US 2012/0283017 A1 Nov. 8, 2012

Related U.S. Application Data

(60) Provisional application No. 61/480,333, filed on Apr. 28, 2011, provisional application No. 61/505,826, filed on Jul. 8, 2011, provisional application No. 61/600,390, filed on Feb. 17, 2012, provisional application No. 61/602,069, filed on Feb. 22, 2012, provisional application No. 61/609,941, filed on Mar. 13, 2012.

(51) Int. Cl.

| A63F 13/60 | (2014.01) |
|---|---|
| G06F 9/445 | (2006.01) |
| A63F 13/355 | (2014.01) |
| A63F 13/77 | (2014.01) |
| H04L 29/06 | (2006.01) |
| A63F 13/30 | (2014.01) |
| H04L 29/08 | (2006.01) |

(52) U.S. Cl.
CPC ............. *A63F 13/355* (2014.09); *A63F 13/12* (2013.01); *A63F 13/77* (2014.09); *G06F 8/63* (2013.01); *G06F 9/44568* (2013.01); *H04L 65/105* (2013.01); *H04L 65/1069* (2013.01); *H04L 67/2852* (2013.01); *A63F 2300/538* (2013.01); *A63F 2300/552* (2013.01); *G06F 9/44521* (2013.01); *H04L 67/26* (2013.01); *H04L 67/306* (2013.01); *H04L 67/34* (2013.01)

(58) Field of Classification Search
CPC .................... A63F 2300/407; A63F 2300/534; A63F 2300/552; A63F 2300/6036; A63F 13/60; G06F 8/67
USPC ........................................................ 463/42
See application file for complete search history.

(56) References Cited

U.S. PATENT DOCUMENTS

| 5,515,098 A | 5/1996 | Carles |
|---|---|---|
| 5,796,952 A | 8/1998 | Davis et al. |
| 6,216,129 B1 | 4/2001 | Eldering |
| 6,256,637 B1 | 7/2001 | Venkatesh et al. |
| 6,362,817 B1 * | 3/2002 | Powers et al. ................ 345/419 |

(Continued)

FOREIGN PATENT DOCUMENTS

WO 0201350 1/2002

OTHER PUBLICATIONS

International Application No. PCT/IB2012/001555, International Search Report and Written Opinion mailed Apr. 4, 2013.

*Primary Examiner* — William H McCulloch, Jr.
(74) *Attorney, Agent, or Firm* — Sheppard, Mullin, Richter & Hampton LLP

(57) ABSTRACT

Methods and systems for remotely provisioning immediately executable games with license control in secure environments. Immediately initially executable portions of games are pushed onto user desktops, and when games are selected for play, additional components of selected games are streamed to said desktops.

11 Claims, 30 Drawing Sheets

(56) References Cited

U.S. PATENT DOCUMENTS

| | | | |
|---|---|---|---|
| 6,453,334 B1 | 9/2002 | Vinson et al. | |
| 6,487,723 B1 * | 11/2002 | MacInnis | A63F 13/12 348/E5.006 |
| 6,912,565 B1 * | 6/2005 | Powers et al. | 709/205 |
| 6,918,113 B2 | 7/2005 | Patel et al. | |
| 6,959,320 B2 | 10/2005 | Shah et al. | |
| 7,043,524 B2 | 5/2006 | Shah et al. | |
| 7,062,567 B2 | 6/2006 | Benitez et al. | |
| 7,096,253 B2 | 8/2006 | Vinson et al. | |
| 7,149,761 B2 | 12/2006 | Cooke et al. | |
| 7,181,523 B2 | 2/2007 | Sim | |
| 7,240,162 B2 | 7/2007 | de Vries | |
| 7,293,235 B1 * | 11/2007 | Powers et al. | 715/706 |
| 7,337,127 B1 | 2/2008 | Smith et al. | |
| 7,451,196 B1 | 11/2008 | de Vries et al. | |
| 7,465,231 B2 * | 12/2008 | Lewin et al. | 463/37 |
| 7,577,751 B2 | 8/2009 | Vinson et al. | |
| 7,689,510 B2 * | 3/2010 | Lamkin | G06F 17/30041 705/51 |
| 7,789,758 B2 | 9/2010 | Wright | |
| 8,147,339 B1 * | 4/2012 | Perry | 463/42 |
| 8,150,914 B1 * | 4/2012 | Taneja et al. | 709/203 |
| 8,166,131 B2 * | 4/2012 | Sargaison et al. | 709/217 |
| 8,261,345 B2 | 9/2012 | Hitomi et al. | |
| 8,285,646 B2 * | 10/2012 | Kinsley | G06F 21/10 705/54 |
| 8,285,740 B2 * | 10/2012 | Graham | G07F 17/32 707/769 |
| 8,335,760 B1 | 12/2012 | Kumar et al. | |
| 8,359,591 B2 | 1/2013 | de Vries et al. | |
| 8,438,298 B2 | 5/2013 | Arai et al. | |
| 8,632,409 B2 * | 1/2014 | Wolfson et al. | 463/42 |
| 8,708,828 B2 * | 4/2014 | Rowe | G07F 17/32 463/40 |
| 8,949,820 B2 * | 2/2015 | de Vries | A63F 13/95 717/161 |
| 9,054,962 B2 * | 6/2015 | Hitomi | G06F 9/468 |
| 9,054,963 B2 * | 6/2015 | Hitomi | G06F 9/468 |
| 9,072,972 B2 * | 7/2015 | Ahiska | H04L 65/105 705/59 |
| 9,083,774 B2 * | 7/2015 | Hitomi | H04L 65/105 |
| 9,218,713 B2 * | 12/2015 | Doan | G07F 17/32 |
| 9,230,395 B2 * | 1/2016 | Mattice | G06F 3/013 |
| 9,358,460 B2 * | 6/2016 | Ahiska | H04L 65/105 |
| 2001/0044339 A1 * | 11/2001 | Cordero et al. | 463/42 |
| 2002/0161908 A1 | 10/2002 | Benitez et al. | |
| 2003/0004882 A1 | 1/2003 | Holler et al. | |
| 2003/0069884 A1 | 4/2003 | Nair et al. | |
| 2004/0098706 A1 | 5/2004 | Khan et al. | |
| 2004/0230971 A1 * | 11/2004 | Rachman et al. | 717/175 |
| 2005/0114102 A1 * | 5/2005 | Gilbert et al. | 703/2 |
| 2005/0261062 A1 * | 11/2005 | Lewin et al. | 463/42 |
| 2006/0035707 A1 * | 2/2006 | Nguyen et al. | 463/29 |
| 2006/0143135 A1 | 6/2006 | Tucker et al. | |
| 2006/0143606 A1 | 6/2006 | Smith et al. | |
| 2006/0160622 A1 * | 7/2006 | Lee et al. | 463/42 |
| 2006/0161635 A1 * | 7/2006 | Lamkin | G06F 17/30041 709/217 |
| 2006/0230175 A1 | 10/2006 | de Vries | |
| 2007/0060361 A1 * | 3/2007 | Nguyen et al. | 463/42 |
| 2007/0124491 A1 | 5/2007 | Hawkins et al. | |
| 2007/0136817 A1 * | 6/2007 | Nguyen | G06F 21/10 726/26 |
| 2007/0238499 A1 | 10/2007 | Wright | |
| 2008/0192820 A1 * | 8/2008 | Brooks et al. | 375/240.02 |
| 2008/0201707 A1 | 8/2008 | Lavery et al. | |
| 2008/0234043 A1 * | 9/2008 | McCaskey et al. | 463/29 |
| 2008/0301760 A1 | 12/2008 | Lim | |
| 2009/0094600 A1 * | 4/2009 | Sargaison et al. | 717/177 |
| 2009/0118017 A1 * | 5/2009 | Perlman et al. | 463/42 |
| 2009/0119458 A1 | 5/2009 | de Vries et al. | |
| 2009/0119644 A1 | 5/2009 | de Vries et al. | |
| 2009/0325711 A1 * | 12/2009 | Bronstein et al. | 463/42 |
| 2010/0016074 A1 * | 1/2010 | Prochnow | 463/29 |
| 2010/0016081 A1 * | 1/2010 | Prochnow | 463/42 |
| 2010/0023640 A1 | 1/2010 | Vinson et al. | |
| 2010/0057833 A1 | 3/2010 | DeHaan | |
| 2010/0057890 A1 | 3/2010 | DeHaan | |
| 2010/0131355 A1 * | 5/2010 | Kitchen et al. | 705/14.43 |
| 2010/0291999 A1 * | 11/2010 | Nagatomo et al. | 463/29 |
| 2011/0029968 A1 | 2/2011 | Sanders et al. | |
| 2011/0145673 A1 | 6/2011 | Raciborski | |
| 2012/0054273 A1 | 3/2012 | Peterson et al. | |
| 2012/0096071 A1 | 4/2012 | Murphey et al. | |
| 2012/0142433 A1 | 6/2012 | Perlman et al. | |
| 2012/0149476 A1 | 6/2012 | Perlman et al. | |
| 2012/0278439 A1 | 11/2012 | Ahiska | |
| 2012/0283017 A1 * | 11/2012 | Ahiska et al. | 463/40 |
| 2012/0303778 A1 | 11/2012 | Ahiska | |
| 2012/0303955 A1 | 11/2012 | Szabo et al. | |
| 2012/0309545 A1 | 12/2012 | Perlman | |
| 2013/0324263 A1 | 12/2013 | Ahiska | |
| 2014/0162792 A1 * | 6/2014 | Nguyen et al. | 463/42 |
| 2014/0280604 A1 * | 9/2014 | Ahiska et al. | 709/205 |
| 2016/0175708 A1 * | 6/2016 | Bruno | A63F 13/12 463/42 |
| 2016/0175710 A1 * | 6/2016 | Kim | A63F 13/30 463/29 |

\* cited by examiner

| Title | Type | Status |
|---|---|---|
| Game A | Demo | Partial |
| Game B | Demo | Partial |
| Game C | Purchased | Partial + 50% Body |
| Game D | Purchased | Partial + 100% Body |

ADAPTIVE APPLICATION STREAMING IN CLOUD GAMING

CROSS-REFERENCE

Priority is claimed from U.S. Provisional Application Nos. 61/480,333, 61/505,826, 61/600,390, 61/602,069 and 61/609,941, all of which are hereby incorporated by reference.

BACKGROUND

The present application relates to methods and systems for remotely provisioning and managing immediately playable games with license control in secure environments.

Note that the points discussed below may reflect the hindsight gained from the disclosed inventions, and are not necessarily admitted to be prior art.

Conventionally, software games and other applications can be provided, maintained and recovered for Small Office/Home Office ("SOHO") environments, homes, Internet Cafes, educational establishments and other organizations in several ways, including by using physical media, download, "Disk Images", the complete contents of a device's user environment, Virtual Desktop solutions, or "Pixel Streaming", where application rendering services are offloaded to an edge server located in the cloud.

For example, when a user wishes to play a game or use another application where rendering is performed in the cloud, he is connected to an edge server, which allocates a virtual desktop for the user. The cloud-rendered image is then compressed and routed to the gaming platform or user desktop.

Currently there are a number of edge server based cloud gaming services companies, including Onlive, Gaikai Inc and Otoy.

Software-based gaming is an enormous global market. This market is driven heavily by instant gratification for the customers. The core set of players are predominantly (approximately) 12-35 year old males. Purchases are often impulsive. Flagship ("AAA") game titles are advertised months—or even years—in advance, at trade shows and in online trade publications, to build up favorable advance notices. AAA title release week sales numbers are closely watched precisely because electronic gaming, regardless of platform, is so oriented towards instant gratification and the buildup towards a must-have purchase. Just as importantly for smaller-budget (often cheaper) titles, the ability to provide gamers a true impulse purchase that can be immediately played is critical to generating word-of-mouth leading to a wider audience. Gamers are, by the quickfire, rapid-reward nature of the pastime, an impatient group with a short attention span, and the faster that software can be loaded to a playable state on a gaming device, the more likely a gamer is to still feel like playing when the game is ready. Gaming software, in this respect, is notably different from other software.

BRIEF DESCRIPTION OF THE DRAWINGS

The disclosed inventions will be described with reference to the accompanying drawings, which show important sample embodiments and which are incorporated in the specification hereof by reference, wherein:

FIG. 27 shows an example of a user's library.

DETAILED DESCRIPTION OF SAMPLE EMBODIMENTS

Figure 1:
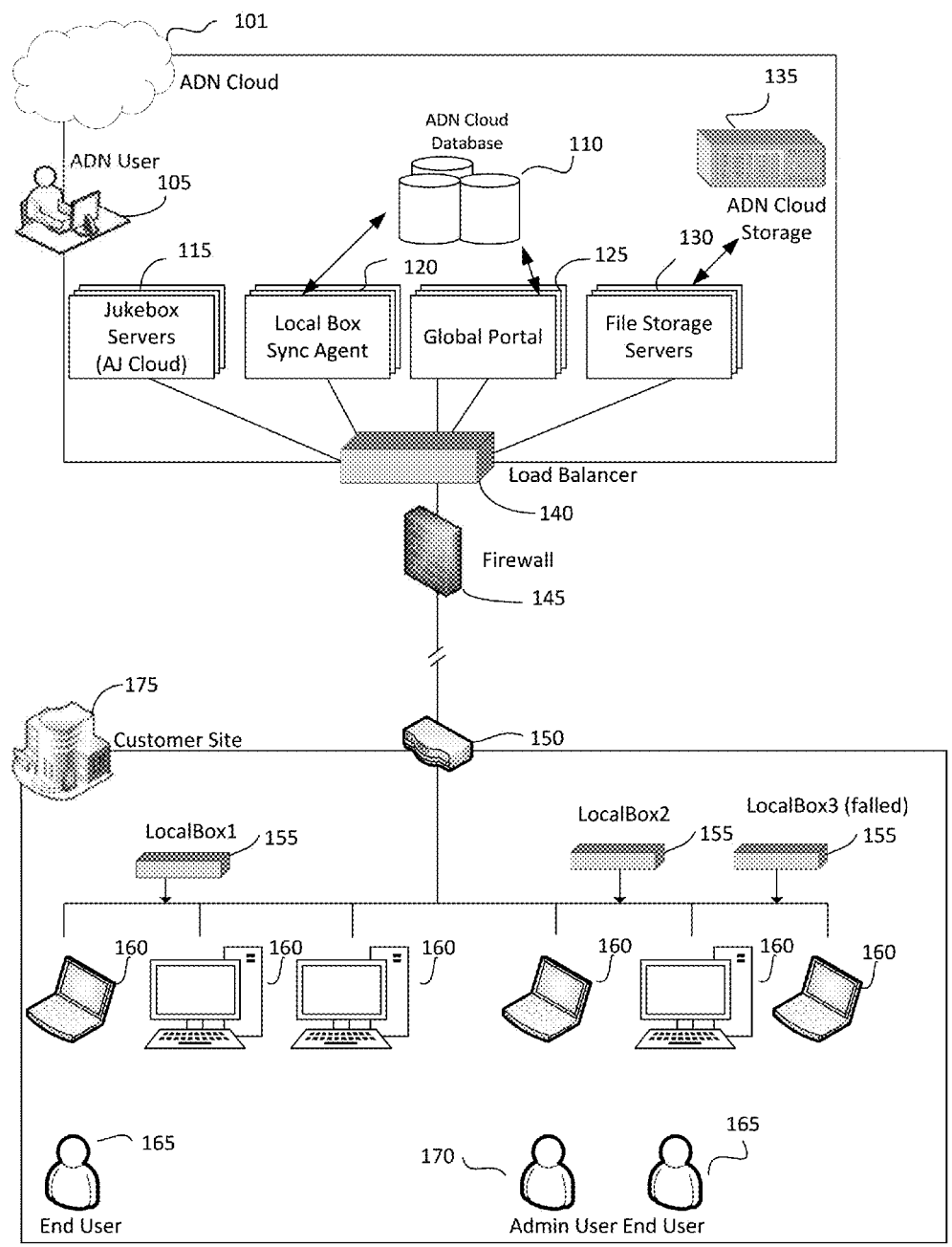
FIG. 1 shows an example of an ADN.

The numerous innovative teachings of the present application will be described with particular reference to presently preferred embodiments (by way of example, and not of limitation). The present application describes several inventions, and none of the statements below should be taken as limiting the claims generally.

Application Distribution Network

The present application discloses various inventions which, in various ways, allow one or more local boxes, under the supervision of a global box, to serve standardized virtualized applications with licenses (or without, for license-free software) to clients. There is also a robust failover system that allows clients to change provisioning from a failed local box to another local box or, if necessary, to the global controller, using license provision information synchronized between local boxes as needed to facilitate changeover. There are synergistic advantages in combining these application distribution network inventions with the innovative application-server architecture which is also described herein, but it should be noted that either of the two groups of inventions can be exploited separately to great advantage, independently of the ideas in the other group of inventions.

According to one particularly advantageous class of embodiments, an Application Distribution Network (ADN) comprises a hierarchical network with a top-level constellation of hardware and/or software serving applications and allocating licenses over a WAN to an intermediary constellation of hardware and/or software for redistribution over a LAN to interactive stations used by end users. Applications are packaged, prior to being served, to contain all of the components necessary for execution (e.g., executables, .dll's and registry keys) so that, once an application package is present on an interactive station, a "file system hook" may be used to interdict and redirect operating system calls to isolate an executing application package from other interactive station functions. Packaged applications do not require installation for execution. Consequently, deployment of new packaged applications may be performed remotely. Further, in some embodiments, digital rights management via license provisioning may be employed for intellectual property protection, and/or tamper-resistance may be facilitated by employing secure encryption.

License provision from an intermediary constellation uses a sync agent that communicates license provision status on license allocation. When hardware and/or software units allocating licenses from the intermediary constellation to interactive stations go offline, other license allocating units can continue allocating licenses because the sync agent makes them aware of the number of remaining licenses, which can be divided among the remaining online license allocating units. Application provision and license allocation can also failover to the top-level constellation under some circumstances (e.g., if all application provision and/or license allocation units in the intermediary constellation are offline).

In some embodiments, packaged applications are broken up into "pages", application portions reflecting actual code or application data used during execution of corresponding application functions. Pages are streamed to interactive stations during application provisioning.

The disclosed innovations, in various embodiments, provide one or more of at least the following advantages. However, not all of these advantages result from every one of the innovations disclosed, and this list of advantages does not limit the various claimed inventions.

enables provisioning applications on demand from a vastly expanded library to a target device;
enables provisioning applications on demand with any combination of plug-ins;
enables organizations to purchase, rent or subscribe to software for its members, and to internally time share licenses;
inventive systems and methods can be fully implemented using relatively limited infrastructure investment;
application availability does not rely on a user or an end-user hardware manager (e.g., business organization) knowing ahead of time what software will be desired or required on which target device;
embodiments utilizing virtualization do not require installation;
does not require physical acquisition of software media;
enables friction-free deployment, management and recovery of a wide range of automatically updated applications with reduced IT support overhead;
enables portable user environments that be loaded on any target device that can access the cloud, and that can quickly reach an executable state for a broad array of applications within a portable user environment;
enables broad deployment of portable environments and/or software suites within an organization;
robust failover ensures consistent and reliable application source availability;
enables local access to on-demand cloud-delivered applications, while allowing data to be stored locally or in the cloud;
embodiments with license control enable generalized distribution of centrally packaged virtualized applications with targeted licensing; and
provides a secure environment that is resistant against DRM hacking.

The advent of cloud-based computing architectures has opened new possibilities for the rapid and scalable distribution and deployment of applications on end user target devices. A target device may be, for example, a PC, minicomputer, mainframe computer, console, set top box, smart TV, tablet, smart phone, smart vehicle environment (such as a car), programmable consumer electronics, distributed computing environment where tasks are performed by remote processing devices that are linked through a communications network.

Application Virtualization

Application virtualization improves portability, manageability, copy protection and compatibility of applications by encapsulating them from the underlying operating system on which they are executed. It enables applications to be seamlessly and remotely deployed and maintained. A fully virtualized application does not need to be installed to be executed. The application is fooled at runtime into believing that it is directly interfacing with the original operating system and the resources managed by it, when in reality it may not be.

As described in U.S. Pat. No. 7,451,196, applications can be virtualized by providing a file system overlay on a target device by configuring a file system hook operatively interposed between a file system manager and a file system driver of the target device. The file system hook is configured to detect a file system call corresponding to a target application and invoking one or more procedures. An agent procedure also executes on the target device to configure the file system hook for executing the target application. The one or more invoked procedures may include, for example, accessing data at a server terminal operatively coupled to the target device via a data network (such as the Internet) or at a locally connected computer readable storage medium.

The file system hook interdicts file system calls (and may do so selectively), thus sandboxing virtualized applications. Virtualized applications run at near native speed within the sandbox.

Virtualization enables enforcement of secure digital rights management ("DRM"). Virtualized software can be stored in encrypted form, but (generally) is decrypted at runtime. By isolating executing virtualized software from the operating system, other programs—such as potentially conflicting programs, malicious programs (malware) or programs designed to capture decrypted, executing virtualized software—can be prevented from accessing executing virtualized content.

A security process executing on a target device can regulate access of file resources by the file system hook using a property unique to a particular executing virtualized software. This is one way in which file resources may be invisible to processes executing on the target device other than the file system hook and the executing virtualized software.

Application Streaming

Application streaming is a software distribution methodology designed to accelerate software distribution by delivering only currently-required program data to a target device. Users can execute software on a target device without a complete version of the software already present on the device. Effectively, executable portions of the application are buffered 'on demand'.

Paging

As described in U.S. Pat. No. 7,062,567, application streaming may be achieved using a system that partitions an application program into "page segments" or "pages" (also sometimes referred to as chunks or blocks). Pages may be formed by observing the manner in which the application program is conventionally installed and executed.

Pages are arbitrarily sized portions of a streamable application and may consist of, for example, one or more software instructions, a portion of multimedia data, a portion of a game engine, one or more portions of one or more application files or registry entries, or any combination thereof. Pages may be fixed or variable in size. For example, highly correlated portions of an application may be grouped together into larger pages. Generally, any application can be delivered in page form (e.g., via application streaming); however, some applications may require a larger portion of their corresponding software to be present on a target device at runtime than others.

Many applications only use a limited set of the instructions and data that comprise their total memory footprint for any given set of tasks or events within the application. One way of forming page segments is to associate tasks or events within an application with the corresponding instructions and data that are used to execute them.

Pages may be formed manually, or using automated utilities, or in a hybrid manner.

Streaming Definitions

"Pagefeeding" is defined herein as delivery of pages by an application source to a target device using streaming.

"Streaming" is defined herein as delivery of portions, such as pages, of an application during execution of the streaming application.

An "application source" or "appfeeder" is defined herein as storage and corresponding physical or logical controls that can act as a source for delivery of an application to a target device. An application source for an application may comprise one or many memories or other forms of software repository, localized or distributed, that can be controlled to result in download of the given application to the target device.

A "pagefeeder" is defined herein as one or more application sources that, together, are capable of pagefeeding to a target device. A pagefeeder may include application sources that, by themselves, cannot perform pagefeeding. In the context of gaming, a "pagefeeder" may also be called a "game streamer". Some appfeeders may be able to act as pagefeeders. "Streaming" is just one type of downloading.

Partials

In practice, only a partial "seed" portion of an application ("Partial") may be required to launch and provide at least initial functionality of an application on a target device. A Partial may comprise, for example, either directly or as page segments, portions or all of a minimum set of files, directory information, registry entries, environmental variable changes, or some combination thereof required for launching the application. A Partial may include an application's executable and DLLs that are necessary for execution. In some cases, a Partial may comprise an initial execution environment of an application. A Partial typically comprises 5-10% of a complete application package. The contents and size of a Partial may be adjusted depending, for example, on the total size of the application and the application functions intended to be made initially available.

In a preferred embodiment, a Partial includes a corresponding application's frequently accessed page segments. A Partial for a game may, for example, comprise a set of page segments that correspond to the introduction video, menus, game engine and first tutorial level of the game. Generally, it is advantageous for a Partial to be a minimum partial portion of the game or other application package required to get the game or application 'up and going' immediately on a target device.

An example of a Partial of a game is a set of pages that correspond to the introduction video, menus, game engine and first tutorial level of a computer game. Using Partials, the 'time-to-play' of corresponding games can be substantially reduced in comparison to conventional full game downloads. In some embodiments, a Partial is downloaded to a target device, enabling the user to begin executing the corresponding application before the Body has been delivered. Assuming that a Partial corresponds to 10% of the size of a typical game installer, the 'time-to-play' may by reduced by over 90% by not having to wait for the Body to be delivered before launch, Time savings may also accrue due to use of installation-free virtualized applications.

In a preferred embodiment, a target device's persistent cache is populated with one or more Partials. These Partials are integrated into the target device's local library of applications to provide a seamless selection of applications to the end user. As the target device contains at least Partials (or greater) of the library applications, the user can instantly launch any one or more applications in the local library without any delays associated with delivery of additional software. This means that (assuming Partials comprising about 10% each of their corresponding applications) a target device with 8 Gb of allocated memory can behave like an 80 Gb target device.

In a preferred embodiment, Partials on a target device are kept in an encrypted state at all times until just before execution.

In some embodiments, a Partial of a target application to be run on a target device is created by executing the target application until a predefined point, such as the completion of the first level in a computer game, and recording all page requests performed by the target device.

In some embodiments, Partial creation is performed by utilizing the same tools used to package the target application, such as Application Jukebox.

In some embodiments, a Partial is delivered by downloading pages of an application until an executable threshold is reached, at which point the Partial may optionally be launched automatically.

In some embodiments, an application is automatically launched on a target device once a corresponding Partial is delivered to the target device.

By using Partials to provide immediate application execution, bandwidth requirements can be lessened and time-shifted. The remainder of an application ("Body") can be delivered during execution of the content within the Partial. As a result, application streaming can be effective even where bandwidth and quality of communications service are compromised. Also, by delivering the Body in pages, additional application features can be made available while the application is already running.

The Body or entirety of an application can be delivered by, for example, downloading, demand paging, using a predictive engine in the cloud server to predictively stream required portions of the application based on recent requests and learned behavior from previous usage patterns, by using a predictive engine on the target device to make requests to the cloud server based on required portions of the application as predicted using current status, and/or by using any concurrent or serial combination of these methods.

Virtualizing Applications

Applications may be prepared for rapid virtualization by packaging them in a pre-virtualized form. Application Jukebox is a popular tool that enables applications to be virtualized and broken into pages via a packaging process that does not require that the application be recompiled or recoded. Application Jukebox performs the packaging process through semi-automatic studio software.

As described in U.S. patent application Ser. No. 12/509,210, application packaging may be performed by installing the target application on a clean physical or virtual computer system on which relevant files and operating system parameters are known. For example, on a Windows 95-type system, application packaging can be performed where the contents of the registry are known, and files prior to the installation of the target application are known. By knowing the state of the machine before the installation of the target application, changes made to the install computer system caused by the installation of the target application on the install computer system can be determined.

It may sometimes be required to run the target application on the install computer system so that any final installation steps needed by the target application can be determined. This need may be determined manually on a case-by-case basis, or automatically using an appropriately configured utility, or semi-automatically using a combination of a utility and manual work.

The target application may be preprocessed. A preprocessing phase may include generating an index containing information of registry changes, files, and directories created by the installation of the target application; breaking up the target application into page segments (which may be encrypted and/or compressed); and placing the target application on an application sourcing server.

Implementing Application Streaming

In demand-based application paging ("demand paging"), a paged application may begin execution with a subset of its pages on a target device. Pages are chosen for delivery to the target device (or not) when an attempt is made to access them (e.g., if an accessed page is not present and a page fault occurs).

Application streaming from the cloud using demand paging is also known as 'Cloudpaging'.

Unlike linear multimedia content, such as music and video, games and other applications generally execute non-linearly. As a result, it is advantageous for application streaming to respond to how a user utilizes an application.

Figure 2:
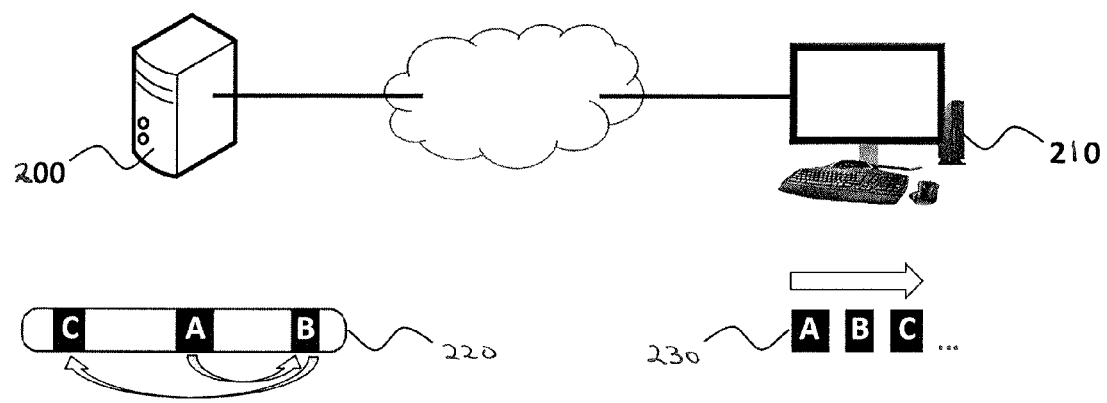
FIG. 2 shows an example of delivery of non-linear content.

FIG. 2 illustrates an example of delivery of non-linear content from a cloud server (200) to a PC (210) over a data network in accordance with some embodiments. The application to be delivered (220) resides in the cloud. After the target device (200), in this case a PC, has received a Partial via a download, it begins execution of the application. Over time, the target device (210) may require specific additional page segments (230) to be sent from the cloud to continue executing the program. In practice, these additional page segments may not be linearly adjacent to one another in the original cloud hosted application (220). In an inventive aspect, blocks are streamed from the cloud server (200) in the order in which they are requested (230) from the target device (210).

Figure 3:
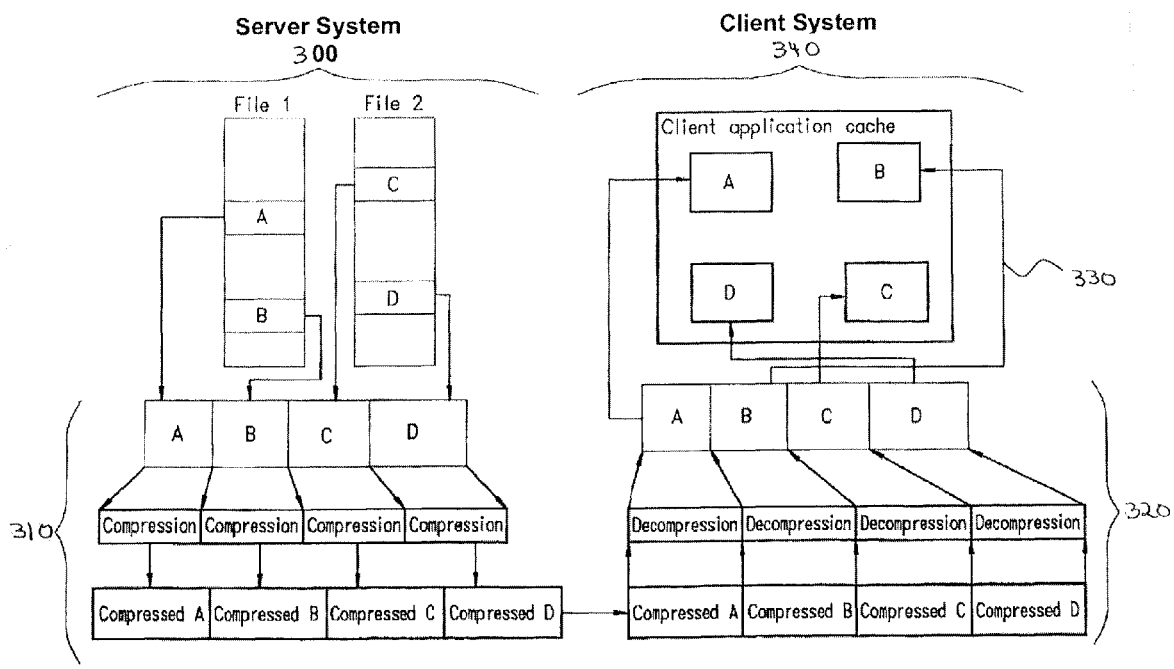
FIG. 3 shows an example of delivery of non-linear content

FIG. 3 shows an example of delivery of non-linear content using compression. Specific page segments from files resident on a server are put in order for delivery and compressed, sent to a client system, decompressed, and placed into a client application cache for execution. Page segments may be compressed individually, or a set of pages may be compressed as a unit.

In prediction-based paging ("predictive paging"), a paged application may begin execution with a subset of its pages on a target device. Pages are chosen for delivery to the target device (or not) when a predictive engine predicts that an attempt to access then is likely imminent. In this manner, pages may be delivered to the target device in advance of when they are needed. It is particularly advantageous to deliver pages indicated by a predictive engine when attempted execution of the indicated pages will cause a page fault.

Various methods of choosing pages for delivery may be effective. For example, in response to a page access attempt or predicted required page, the particular page required may be delivered; or a set of pages corresponding to one or more functions that use the required page may be delivered; or all pages in the application not currently resident on the target device may be delivered when one non-resident page is required.

With respect to delivery of pages corresponding to particular functions, for example, if a user is currently playing a game through the end of a first level, and a page from a second level is required (by demand or prediction), it may be advantageous to choose to deliver all pages that may be used during play of the second level. Gameplay approaching a third level may produce a similar result with respect to pages from the third level.

In some embodiments, the Body or entirety of an application is predictively streamed from the cloud server, in part or in entirety, by receiving a request for a first page segment of a streaming application, checking a page segment request database, predicting a second page segment request based on the page segment request database, and sending, in response to the request, data associated with the first page segment and data associated with the second page segment. In an embodiment, the page segment request database includes probabilities or means for determining probabilities that a second page segment will be requested given that the first page segment has been requested. In another embodiment, the technique further includes piggybacking the data associated with the second page segment on a reply to the request for the first page segment.

Various embodiments can use demand paging, predictive paging, or both.

Generally, it is advantageous for pages to be streamed by an application source to a target device in a prioritized manner so that pages corresponding to particular functions of the application are delivered approximately contemporaneously compared to pages corresponding to other functions of the application.

In some embodiments, application streaming operates on the principle of allowing streamed executing applications to have access to their dependent resources through a transient memory space or buffer ('cache'). In memory-limited devices, buffered data ideally comprises the minimum resource necessary to perform a selected task, thus minimizing required cache size. In battery-limited devices, it may be desirable to use a larger cache size to avoid potentially excessive streaming-related network communication.

In application streaming, the cache may contain much more than a sequential file resource. Depending on the application, the cache can include, for example, some combination of data files, program code and a configuration database required for an application to execute.

Once a minimal portion of the application program is delivered on the target device, the user can launch the application program as if a complete version of the application were present in the target device's local memory. From the point of view of the target device's operating system and from the point of view of the application itself, that application appears to be located wholly locally on the target device.

A pagefeeder streams pages to the target device over a network as the application executes on the target device. The target device stores the pages in a cache. Pages are requested by the target device from the pagefeeder whenever a page fault occurs from the cache on behalf of the application. The target device prefetches one or more pages from the pagefeeder, or the pagefeeder streams one or more additional pages to the target device based on the pattern of page requests for that particular application.

Generally, if pages are compressed by the pagefeeder before transmission to the target device, the target device will decompress the pages to retrieve the original contents.

Portals and Application Distribution

An 'Application Distribution Network' (ADN) comprises systems and methods used to deliver and manage applications.

An 'ADN cloud' is the online presence of an ADN for provisioning applications and data from the cloud. An ADN cloud can consist of, for example, a global portal, application delivery servers, as well as other online systems such as databases or network file storage devices or systems.

In some inventive embodiments, an ADN comprises a number of cloud-based services (ADN cloud) provided over a Wide Area Network (WAN) to one or more network-attached local devices (local boxes). These local boxes handle the provisioning of a wide range of applications over a Local Area Network (LAN) to end users within an organization. With the aid of such an ADN, organizations with little or no IT expertise can have access to a quick, minimal setup solution for obtaining, provisioning and distributing software applications to users within the organization with reduced time and cost overheads.

The ADN Cloud is part of the resilience of the ADN and, advantageously, is capable of meeting highly variable demand. If a large organization suddenly finds that its local box is not operating, then its entire user base could be immediately switched to obtaining applications from the ADN Cloud. It is advantageous for the system on which the ADN Cloud is built to be capable of coping with such changes in demand.

There are a number of possible solutions that could provide the hosting platform for the ADN Cloud. For example: Elastic Compute Cloud (EC2) from Amazon, App Engine Service from Google, and Windows Azure service from Microsoft.

Some embodiments utilize two types of web management portals: 'local portals' and 'global portals'.

A 'local portal' is a management portal residing on one or more local boxes. A local portal may be used by admin users to conduct management tasks, such as management of applications, licensing, user accounts and provisioning for an organization or other networked group. In a preferred embodiment, a local portal can also act as an access point for end users to access their applications on a day-to-day basis. As there may be more than one local box within an organization, there may also be more than one local portal. Each one will be synchronized with other local boxes so that users can use local portals interchangeably. As a result, they will see the same information no matter which local portal they use as their access point.

A 'global portal' is a cloud based management portal. It can be used mainly by ADN users to view and manage data relating to customers, such as available applications, licenses, upgrades and patches. A global portal will also store data from local portals as a backup for the local instances, and serve as an access point for end users when their local portal is unavailable. Advantageously, a global portal resides within the ADN cloud, holds the data for various organizations (as synchronized from their respective local portals) and acts as a failover access point should an organization not have access to its respective local portals. A global portal can also act as a point of access for ADN users wishing to look up customer information, usage statistics or high level reports.

An 'application delivery server' is a system that delivers an application delivery service. In a preferred embodiment, an application delivery server is an Application Jukebox streaming server. It can be hosted within the ADN cloud ("AJ cloud") or within a local box ("AJ local").

User Types

In some preferred embodiments, three types of user may be defined: 'end users', 'admin users' and 'ADN users'.

An 'end user' is any user that benefits from delivered applications on a target device. In a preferred embodiment, an end user can be an employee or member of an organization. This is the user that will access their applications through the ADN on a day-to-day basis.

An 'admin user' is a user that manages one or more local portals. In a preferred embodiment, an admin user may be a member of staff within an organization responsible for software deployment. This will typically be a user in an IT role, and may be the person that ordered the local box and configured the service for their organization.

An 'ADN user' (or ADN cloud user) is a user who manages an ADN cloud. In a preferred embodiment, an ADN user may be a member of the ADN cloud facility staff who is, for example, but not limited to, responsible for customer management, order processing, system monitoring, business strategy, or business management.

Local Boxes

A 'local box' locally provisions applications over a network such as an organization's LAN. A local box provisions applications by hosting a local version of the ADN cloud service. A local box can include, for example, application delivery servers, a web management local portal, and stored applications.

In some preferred embodiments, a local box is the device that end users initially connect to in order to gain access to applications. A local box can act in such capacity as a local point of contact for target devices in an ADN, providing a portion or all of the services that are available within the global ADN at speeds that would be expected from a local device connected on a LAN.

In some preferred embodiments, a local box's main purpose is to handle provisioning of applications to end-user target devices within an organization's LAN on a day-to-day basis. A local box can be, for example, a relatively small network-attached device (e.g., a PC), network server, workstation, Network-Attached Storage (NAS) drive, or other network-connected computer-readable storage device. More specific examples of a local box in a compact form include a Windows Server-based NAS device such as the Acer Aspire easyStore H340, and Linux-based devices such as the Netgear ReadyNAS.

In some preferred embodiments, a synchronization agent ("sync agent") is used to transfer data between the global portal and a local portal. During normal operation, this synchronization ensures that information for a particular organization (such as application, license, user and configuration information) is present and accurate across local boxes and/or the ADN cloud. In some embodiments, when a new local box is added to an organization, or an existing local box is reset following a failure, the sync agent downloads existing shared data for that organization from the global portal to the new local box. In some embodiments, the sync agent is also used to manage communication between local boxes within an organization.

In some embodiments, a sync agent is resident on each of one or more local boxes.

In some embodiments, the sync agent informs other local boxes within a local network when a local box serves a license for an application.

In some embodiments, local boxes poll the sync agent for license availability before serving a license.

In some embodiments, local boxes inform the sync agent after they serve the license.

By providing up-to-date information on license availability, the sync agent enables continued license provision availability within a local network when a local box ceases to provide effective ADN service (failover).

Sync Agent

Advantageously, an ADN can be configured so that, when communications with one or more local boxes in an organization fail, remaining local boxes continue to be able to provision applications and licenses to target devices within the local network. To do so, local boxes should store properties and usage information of licenses and applications, as well as pertinent information about the organization. License information can include, for example, the number of licenses owned and for which applications, license details, and total and remaining license duration. Application information can include, for example, applications available, application version numbers and patch details, and hardware and software system requirements to execute respective applications. Organizational information can include, for example, administrator identity and credential details, network security, network topology and current network location. Network location can be used for, for example, geographic restrictions on licenses, which may only permit software consumption in particular networks or countries. License, application, and organizational information can be kept accurate and up to date across local boxes and the ADN cloud using a sync agent.

Advantageously, for a sync agent using SOAP/XML based API calls, when a change (alteration, addition or deletion) is made on a local box or within the ADN cloud to the properties of an entity (an application or license or the organization itself) within an organization's ADN, the changed information is pushed ("synchronized") to each of the organization's application sources (including the ADN cloud). Once a response is received from each of the organization's application source confirming that the change has been made, the changed information is considered updated, and can be marked as such in a change log or other record. If an application fails to respond, it is considered "offline" by still-connected application sources of the organization, and a message is queued in the device that initiated the change to notify the offline application source (on reconnection) of the changed information.

When a local box attempts to revert to a "connected" state (remove its offline status) or is newly installed, it negotiates with one or more other application sources within the organization's ADN to determine whether there are information change messages queued or other waiting information changes. Once the connecting local box has received all waiting information changes, it can register itself with the organization's information sources as connected and return to information change synchronization as described above.

The ADN cloud can be made available to local boxes as a source from which reconnecting local boxes can obtain outstanding information changes. Generally, however, local boxes that are known to be in sync with the ADN cloud will be able to provide information changes more quickly within the corresponding local network and without augmenting external data traffic to the ADN cloud.

In some embodiments, local boxes can occasionally broadcast a checksum of all or parts of synchronized information (or broadcast parts or an entirety of the synchronized information itself) to other local boxes in a corresponding organization's ADN in order to ensure that the synchronized information is up-to-date and accurate. If a record is out of sync, then a conflict resolution scheme can be used, such as keeping the most recently modified record, keeping the most substantially modified record, or merging conflicting records.

Local Box Deployment

An organization can obtain a new local box by (for example) purchasing a network-attached storage (NAS) device and downloading an add-on or plugin from a global portal that can be installed on that device and that encompasses ADN services. The add-on module can make use of a manufacturer's SDKs for the storage device to incorporate ADN services into the normal device functionality.

Alternatively, ADN services can be included in a base image for a device by the manufacturer so that the device is delivered to the organization in a pre-configured state.

In some preferred embodiments, when an organization first installs a new local box and connects it to and accesses it on their network, the organization is presented with a set-up wizard. The wizard guides admin users through the process of configuring the local box. The wizard can require, for example, information necessary for end users to begin using the local box service, such as which applications should be used and how many licenses are available. This process can require admin users to identify themselves and their respective organizations so that the system can retrieve any information they have previously provided, saving them from having to repeat configuration steps.

ADN Cloud Implementation

Figure 4A:
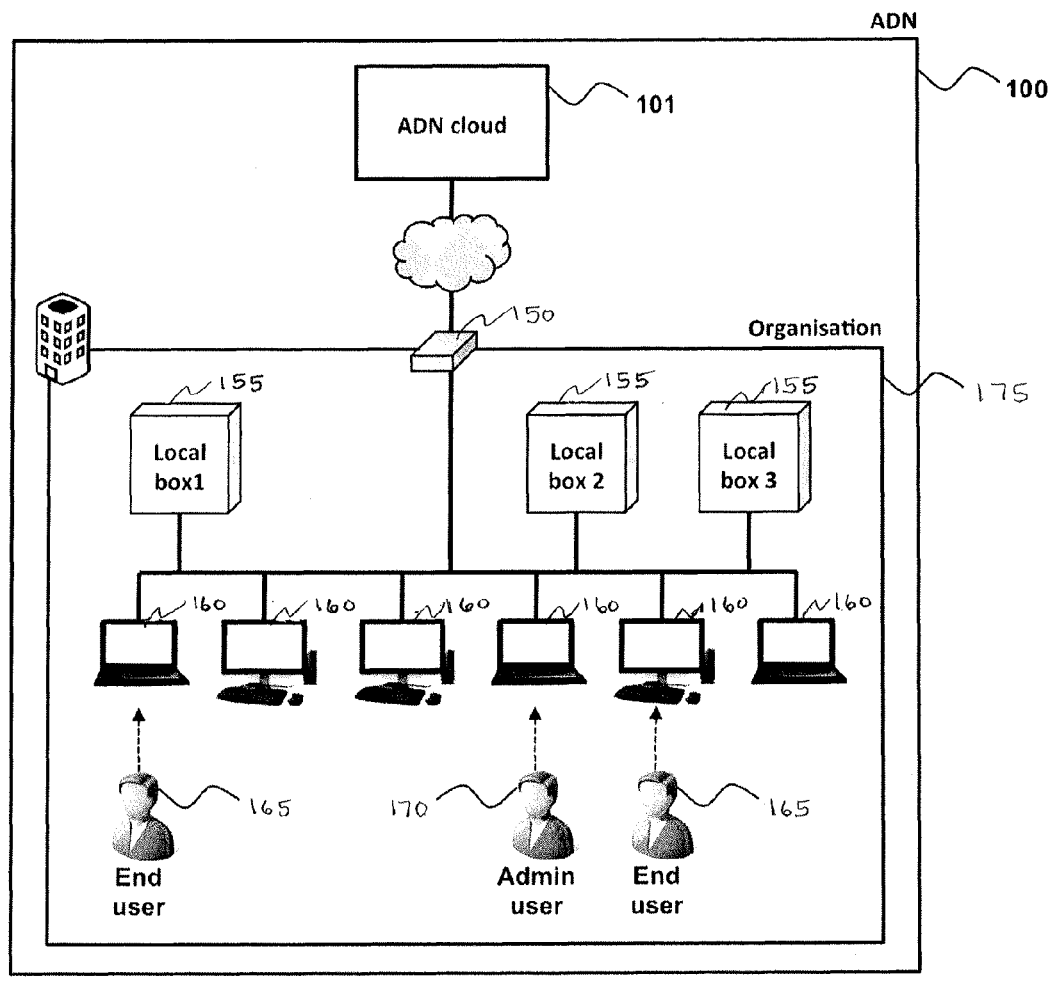
FIG. 4A shows an example of an ADN.

FIG. 4A shows an example of an ADN 100, comprising an ADN cloud 101 that is connected over a WAN to an organization's LAN 175 via the organization's router 150. The LAN comprises connected local boxes 155 and target devices 160.

Figure 4B:
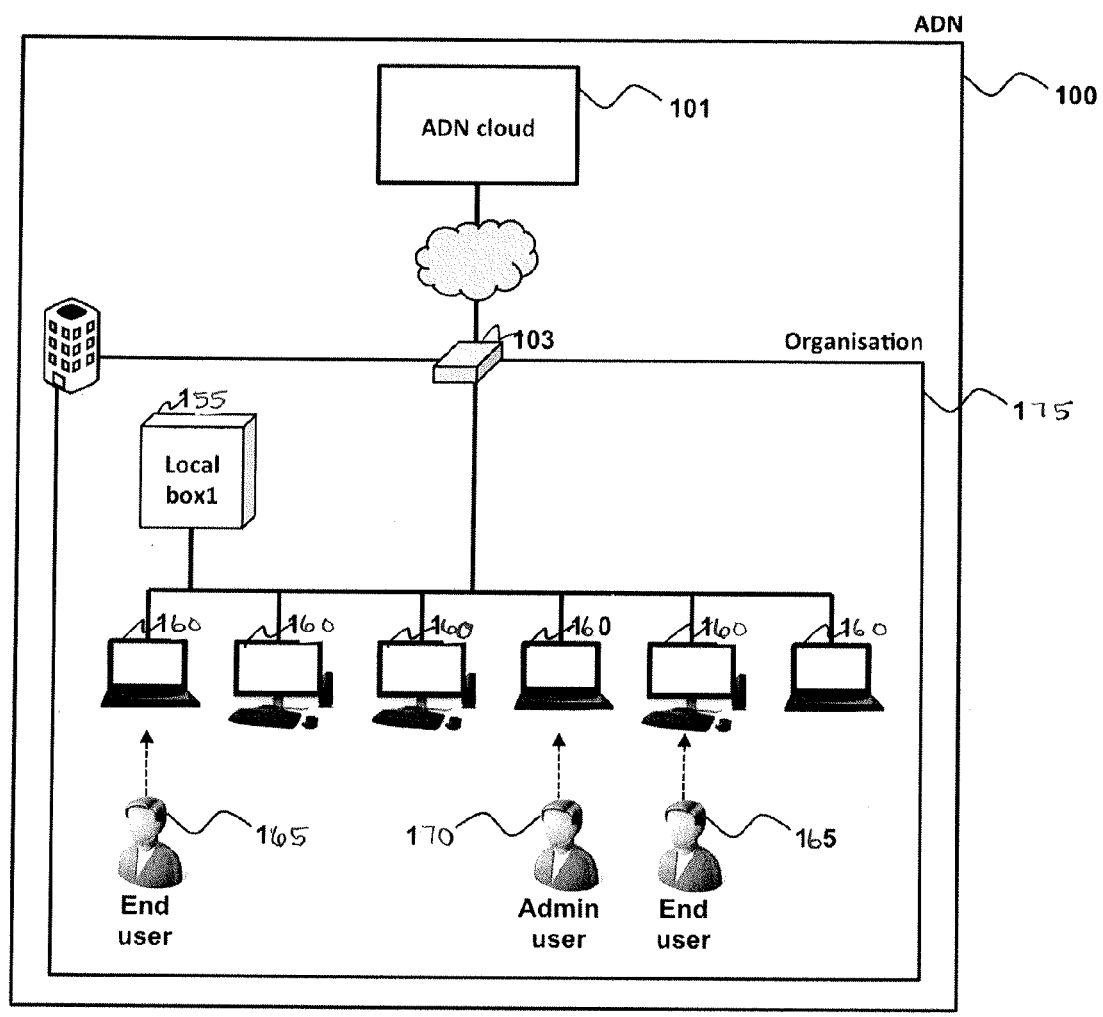
FIG. 4B shows an example of an ADN.

FIG. 4B shows an example of an ADN 100 with an organization with a simple infrastructure comprising one local box 155.

Figure 4C:
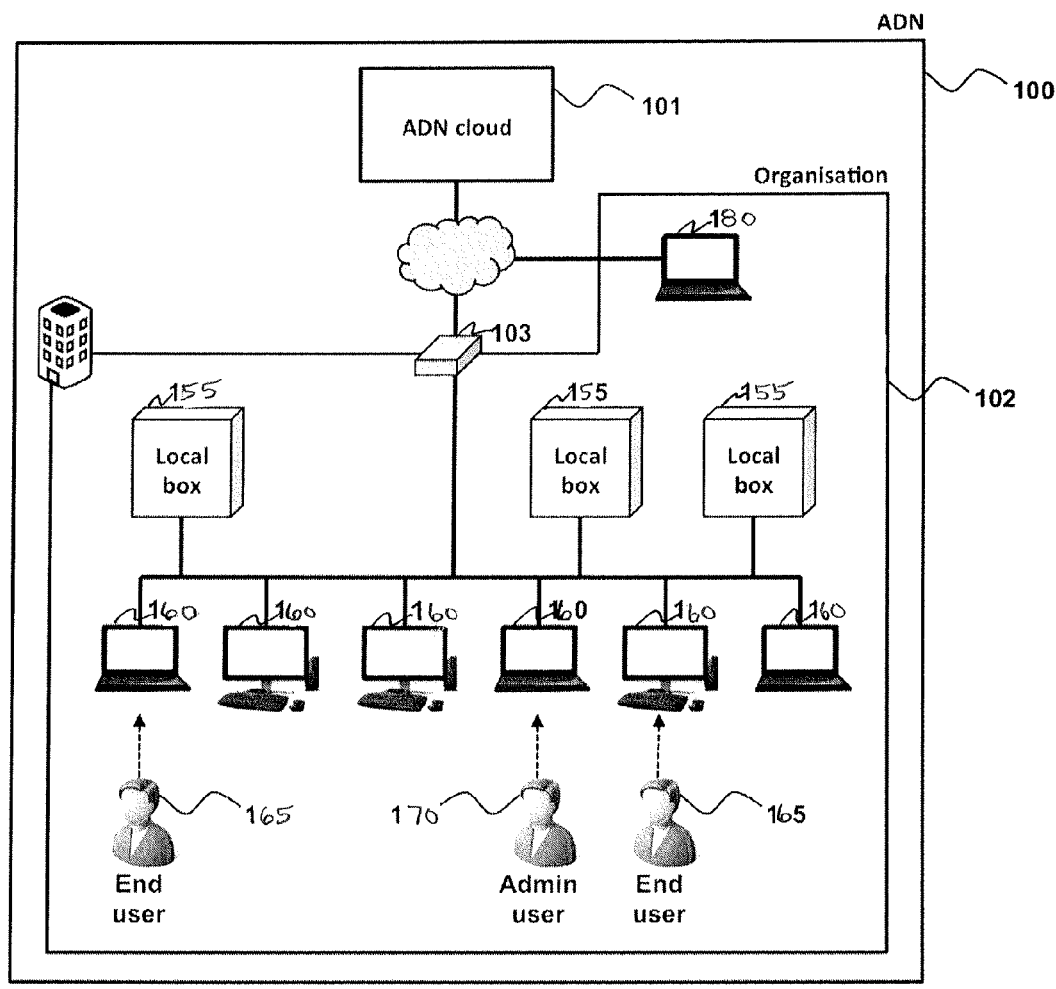
FIG. 4C shows an example of an ADN.

FIG. 4C shows an example of an ADN 100 in which one target device 165 is remotely connected to an organization's local network through a Virtual Private Network (VPN).

In some preferred embodiments, it is advantageous for application software and data to be delivered to target devices 160 from local boxes 155 or the ADN cloud 101 by using cloudpaging, or streaming and virtualization. Cloudpaging can be implemented using Application Jukebox. Delivering applications in this way allows an end user to access their applications from any target device on their network without the need for installing the applications on every target device.

Figure 5:
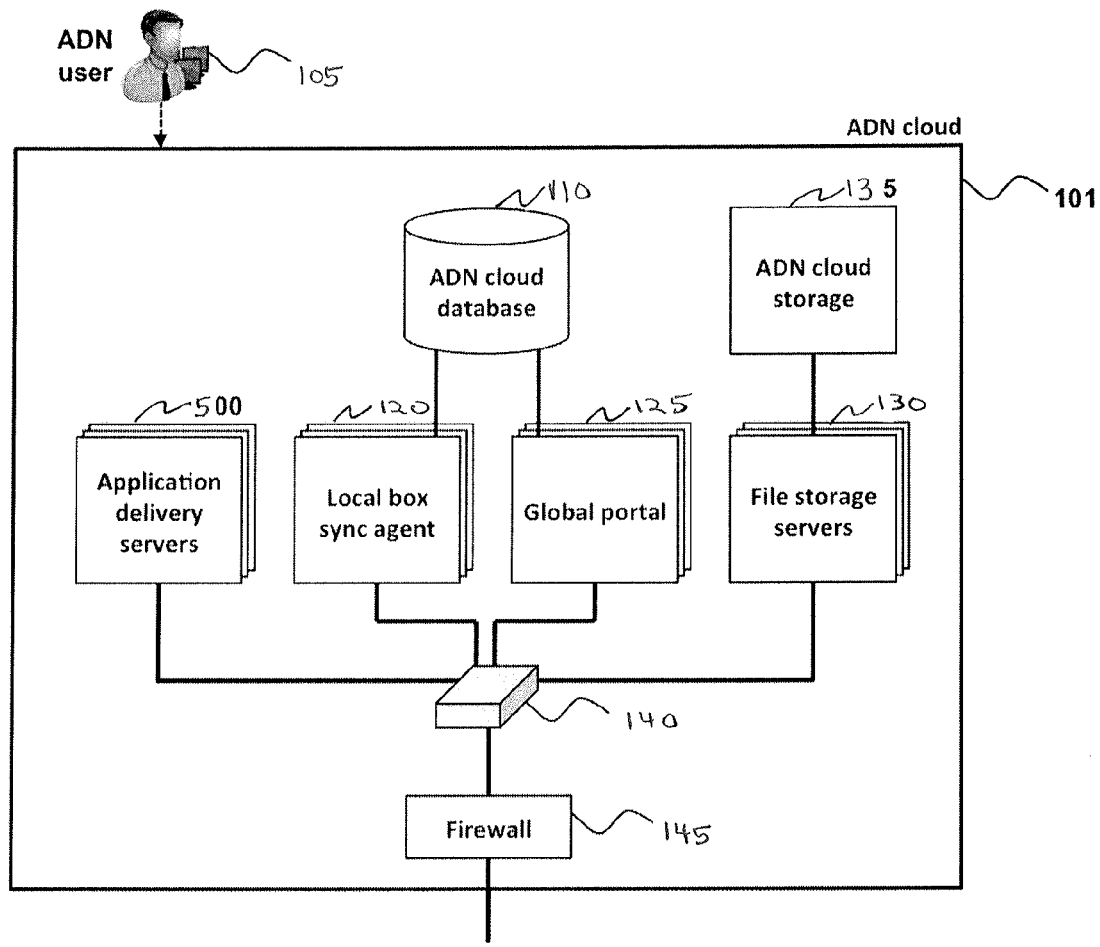
FIG. 5 shows an example of an ADN cloud.

FIG. 5 shows an example of an ADN cloud 101, comprising one or more application delivery server(s) 500, local box sync agent(s) 120, global portal(s) 125, file storage server(s) 130, ADN cloud database 110, ADN cloud storage 135, load balancer 140, and a firewall 145, in accordance with some preferred embodiments.

Figure 6:
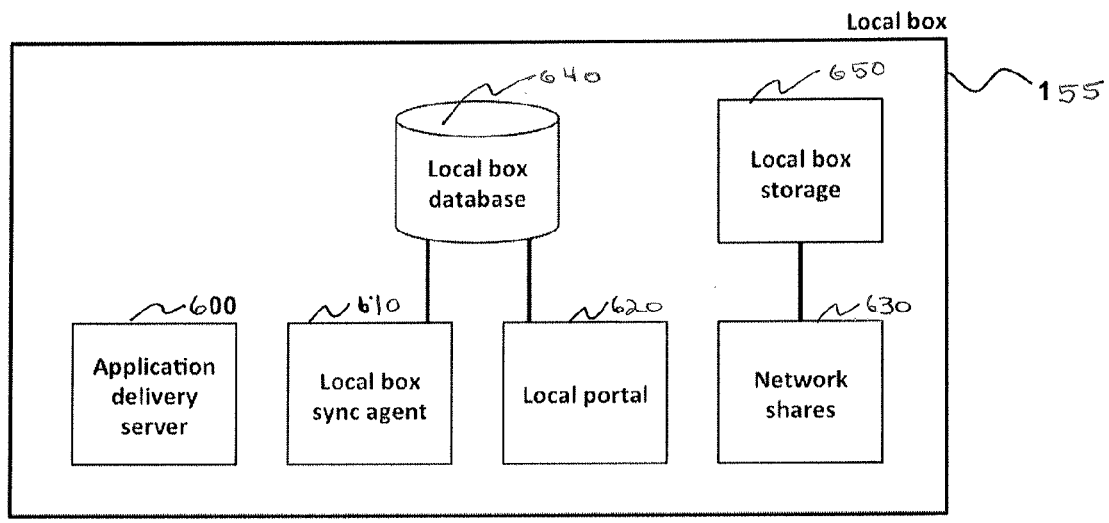
FIG. 6A shows an example of an ADN cloud.
FIG. 6B shows an example of a local box.
Figure 6:
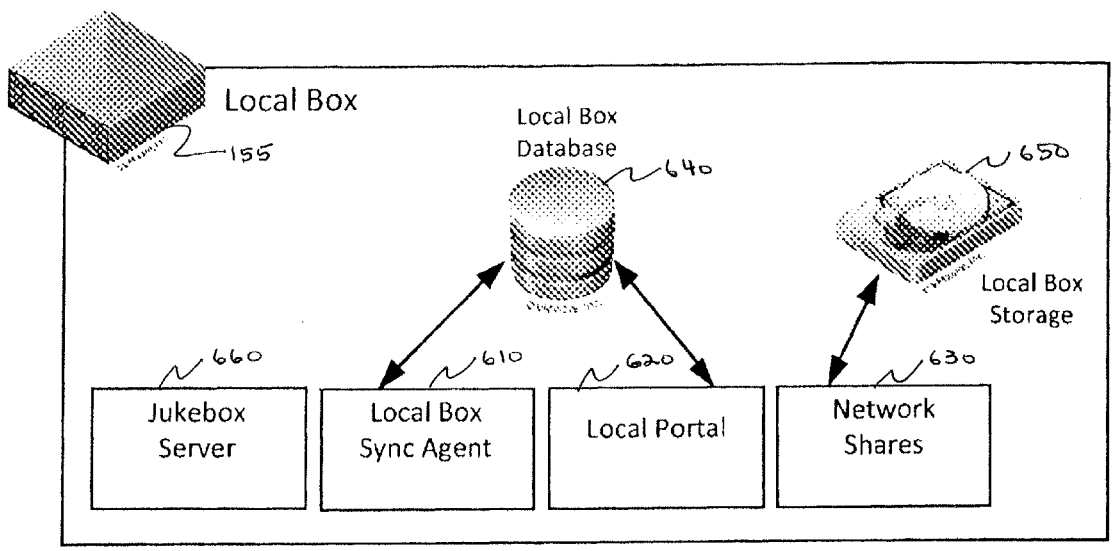

FIG. 6A shows an example of a local box 155, comprising an application delivery server 600, a local box sync agent 610 (used to sync data with a global portal), a local portal 620, network shares 630, a local box database 640, and local box storage 650.

FIG. 6B shows an example of a local box 155, comprising an application delivery server 600, a local box sync agent 610 (used to sync data with a global portal), a local portal 620, network shares 630, a local box database 640, and local box storage 650.

FIG. 1 shows an example of an ADN. The ADN comprises an ADN cloud 101, which comprises one or more application delivery server(s) 600, local box sync agent(s) 610, global portal(s) 125, file storage server(s) 130, ADN cloud database 110, ADN cloud storage 135, load balancer 140, and a firewall 145. The ADN further comprises at least one connection of the ADN cloud over a WAN to an organization's LAN 175 via the organization's router 150. The LAN comprises connected local boxes 155 and target devices 160.

In some preferred embodiments, the ADN cloud makes available to organizations a repository of centrally packaged applications that can be distributed to end users. During initial set-up or day-to-day management of their local box (or boxes), admin users can select applications from the central repository that they wish to be loaded onto their local box for provisioning to end users.

Packaging is the "cloudification" of an application. Advantageously, it is performed once, and then the package can be streamed in parts to a target device. On the target device, the stream is cached, then virtualized (using the "file system hook"), then becomes executable.

In some embodiments, organizations have access to the full complement of applications provided through the ADN cloud. There may also be specialized provisioning of applications, such as to particular organizations or organization types.

ADN Networks

An ADN local network comprises one or more local boxes and one or more local portals, along with corresponding resources for providing related functions, as well as one or more target devices and/or end users, and can include one or more sync agents.

In some embodiments, an ADN local network may be separated from the network(s) and other resources comprising the ADN cloud, by, for example, differences in bandwidth; one network (e.g., the network containing the ADN cloud) can be a WAN, while the other network (e.g., the local network) can be a LAN; one or more firewalls or other security measures between the two networks (or sets of networks); one or more gateway servers; or the local network can use an aliased IP address space or other address space logically distinguishable from that used by the ADN cloud.

A "local network", depending on context, refers either to a network (or networks) containing resources re-serving applications and licenses provided by an ADN cloud; or to both the network and the re-serving resources.

Security may require restricting target devices from communications beyond a corresponding local network.

In some embodiments, target devices can communicate with an ADN cloud only on failover.

In some embodiments, target devices cannot communicate directly with an ADN cloud.

Selecting Application Sources

In some embodiments, an end user can obtain an application from any of the application sources, including the local boxes 155 or the ADN cloud 101, depending on which is considered most suitable. Suitability can be measured by a weighting, calculated using, for example, availability of application sources, ping time to application sources, current load of application sources, contents of respective application libraries of application sources, and compatibility of application sources with a user's target device.

In some preferred embodiments, suitability of application sources is measured when an application is launched.

In some embodiments, the source for provisioning of an application may change dynamically during runtime (or otherwise during provisioning), and the suitability of application sources can be determined periodically, continuously or at predefined or otherwise various points during provisioning.

For example, end users 165 in FIG. 4A could both be obtaining their applications from local box 155. In another scenario, both end users 165 could be obtaining their applications from local box 155. In another scenario, end user 165 could be obtaining their applications from local box 155, and end user 165 from local box 155.

Further, in some preferred embodiments, each of the applications for any end user could be coming from different sources, depending on the suitability of each local box when each application was launched.

Figure 7:
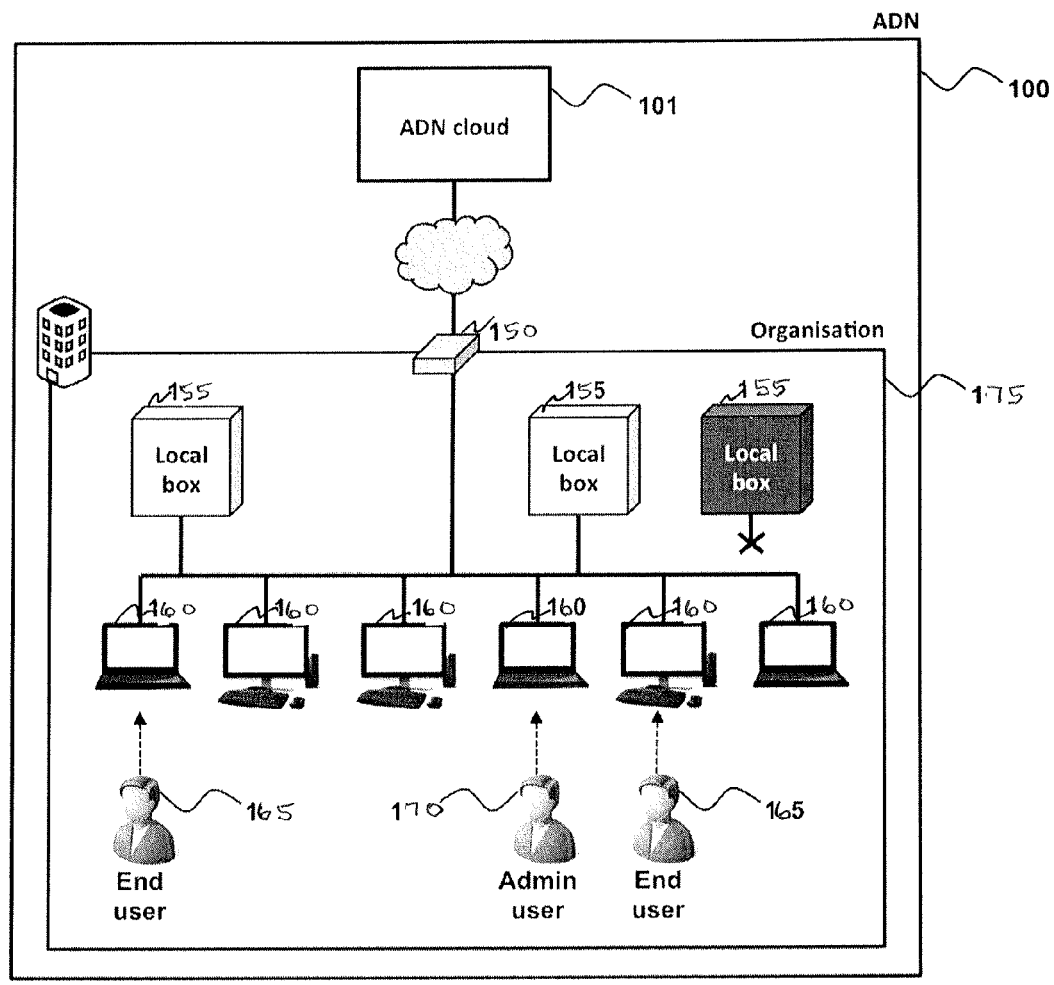
FIG. 7 shows an example of an ADN.

FIG. 7 shows an example of an ADN 100 that delivers applications to an organization with three local boxes 155, similar to the topology of FIG. 4A. In this case one of the local boxes 155 is offline, and so is not capable of serving applications. End users will have applications served from online local boxes 155 or the ADN cloud 101, depending on their suitability weightings. Generally, given enough capacity in the organization's local boxes, end users will tend to have applications served from local boxes 155 (if available), rather than the ADN cloud 101.

In a preferred embodiment, extensive failover management allows continued end user access to applications from alternative sources in the event of hardware or software failure of a local box.

In some preferred embodiments, organizations with an end user base that surpasses the abilities of a single local box can acquire additional local boxes, allowing the ADN to manage the load balancing and failover between them; or (generally more practical for larger organizations with greater in-house IT expertise) install multi-instance ADN cloud server (e.g., Jukebox Server) infrastructure with multiple points of redundancy and load balancing that the ADN will consider as a single (albeit relatively resource intensive) local box.

In some preferred embodiments, end users can add new applications to their target device with a simple one or two click process, without requiring full software downloads or complex installation procedures.

In some preferred embodiments, an end user can fall back on the ADN cloud for access to their applications should the ADN service on their local box become unavailable.

In some preferred embodiments, ADN cloud services, working in tandem with services provided by any local boxes, facilitate strict software license management (generally, employing Digital Rights Management, or "DRM") to ensure the enforcement of software licensing policies.

Application Jukebox

In some preferred embodiments, Application Jukebox is the technology chosen to handle the provisioning of applications to end users. In accordance with a preferred embodiment, each local box contains a single Jukebox Server. The number of installed local boxes and the specifications of each local box (such as connection bandwidth, network card speed, RAM, and storage space) will typically help determine the limit on the number of applications that can be served and the number of users that can access those applications concurrently before performance is impeded.

With Application Jukebox, applications are converted using the Application Jukebox Studio into a streamable package that consists of data required to run a particular application on an end-user machine including, for example, application files and registry keys, as well as meta-data explaining where those files and keys need to be placed. When an end user requests an application, the parts of the application that are required for the first launch of the application (the Partial) are sent to an Application Jukebox Player on the end user's target device. The Jukebox Player will then virtualize those parts of the application onto the machine, overlaying a virtual file system and registry hive over the file system and registry hive that physically reside on the machine. This makes the machine believe, for all intents and purposes, that the application is physically installed.

Application packages are delivered by an Application Jukebox Server, which consists of three main components: an admin service, a license service and a stream service. The stream service is responsible for the delivery of application content to the Jukebox Player on a target device, while the license service manages and enforces the license policies defined by the system administrator for the applications being provisioned. The admin service ties together each of the server components and provides a portal through which system administrators can add and maintain applications and license policies to the system. In some embodiments, users will have no interaction with the Jukebox admin service in an AJ local or AJ cloud, as provisioning will be managed by either the local portal or the global portal, which both use the Jukebox Server APIs to manage streaming applications.

In some embodiments, each local box used in the ADN will contain a single, self-contained Jukebox server (comprising of one admin service, one license service and one stream service) that is capable of handling the provisioning of applications to target devices on its own. Should this AJ local device fail, provisioning is handed over to the AJ cloud: a Jukebox Server infrastructure consisting of many instances of each component, fully redundant and load balanced, capable of handling a large number of sessions at any one time. In a preferred embodiment, the AJ cloud serves organizations should they require the failover service.

An instance of Jukebox Player running on an end user's target device can provide end users with a button to direct them to a local portal or the global portal so that adding applications to their system is as close to a single-click process as possible.

One feature of Application Jukebox is that served virtualized applications can be kept in persistent cache memory of a target device. This reduces or eliminates jitters due to interruptions in broadband access, and can enable the application to be run offline, even when the network connection is completely lost, for a grace period determined by the licensing policy.

Selecting Application Sources and Load Balancing

In some embodiments, at any given time, each end user is connected to a corresponding primary local box (generally, several users share each local box) from which their applications are provisioned. In the event of a failure of an end user's primary local box, the end user can be offered a list of alternative application sources, which may include other local boxes, if available, or the ADN cloud.

In some embodiments, when a target device is in failover mode to a secondary application source, the Jukebox Player on the target device continually monitors the primary local box and prompts the end user to revert to provisioning from that primary local box as soon as it becomes available.

In a preferred embodiment, the application delivery servers in local boxes are utilized in real time, with a target device pulling applications from whichever application delivery server is most suitable to serve it in that instance. In some embodiments, each application delivery server has an awareness of an end user's session in order to serve content and track the amount of usage by that end user from each application delivery server.

In some embodiments, before launching an application, a target device chooses an application server that is the most suitable at the time, and commits its end user session to that application delivery server for the duration of its application provision, even though the chosen application delivery server may not remain the most suitable.

In some embodiments, a target device continues to receive an application, even if the local box serving the application fails during delivery. The AJ local within a local box is able to deliver portions of an application for sessions that are not actively running on its Jukebox instance. This allows remaining application delivery servers to be available to the target device, regardless of which application delivery server the session is currently residing. In a preferred embodiment, the target device requests a new session from an alternative local box when an outage is detected.

In some embodiments, the ADN cloud is considered a last resort when evaluating the suitability of multiple application sources, and is therefore not included in suitability weighting calculations. It is chosen when no local boxes are available, or no local boxes have sufficient remaining capacity.

In some embodiments, an application source's suitability weighting is calculated using a "first to respond" algorithm. Each of the application sources is pinged over the network by a target device to see if it is available, and the first one to respond is considered to be the "closest" or "fastest" and used to deliver the application.

In some embodiments, suitability weighting calculations are performed on an ADN cloud or local box server, and the target device returns the results from ping tests to the said server for evaluation during launch requests. In some embodiments, the "first to respond" algorithm is similar to how the Application Jukebox Player currently load balances stream services in a multi-service setup. A "first to respond" algorithm may not necessarily be the most effective suitability weighting metric, as pings typically represent the "nearest" server and not necessarily the most "available". For example, even though a first local box (LB-1) resides within the same department as an end user and as such responds quickest to pings, it may be currently streaming a huge number of applications within that department, while a second local box (LB-2), which is only slightly further away in an adjacent department, may not serving any applications. In this example, the second local box (LB-2) could be used to reduce the load on the first local box (LB-1).

In some embodiments, a "round-robin" algorithm is used in selecting a suitable application source for delivering an application to a target device. Application sources are selected once each, with a new application source selected when a new request arrives. When the last application source is reached, selection begins again at the first application source.

Using a round-robin algorithm is likely to evenly distribute application delivery requests between application sources. However, it does not take into account how much effort is involved in dealing with those application delivery requests. So, for example, a first local box (LB-1) could be sent a first request to launch a small, pre-cached application, while a second local box (LB-2) is a request to buffer a much larger application. As a result, the second local box (LB-2) is going to be under a greater load than the first local box (LB-1) when the next round of application delivery requests arrive.

In another embodiment, a "least loaded" algorithm is used in selecting a suitable application source for delivering an application to a target device. A weight assigned to available application sources indicates how loaded a source is at the time of the request. In some embodiments, using Application Jukebox, a number of factors are considered when evaluating how loaded an AJ local or AJ cloud is, such as the number of active sessions in a "Running" state, the number of active sessions in a "Buffering" state, and the system resources available to that particular server. In some embodiments, the number of active sessions in the "Buffering" state is given a greater influence on the suitability weighting calculation than the number of active sessions in the less resource demanding "Running" state.

In some embodiments, application sources are allocated randomly to application launch requests.

In some embodiments, the end user of a target device manually chooses an application source.

In a preferred embodiment, when an application request is first made from a target device, the Jukebox Player on said target device sends the request to the nearest portal it can find. This could be a local portal, but it could be the global portal if no local boxes are available. Thus, when the process describes evaluating each of the servers available at any one time, it is likely that one of the options will be the same application source that is currently processing the application request. If the local portal on a local box is handling the launch request, it is unlikely that failover to the ADN Cloud would occur, as the Jukebox Server on the local box should be running and capable of processing the launch request.

Alternatively, instead of a local box, a large-scale Jukebox Server infrastructure can be used with several AJ local services running across multiple machines, fully load balanced using either DNS or network hardware. A local portal can be added to this setup to manage infrastructure, applications, licenses and user accounts, as well as handle failover to the ADN Cloud, if necessary. In organizations where there is a large number of users and a more complex Jukebox Server infrastructure is required, IT administrators can combine the power, flexibility and load balancing of a multi-instance Jukebox Server infrastructure with the global backup functionality, user experience and security offered by the ADN. A multi-server Jukebox infrastructure can be treated as a single local box, although it would likely be more heavily weighted during the server selection process than a single-server local box configuration due to its larger system resources.

License Management

In some preferred embodiments, during initial setup or day-to-day management of a local box, admin users are asked to define for each application the number of licenses they have purchased for their organization (the number of machines on which the application can be concurrently provisioned).

In some embodiments, licenses can be grouped into three categories:

i. Unlimited: Allows concurrent provisioning of an application on an unlimited number of machines. Useful for, for example, open source applications.

ii. User-based: Allows concurrent provisioning of an application on a set number of machines. Useful for, for example, a 10-user license for a particular organization for a particular application.

iii. Site Wide: Allows concurrent provisioning of an application on any number of machines within a particular organization.

In some preferred embodiments, when a specific number of available licenses is specified by an admin user, license enforcement is performed by the ADN cloud in conjunction with local boxes. License enforcement ensures that only the specified number of end users in an organization is allowed to launch an application at any given time. One way in which this can be accomplished is that each time an end user wishes to launch an application, the system determines, based on the number of licenses that are available and the number of those licenses currently in use within the organization, whether the end user is allowed to proceed. In some preferred embodiments, an admin user can specify which end users, or groups of end users, within an organization can access each application license.

In a preferred embodiment, applications are distributed with a form of license protection. In some embodiments, a Volume License Key (VLK) must be available when the application is being packaged. A VLK is a product license key that allows a single key to be used for multiple application deployments, typically legally restricted to one office or organization. If a VLK is included during packaging, the application package can be consumed on target devices, depending on the restrictions of the license, without users entering an individual license key for each target device.

In another embodiment, it is possible to disable any existing licensing checks on applications, allowing the ADN system to control the licensing of the packaged application itself. Such a system may be referred to as "Just In Time" licensing. In some Just In Time licensing embodiments, licensing enforcements on applications that are packaged and made available through the central repository are not machine specific. In some other embodiments, Just In Time licensing could be expanded to handle machine-specific licensing enforcement.

In a preferred embodiment, DRM is managed from the ADN Cloud ("cloud-managed DRM"). The ADN Cloud can be kept aware of license allocations in each organization, e.g., by respective sync agents. Advantageously, requests to allocate or release existing licenses are communicated to the ADN Cloud. Local boxes are given authority by the ADN Cloud to distribute existing licenses within an organization.

The license management mechanism during load balancing and failover is described in more detail in later sections.

Application Pre-Launching

In some preferred embodiments using Application Jukebox, the following steps take place for an end user to reach the point of launching an application.

When the Jukebox Player on a target device starts up, it runs a network discovery task to find available local boxes in the organization. It then stores a ping response time for each discovered local box. The target device also pings the ADN cloud to see if it is accessible.

The availability of each local box is visible to the end user via a status window, available from an icon in the status bar of the Jukebox Player.

There is an "Add Applications" icon within the Jukebox Player that directs end users to the "My Applications" page of the local or global portal that resides on an available local box (e.g., the local box with the lowest ping time), or the global portal if no local boxes are available.

If no local boxes are available and the ADN cloud is also inaccessible, then the end user is notified to contact their admin user for help restoring access to their applications.

Within the request for the "My Applications" page, the Jukebox Player on the target device passes the results of the previous server ping tests to the local or global portal being used.

Preferably, the user is logged into an applications page automatically on access attempt. This reduces the amount of interaction required on the end user's part, and thus the amount of time taken to access applications. Automatic login can be implemented, for example, using an identifier of the target device being used to access the local or global portal. Automatic login can also be implemented using the username of the end user currently logged on to the target device (e.g., in Active Directory environments).

In some embodiments, the local or global portal asks the user for authentication. Authentication can comprise a username and password combination specified by the admin user.

Once authenticated, the local or global portal generates a list of applications available to the end user, as specified by the admin user.

Each listed application has a corresponding launch button for adding the application to the end user's Jukebox Player on their target device.

In some preferred embodiments, a local portal, hosted on a local box, provides end users with access to a page from which they can launch the applications made available to them by an admin user ("applications page"). An applications page can be login protected, requiring end users to enter their credentials to access their applications. These credentials can be provided to end users by an admin user. The applications page can consolidate the applications available to an end user from local boxes within a respective organization. If there are no local boxes available, end users can access their applications from the same location on the global portal and applications will be provisioned from the ADN Cloud.

Application Launching

FIGS. 8, 9, 10 and 11 show an example of steps following an end user accessing a "My Applications" page and selecting an application to launch. These steps determine whether the application can be launched, and if so, which server should be used to handle the request.

The following steps describe an application launch procedure in accordance with some embodiments.

Figure 9:
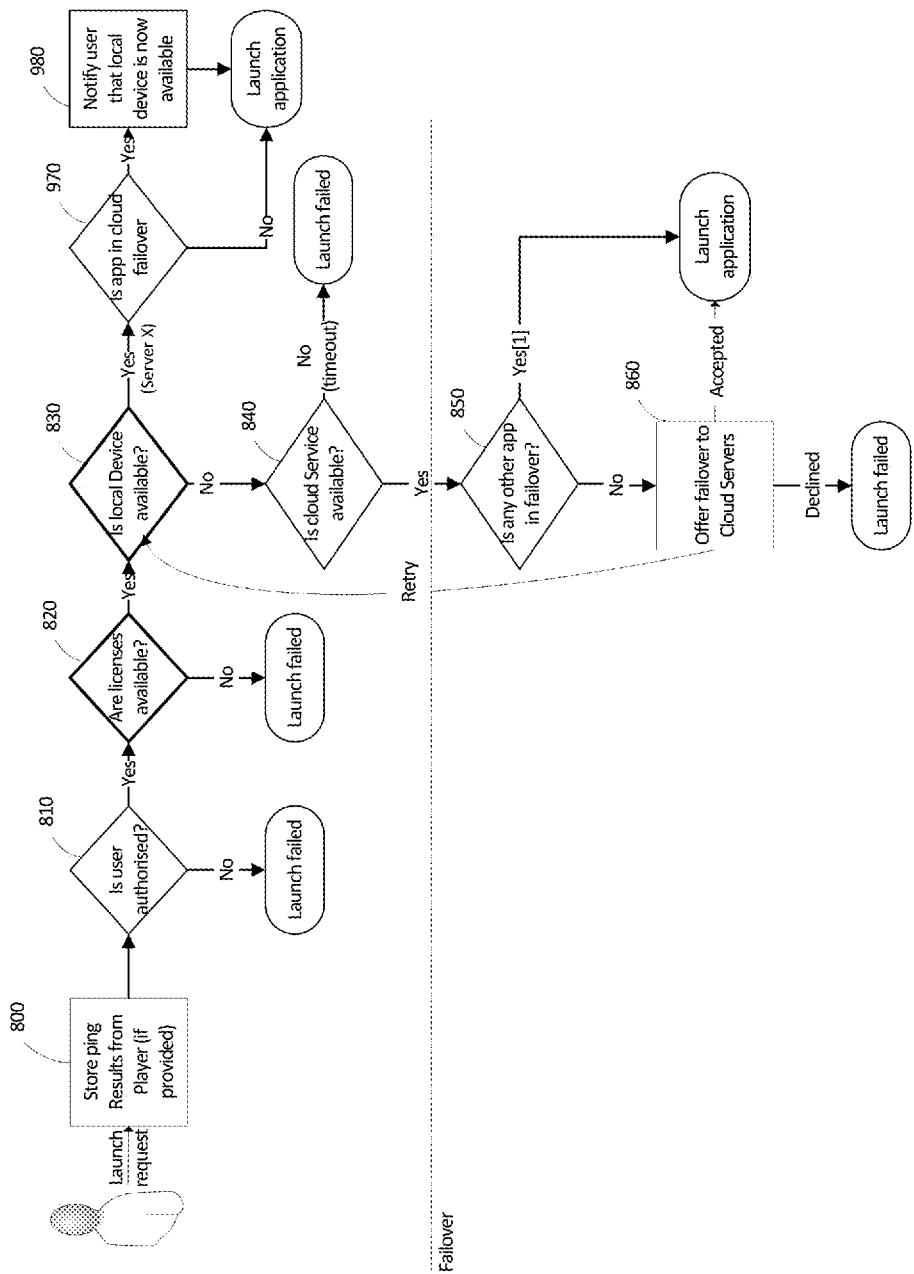
FIG. 9 shows an example of application launch.

FIG. 9 shows an example of an application launch procedure when a target device has already been used to launch an application. When a launch request is received, the local portal may first confirm (for security) that the user is authorized to access that application. If they are not, then the launch process fails at this point. (See reference numeral 810.)

The local portal will then determine whether or not there are any license seats available for that application. (See reference numeral 820.)

Figure 10:
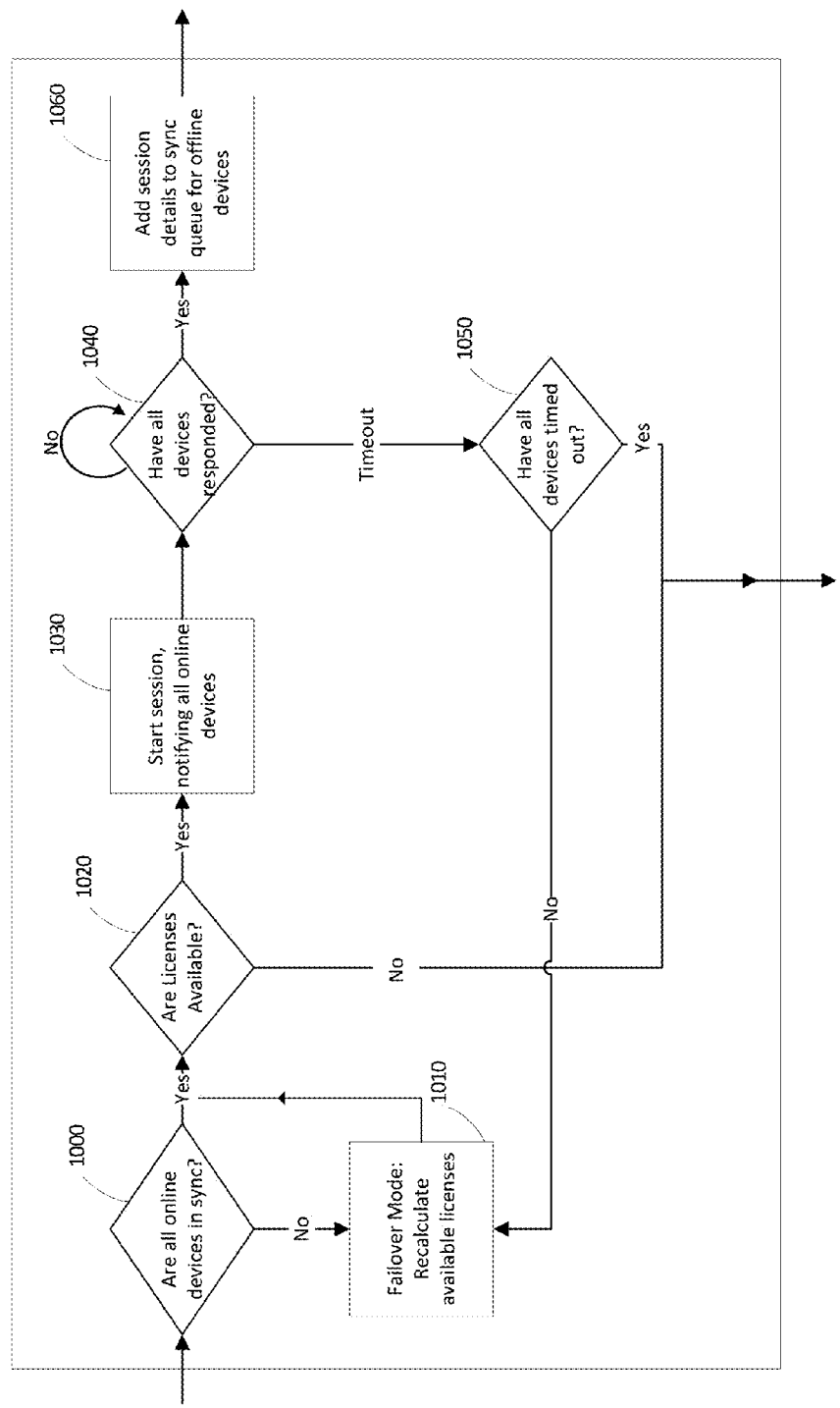
FIG. 10 shows an example of determining availability of license seats.

FIG. 10 shows an example of determining whether license seats are available during application launch. (See reference numeral 820.) To determine whether any license seats are available, the local portal will first check if the license seat utilization information on each of the local boxes is currently in sync, i.e., whether the license seat availability information is current across all local boxes. (See reference numeral 1000.) It is advantageous to maintain an on-going background process on each local box to monitor the sync status of other local boxes; use of such a background monitoring process generally means that sync information is already shared and little (if anything) needs to be done to determine sync and license availability status.

If the local boxes are in sync then the portal will have a record of how many seats are currently in use because usage information will have been communicated from the other local boxes when they created a session.

If the local boxes are not in sync then, generally, the local portal will not be sure how many licenses are currently in use. It will however know how many were in use when the local boxes last communicated and can therefore assume that it can distribute a portion of the remaining license seats, depending on how many local boxes there are on the network. The available licenses can thus be recalculated based on license availability sync information. (See reference numeral 1010.) For example, if there are two local boxes on the network and a license had 8 remaining seats when the local boxes last communicated, then each local box can safely provision 4 new licenses before communication is restored.

Once the number of remaining seats for the requested license has been calculated, the local portal can determine whether or not the requested application can be launched. If there are no available license seats, then the launch process fails. (See reference numeral 1020.)

Before launching the application, the local portal will notify each of the other local boxes (including the cloud service) that the new session has been created. (See reference numeral 1030.) Reasons for this step include: the other local boxes need to know that another license seat is in use for when they next need to launch an application; and should the end user lose communication with the local box, provisioning can fail over to one of the other local boxes, which will need to know the details of the session.

Once the local portal has received confirmation that license seat utilization information was received by each of the other local boxes, the launch process can continue. (See reference numeral 1040.) If any of the local boxes do not respond (see reference numeral 1050), then the process reverts to step 2 (see reference numeral 1010), to ensure that there are enough seats available with loss of communication to one of the local boxes.

If any local boxes were offline at the time when the session was created, the details of the session will be added to the queue of information to be sent to those local boxes when they reconnect. (See reference numeral 1040.)

Returning to FIG. 9, the local portal then begins selecting which server is the "best fit" for the user currently requesting the application. (See reference numeral 830.) To do this, it uses the ping results sent with the request from the "my applications" page. (See reference numeral 800.)

Figure 11:
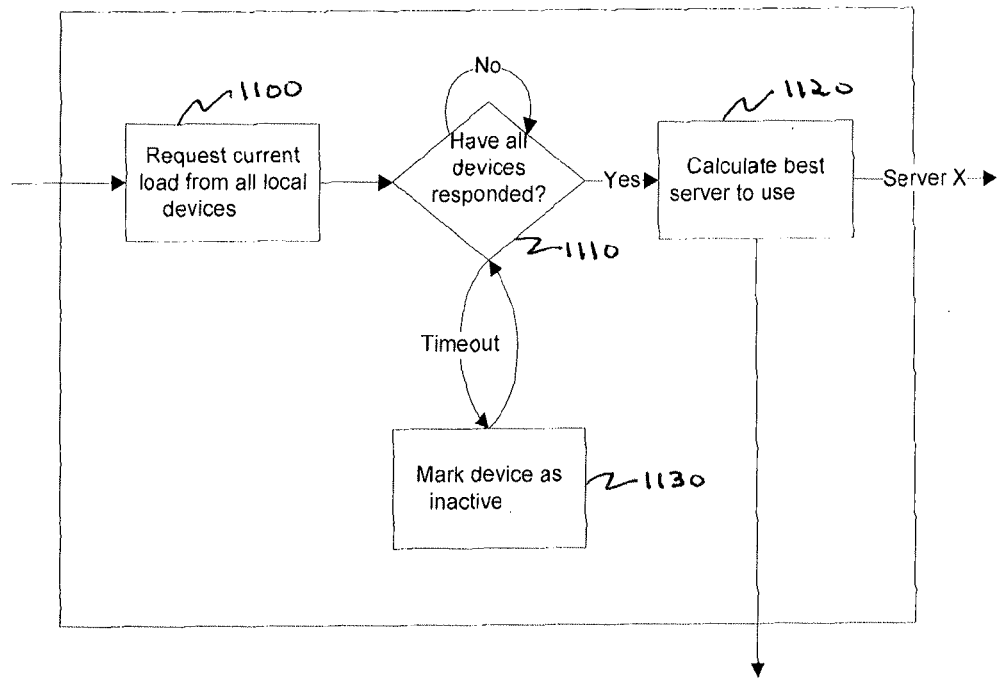
FIG. 11 shows an example of determining availability of local boxes.

FIG. 11 shows an example of determining whether any local boxes are available for application provision. (See reference numeral 830.) The local portal will 1) ping the other online local boxes and 2) ask them to return a numerical value representing how much load they are currently under. This value can be calculated using for example, the number of sessions each local box is currently serving and its system resources. (See reference numeral 1100.)

The results from the requests (showing which local box is most loaded) will be combined with the client's ping results (showing which local box is "nearest"—responds most quickly—to the target device being used by the end user) to decide which server is best to use to launch the application. (See reference numeral 1120.) This decision can be made based on, for example, which local box with remaining capacity has the shortest ping time.

Returning to FIG. 9, following determination of local box availability (see reference numeral 830), if an available local box has been selected, then the launch request will be sent to the Jukebox Server on that local box and the resulting token (or error) returned to the user.

If this is not the first time this user has launched this application, and it was previously being obtained from the cloud service, the user can be notified that their application provisioning has returned to their primary local box; performance may be increased as a result.

Depending on any error message encountered, the local portal can try the next best fit local box for launching the application.

Figure 8:
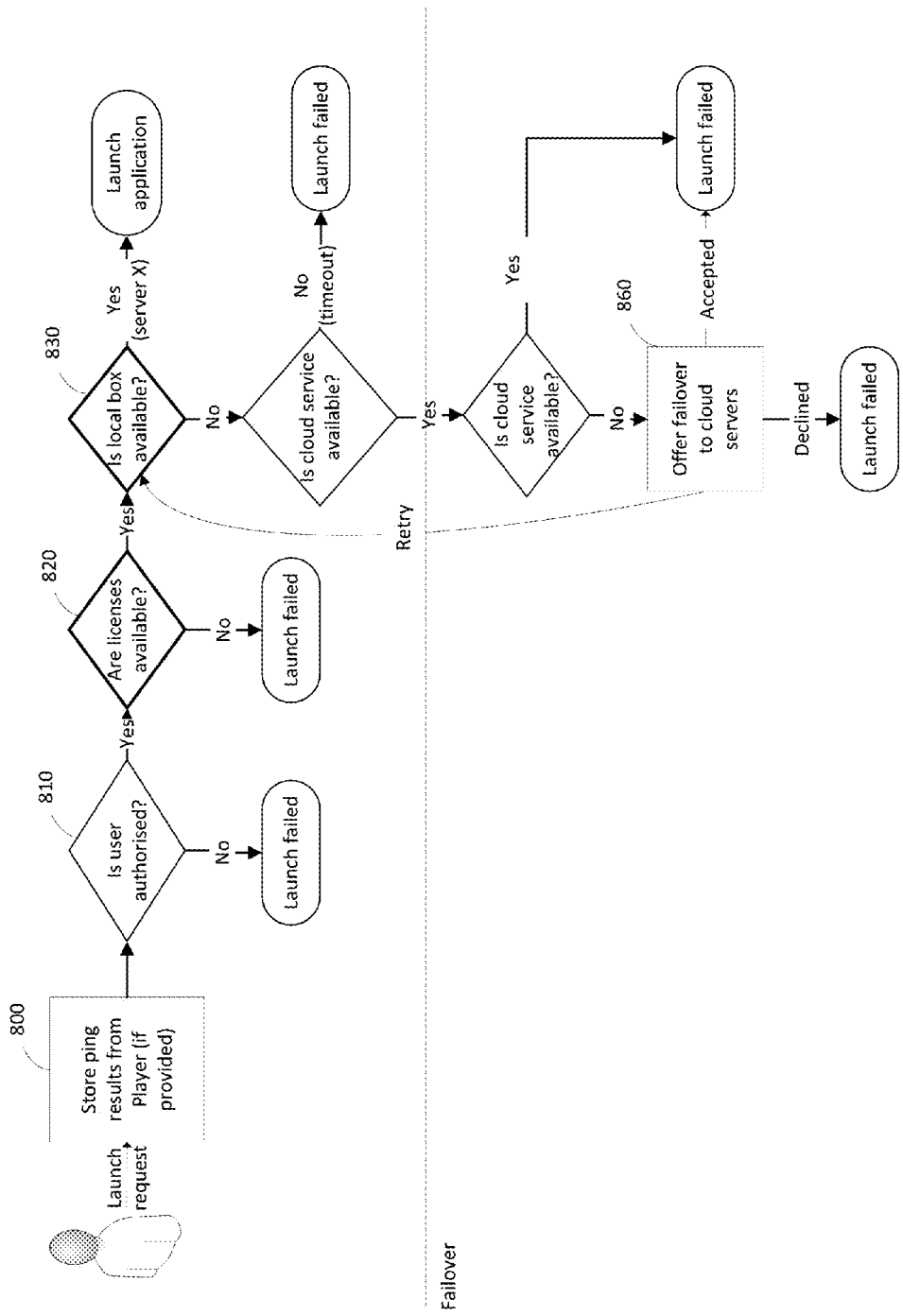
FIG. 8 shows an example of application launch.

FIG. 8 shows an example of application launch on an initial attempt to launch an application from a target device. Initial attempts to launch an application from a target device can proceed in a similar manner to subsequent attempts, except that generally it will be unnecessary to determine whether the application is in cloud failover. (See reference numeral 970.)

Returning to FIG. 9, if the local portal determines that there are no local boxes available (see reference numeral 830), then it will attempt to contact the ADN global portal. (See reference numeral 840.)

If the global portal is available then the launch request will be sent to the global Jukebox service and the resulting token (or error message) returned to the user.

If this is the first application to be streamed from the cloud service during the current session, then the user should be warned that there is a problem with their local boxes, their applications will be obtained from the cloud, performance may be affected and they should contact their system administrator to rectify the problem. (See reference numerals 850 and 860.)

If this is not the first application to be streamed from the cloud service during the current session, then there is no reason to repeat the same message and the status icon in the Jukebox Player should indicate that applications are being obtained from the cloud.

If the ADN global portal is not available, or the application request to the global Jukebox Service returned an error, then no local boxes are available to launch the application and the launch process fails.

Application Redelivery

Figure 12:
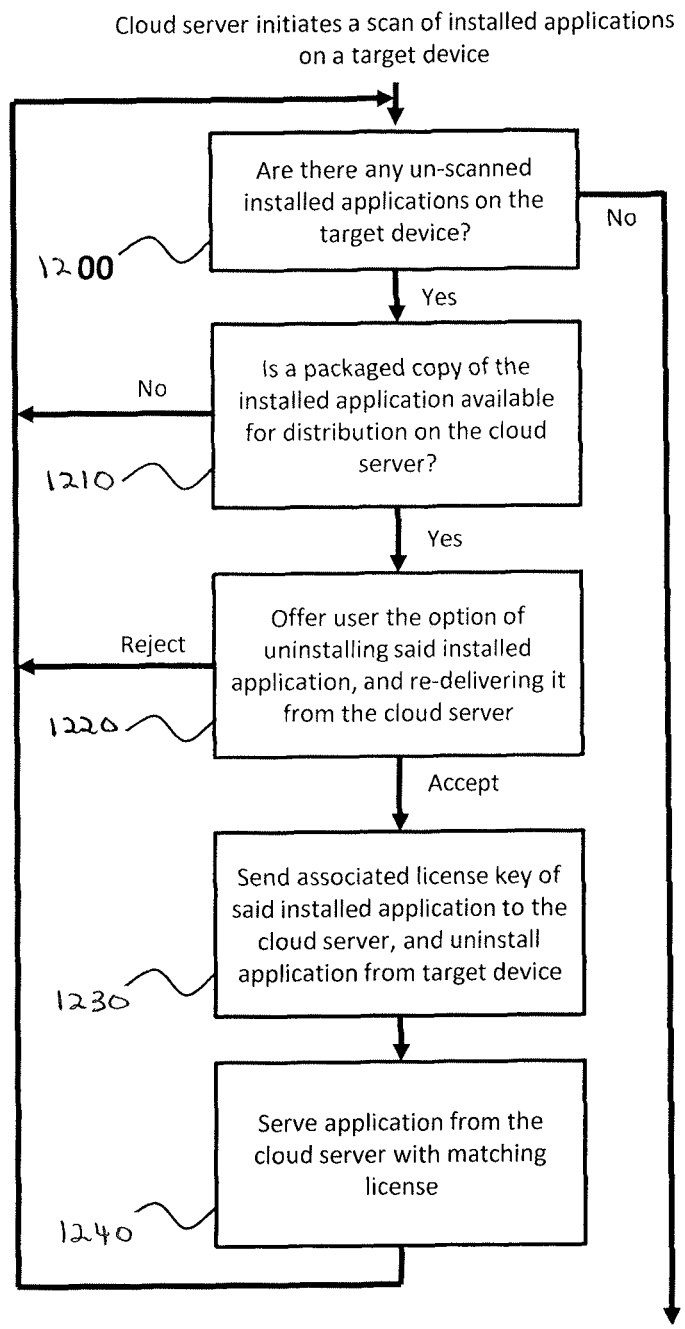
FIG. 12 shows an example of choosing Partials to serve.

FIG. 12 shows an example of choosing Partials to serve to a target device in order to 're-deliver' existing legacy applications, in accordance with some embodiments. The cloud server initiates a scan looking for installed applications on the target device. If a traditionally installed application is detected (1200), then the cloud server checks whether it has a packaged copy of the same application available for delivery (1210). If a packaged cloud copy is available, then the user of said target device is prompted to choose whether to accept cloud re-delivery of said traditionally installed application (1220). If the user accepts, the license key of the installed application is sent to the cloud server, and the application is uninstalled from the target device (1230). A Partial or entirety (or in between) of the application is then served from the cloud server to the target device with a matching license (1240).

In some embodiments, a Volume License Key (VLK) is inserted into the application when it is packaged.

In some embodiments, it is possible to disable any existing licensing checks on applications, allowing the cloud server to control the licensing of the packaged application itself. Such a system may be referred to as "Just In Time" licensing.

In some Just In Time licensing embodiments, licensing enforcements on applications that are packaged and made available through the central repository are not machine specific.

In some embodiments, application re-delivery is only used to deliver applications with no licensing protection.

Enforcing License Policies

In some embodiments, a local portal in the process of launching a new application contacts other local boxes to query how many active sessions they are currently hosting in order to determine whether or not there are enough seats (licenses or allowed concurrently-executed iterations of an application) available to launch the application. This enables robust enforcement of license policies by broadly distributing information regarding seat availability.

Where local boxes communicate with each other to ensure that only the allocated number of license seats is provisioned to end users, license policy enforcement (generally) can be guaranteed if the system ceases provisioning new applications when one or more of the local boxes become detached from the rest of the ADN.

For example, an organization can have two local boxes in two different buildings. In the case of a network outage that severs communication between the two buildings, then there is no way for the local boxes to confirm with one another (or without network) the number of licenses currently in use. If an organization is only permitted a fixed number of licenses, then application sources need to be completely sure that licensing policies are still enforced. In some embodiments, the solution in this scenario is to halt new application provisioning until a network administrator can restore communication between application sources. However, with the exception of the missing communication link, the organization would still have the resource of two fully functioning local boxes that end users could make use of these resources may be wasted without procedures for ensuring offline licensing policy enforcement.

In a preferred embodiment, the ADN takes a more nuanced approach to license usage monitoring to ensure that the ADN is able to continue provisioning applications. In many systems, it is fair to accommodate failure and accept that certain scenarios are extremely unlikely, and in those cases, it is acceptable for the system to fail or shutdown. As the ADN in a preferred embodiment is designed to overcome the problem of system failure, it is important to ensure that the system continues to operate for as long as possible.

A preferred embodiment can respond to scenarios in which local boxes are unable to communicate with one another. In some embodiments, the local box handling a request for an application launch contacts the other local boxes to make them aware of a new session (so that they can take over that session if required for failover) before permitting the launch. This means that when communication is terminated between two local boxes, each of the local boxes would have known how many running sessions there were across the network. If both local boxes are still online, just separated (not communicating with each other), then each one adopts a share of the remaining available licenses.

In some embodiments, multiple local boxes may be unable to communicate with each other while target devices are able to communicate with multiple the local boxes. If a local box handling a launch request has run out of license seats but can determine that the target device requesting the application is able to see one of the other local boxes, it can recommend to the target device that it try obtaining a license from that other local box.

In a preferred embodiment, the advanced license management provided by Application Jukebox is used to ensure that the license policies and restrictions are enforced for each application within the ADN network. When an application is requested, a license is created within an AJ local or AJ cloud, and that Application Jukebox server will ensure that no more than the permitted number of sessions is created for that license.

With the introduction of load balancing to an ADN embodiment, where more than one application delivery server is available to each end user when an application is launched, the same application can be served from more than one location. This means that (generally) the individual application delivery servers cannot enforce licensing policies. For example, if there is a license on one application delivery server that was limited to 10 concurrent users, some users could be streaming from one of the other application delivery servers.

In a preferred embodiment, application licenses are stored globally within the ADN so that license information can be synchronized to application sources used to serve an organization. Application sources serving an organization include one or more local boxes and the ADN Cloud. The ADN uses the global license information to manage and enforce licensing policies across application delivery servers. This allows each session to be served from any of the available locations and gives the ADN the ability to failover and load balance sessions rapidly between locations.

In order for the local portal or global portal to quickly determine whether license seats are available for a given application launch request, details of active sessions are abstracted from application delivery servers, preferably all Application Jukebox servers, and stored within the ADN database.

In some embodiments, the same functionality could be achieved by querying each of the Application Jukebox servers when an application launch request is received by an application source to see how many sessions each one is currently hosting. This could add significant complexity and delay launch of an application, for example, if any of the Application Jukebox servers fail to respond and timeout.

Storing Application Data

Application data or documents created by a streamed application during an end user session can be saved for the end user by default to a network share on a local box. The user can also save their documents in an alternative location if they so wish. User documents saved to the network share on a local box can also be backed up to the ADN cloud so that they can be retrieved from any point on the ADN, and not be lost if the local box is reset or replaced.

Managing Failover

To ensure that end users always have access to their applications, an ADN can be built to provide the ability for application provisioning to change over (failover) to an alternative source in the event of a local box failure. The main focus of this feature of the ADN is centered on ensuring the best possible end user experience for anyone using the service when a failure occurs.

In a preferred embodiment, an ADN has multiple layers of redundancy that can be called upon should a failure occur at any local box. A number of failure modes may be possible, including, for example:

i. Level 1: A recoverable local box failure. For example, a hard drive needs replacing, or a hard reset is required but the device is still recoverable.
ii. Level 2: Complete and unrecoverable failure of a local box. The organization has an alternative local box available from which applications can be obtained.
iii. Level 3: Complete and unrecoverable failure of a local box. The organization has no other local boxes available within their network.
iv. Level 4: Complete and unrecoverable failure of a local box. End user has no Internet connection available for failover to the ADN Cloud.

In the event of a level 1 failure that requires the operating system (OS) on the affected local box to be restored, the local box is left "as shipped" following the restoration. Once the local box has been restored following a level 1 failure, an admin user is directed through the initial set-up process as if accessing the local box for the first time. During the initial setup following failure, the admin user is able to identify herself, or her organization, to the set-up wizard, allowing their local box configuration, applications and data to be restored from the ADN cloud without information having to be re-entered. Once the restoration is complete, the local box is in the same state as before failure occurred.

In the event of a level 2 failure, provisioning of applications for end users is switched to an alternative local box.

In the event of a level 3 failure, end users are given the option to switch their application provisioning to the ADN cloud. If an end user accepts, provisioning of their applications is switched to the ADN cloud. If an end user declines, they are notified there are no available application sources and their application cannot be launched.

In the event of a level 4 failure, end users are notified that their one or more applications cannot be launched. The end users can also be offered suggestions regarding how to rectify the problem.

Following a level 2, 3 or 4 failure, the recovery process for a repaired or new replaced local box is the same as the recovery process from a level 1 failure once the local box has been repaired or replaced.

In some embodiments, when an end user is obtaining applications from the ADN cloud, the Jukebox Player on the end user's target device periodically or continuously monitors the status of some or all networked local boxes, and prompts the end user to revert back to said local boxes as soon as one or more is available.

Figure 13:
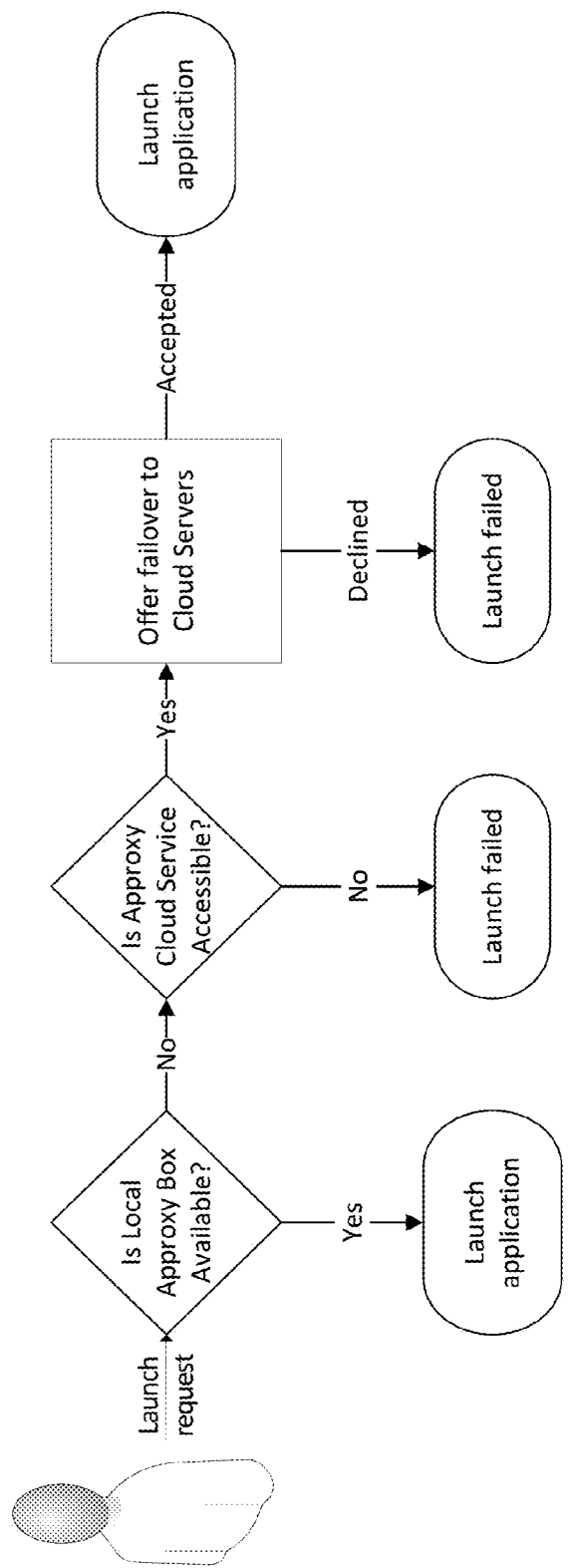
FIG. 13 shows an example of failover.

FIG. 13 shows an example of failover for organizations using only a single local box. For such organizations, the failover mechanism may involve switching user access to the ADN Cloud at any point where their local box is unavailable.

In some preferred embodiments, a Jukebox Player running on a target device has an in-built knowledge of locations from which applications can be obtained, allowing it to quickly consider alternative sources in the event of failure of the primary source. The application source to use is determined when an application is launched using suitability metrics.

In a preferred embodiment, an application source list can be discovered by a target device by performing a LAN discovery protocol, in a similar manner to discovery of network printers and other peripherals on an Ethernet LAN.

In some embodiments, a target device uses a network discovery protocol to discover a first application source. This application source provides the target device with a pre-defined list of further application sources (if any). The pre-defined list can be manually created, or populated automatically using a network discovery protocol initiated by said first application source.

In a preferred embodiment, the system used to handle load balancing of applications also handles system failover as part of the same process. When selecting the most suitable application source to serve an application, if the chosen application source is not responding, then it can be ignored and other options explored. For this reason, system failover and load balancing can be thought of interchangeably with respect to some preferred embodiments.

Portable Environments

ADN can be advantageously employed to address persistence of user data in the context of distributing applications in an on-demand environment. A "clean" desktop strategy can be adopted to reduce support burdens and overheads and separate the provisioning of user desktops from the provisioning of user applications.

In doing so, organizations can reduce the amount of time required to update a particular application or desktop image as the two are independent environments. For example, if an organization makes use of an on-demand application delivery mechanism, such as an ADN, then it only needs to configure new machines with a basic operating system and maintain this "base image", instead of having to spend additional time installing applications that may (or may not) be required. Use of a virtual desktop further reduces the time to provision new machines. Graphically rich applications, such as Adobe Creative Suite or Autodesk's AutoCAD, are some examples of applications that benefit from provisioning through an ADN.

"Clean" desktop strategies give IT administrators various options for storage of user data such as saved documents and application data. An ADN is usable regardless of whether an organization has significant IT resources available, and can be used to implement roaming profiles or other modes of remotely accessible user environments. By using an ADN, organizations can prevent users from implementing individualized data management solutions, such as saving to individual machines and portable flash devices.

In some preferred embodiments, within local boxes there resides a network share for all or some of the end users. Using Application Jukebox's configurable virtualization for applications provisioned through the ADN, the ADN system overrides the default save location specified by an end user's target device and prompts the applications to save data to the network share. Alternatively, end users can change the save location as they desire to make use of existing save locations. Advantageously, the default is to save data to the local box.

In some preferred embodiments, in order to give end users access to their saved data wherever they access their applications, data in the network shares on each local box is synchronized with a global file share within the ADN Cloud.

In some embodiments, Partials fitting or at least partially accommodating a variety of potential user roaming profiles can be present on or made quickly available to a target device. This means that, even if little or nothing is known about who will use the target device, even in an application-rich environment, an end user can be immediately productive (or can immediately begin playing) using their own licensed (or license-free) suite of applications.

Third Party ADN Linking

In some embodiments, Independent Software Vendors (ISVs) are linked to the ADN cloud. This link, which can be maintained through a set of APIs for ISVs and value-adding service providers, allows the addition of features to the ADN service including (for example) global high-level reporting of license usage for ISVs, online validation by ISVs of the number of licenses reported by ADN member organizations to ensure license compliance, and purchasing of new or additional licenses for an organization through the global portal.

In another embodiment, the ADN Cloud Services also provide a commercial platform through which third parties can sell new or additional licenses to be provisioned to organizations already using the ADN, through their own systems. This protocol can allow online stores such as amazon.com, or web hosting providers such as fasthosts.co.uk, to re-sell application licenses provisioned through the ADN.

Accessing Global Usage Information

In a preferred embodiment, an ADN user can use the global portal to access information for each organization, such as the applications that they are deploying, the number of licenses they hold and how much total usage there has been for each application. In some embodiments, ADN users also have access to a set of reports indicating top-level usage information, such as the 'most used application' and 'biggest customer'.

Figure 14:
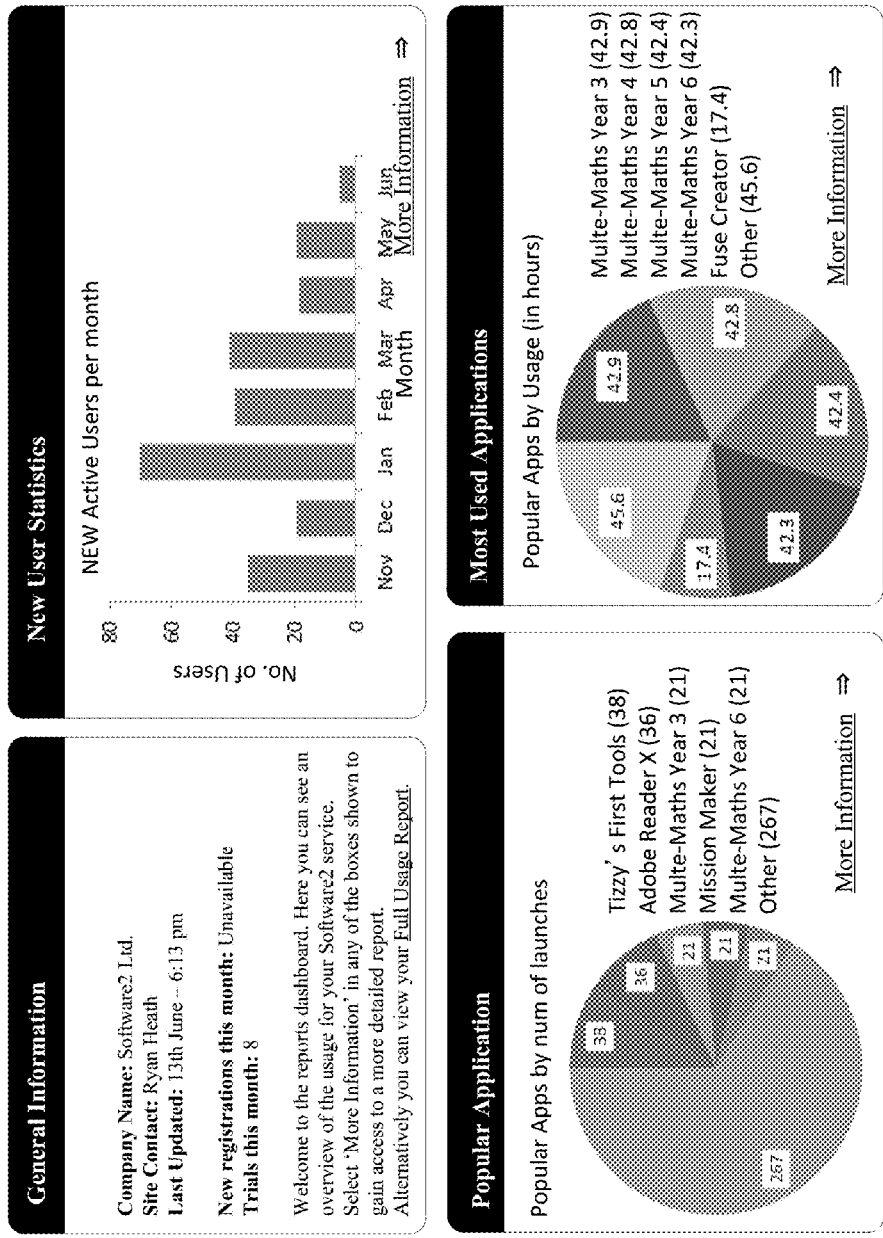
FIG. 14 shows an example of ADN usage information.

FIG. 14 shows an example of a graphical interface for access by admin users to detailed breakdowns of application and license usage within their organization. This example shows the Software Reporting Interface for Application Jukebox, but other software and/or hardware with appropriate functionality can be used.

Adaptive Application Streaming in Cloud Gaming

The present application discloses inventions which, in various ways, push or otherwise provide immediately initially playable portions of games onto game play units, and when a game portion is selected for play, stream additional components to said game play units. There are synergistic advantages in combining this application-server architecture with the application distribution network ideas which are also described herein, but it should be noted that either of the two groups of inventions can be exploited separately to great advantage, independently of the ideas in the other group of inventions.

The present application discloses inventions which, in various ways, push or otherwise provide immediately initially executable portions of games or other applications onto user environments, and when a game or other application is selected for use, stream additional components to said user environments.

According to a particularly advantageous class of embodiments, a server in the cloud pushes immediately playable (or executable) portions of games or other applications ("Partials"), without a request or other direct input by a user for the corresponding games, over a network to interactive game stations (or other application executing resources). Partials can be 5-10% of the size of complete games (e.g., only that portion of a game necessary to play through a first level), meaning that a much larger number of games can be made available for immediate play than otherwise possible. Games can be chosen for corresponding push of Partials in various ways, including user preferences of one or many users, where one user's preferences include that user's game purchase and play history, and potentially other shopping history and personal information.

Games corresponding to Partials can be packaged to contain all of the components necessary for execution (e.g., texture maps, .dll's and registry keys) so that, once an application package is present on a game station, a "file system hook" can be used to interdict and redirect operating system calls to isolate an executing application package from other game station functions. Packaged applications do not require installation for play. Packaged applications can be broken up into "pages", application portions reflecting actual code used during execution of corresponding game events or application functions. (A Partial is at least that set of pages required for immediate play.) When a game station begins executing a Partial, the game station can signal the cloud server to send—during gameplay—some or all of the rest of the pages of the game corresponding to the Partial. As pages corresponding to game content arrive at the game station, the game station can make such content available to a player—during gameplay!

In some embodiments, the cloud server can also delete pages or entire games from a target device to make room for additional Partials or larger game portions, or to reflect game license conditions.

In some embodiments, a proxy server (target proxy device) can be designated that receives Partials or larger game portions from a cloud server, and then acts like a cloud server with respect to corresponding game stations on the proxy server's local network.

In some embodiments, once a cloud server has pushed a Partial or larger portion of a game to a game station, that game station can act as a peer-to-peer serving node for that Partial or game portion. A game station can request pages from peer-to-peer nodes or, if unavailable on nodes, can request pages from the cloud server. A cloud server can also instruct a node to push a Partial to another game station.

The disclosed innovations, in various embodiments, provide one or more of at least the following advantages. However, not all of these advantages result from every one of the innovations disclosed, and this list of advantages does not limit the various claimed inventions.

- reduces or eliminates relevance of bandwidth reliability to first execution of a game or other application;
- reduces or eliminates relevance of network latency to execution of a game or other application;
- reduces the bandwidth necessary to an immediate and complete user experience following first execution of a game or other application;
- reduces reliance on consistent network service quality for ability to provide an immediate and complete user experience following first execution of a game or other application;
- enables effective management of a library of games or other applications on a target device, while simultaneously providing the ability to vastly expand the set of available immediately initially executable games or other applications on the target device;
- enables prediction of games or other applications a user will want to execute and provision of said desired items to the user in an immediately initially executable form without the user having to explicitly request the desired items;
- enables frictionless, instant-gratification purchase or trial of any of a large library of games or other applications available for immediate play on a target device;
- enables retailers, third parties or preference-tracking routines to choose some or all of a large number of games or other applications to be available on a target device for immediate play;
- inventive systems and methods can be fully implemented using relatively limited infrastructure investment;
- enables secure application distribution in embodiments where game or other application components are delivered and stored in an encrypted state;
- enables digital rights management enforcement of licenses, including for rental or subscription market models, in both online and offline modes;
- provides instant gratification following selection of a game or application for execution, even if the game or application has not previously been selected for execution or download;
- resistant to geographically localized network traffic spikes or troughs;
- game or other application availability does not rely on a user or end-user hardware manager (e.g., gaming café or business organization) knowing ahead of time what software will be desired or required on any given target device;
- does not require advance choice of a game or other application;
- embodiments utilizing virtualization do not require installation;
- does not require physical acquisition of software media;
- allows display of the highest resolution of a game that a system can render, without requiring extraordinary bandwidth; and
- no noticeable lag between user input and resulting rendered game or application.

Cloudpaging Games

Instant gratification gaming can be achieved using Cloudpaging and Application Jukebox. Using Application Jukebox, a game is packaged into a pre-virtualized form. The Partial is then intelligently delivered over a network from a cloud server to an end user's target device. With only this Partial, the user can jump into demanding graphics-intensive game titles, while the remainder of the game is delivered to the target device's persistent cache seamlessly in the background from the cloud. Partials can advantageously be delivered in encrypted form in order to enhance DRM and license control.

As the rendering is done locally, there is no network latency to interfere with user control response time, and the resolution of gameplay is independent from network connection speed. Additionally, games can be enjoyed with the full range of available peripherals.

Cloudpaging allows remote management of an application memory, such a games library, on a user's target device. A cloud server selects and pushes one or more Partials over the network onto the user's target device without the user having to request or otherwise select the corresponding game. The Partial (and corresponding game) can be selected for the user based on, for example, heuristics of a user's preferences, such as the user's gaming history. The user can be encouraged to trial any one or more of these pushed Partials, with or without purchase, rental or other payment condition, and can jump straight into any of the corresponding games instantly with no network buffering delay. Use of Partials previously pushed onto the user's target device can cut the user's "time-to-play" to nearly zero, thus satisfying the gamer's desire for instant gratification.

By limiting the memory footprint of Partials in a user's gaming library, games available for a user's immediate and convenient consumption can be greatly expanded, potentially by 10×, 20× or more. The user does not need to be aware of which games (if any) are fully cached on their target device, which games (if any) are only Partials, and which games (if any) are in a transitory state between the two.

Downloadable content ("DLC") can also be pushed to the user's target device. Depending on system configuration, the user can even purchase DLC simply by accessing content corresponding to the DLC module, thus seamlessly removing the interruption of DLC purchase from the game experience.

Using Application Jukebox, the game is not installed on the target device, but instead runs virtualized at near native speed in a sandbox, isolated from the target device's operating system and other unrelated processes. This means low-friction convenient gaming with no installation time delays or resource conflicts. Process isolation also provides a secure environment for license control and prevention of unauthorized modification of the game experience ("hacking"); preventing hacking is particularly advantageous in an interactive multiplayer game environment, where unfair advantages can frustrate and drive away otherwise satisfied users.

With Application Jukebox, cloud-managed Digital Rights Management (DRM) and encrypted local storage enforce licensing policies, even when games are played offline; if a user exceeds his or her allocated offline license duration, the encrypted game is locked until the license is renewed via interaction with the cloud server. An Application Jukebox cloud server suite can control, manage, analyze and revoke application licensing, even on a minute-by-minute basis.

Application Streaming in Cloud Gaming

A cloud based server delivering computer game software in parts to a target device, such as by application streaming, has a number of advantages.

A target device may be a target rendering device or a target proxy device. A target rendering device can be, for example, a PC, minicomputer, mainframe computer, console, smart TV, tablet, smart phone, programmable consumer electronics or distributed computing environments where applications are run and rendered on remote processing devices that are linked through a communications network. A target proxy device can be, for example, a network connected computer readable storage device, such as a Network-Attached Storage (NAS) drive comprising a hard disk and a file server. Such a target proxy device advantageously is connected, either directly or via one or more other devices, mediums or networks, to one or more target rendering devices in order to deliver the rendered gaming experience to a user.

The advantages of delivering game software in parts, such as by application streaming, from a cloud server to, eventually, a target rendering device in a reliable, fault tolerant manner using a solution such as Application Jukebox include:

1. A minimum portion of a game can be delivered to a target rendering device to cut the "time-to-play" and reduce friction to the user. This is a key advantage when compared to full game downloads. The remainder of a game can be delivered to the target rendering device concurrently in the background while it is running on said device.

2. Delivering in parts, such as by application streaming, of game software often requires less minimum bandwidth than current Cloud Rendered Gaming, which has to continuously deliver rendered images from remote edge servers.

3. As games are eventually rendered locally on a target rendering device, the game can perform at native speeds without the latency associated with current Cloud Rendered Gaming. An important further advantage of Application Jukebox and local rendering is that an expensive investment for an edge server with a GPU is not required as the entire rendering is performed locally on one or more target rendering devices 4. Once a sufficient portion of a game has been delivered to a target device, offline gameplay without a continuing data network connection to the server is possible, unlike with current Cloud Rendered Gaming.

In a preferred embodiment, Application Jukebox running on a cloud server serves one or more virtualized applications to a target device over a data network. A data network can be, for example, the Internet, a wireless or Ethernet Local Area Network (LAN) or a Wide Area Network (WAN).

Figure 15:
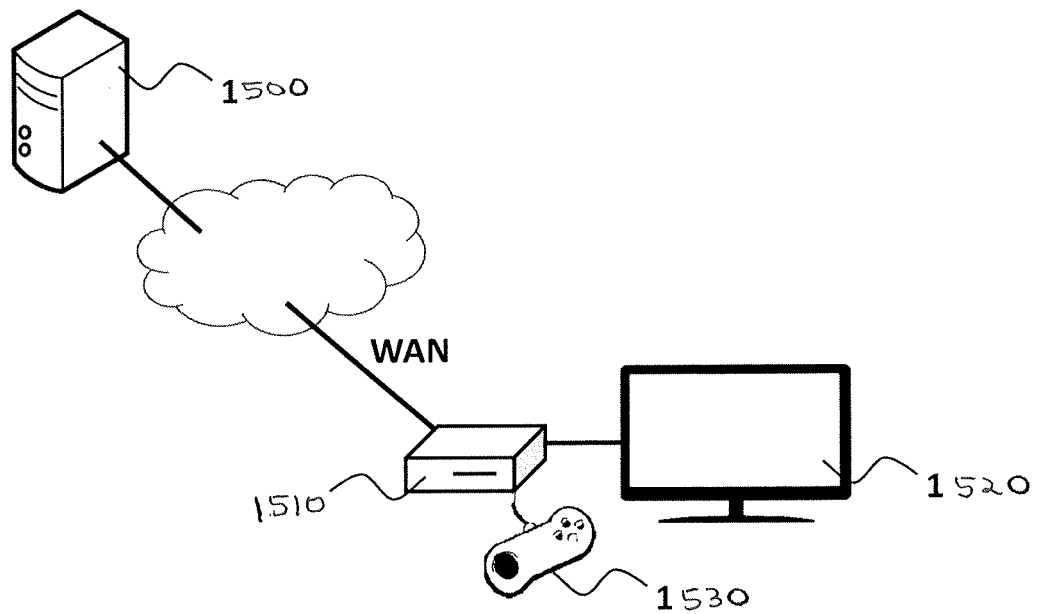
FIG. 15 shows an example of cloudpaging.

FIG. 15 shows an example of a hardware arrangement for cloudpaging games to a single target device. An AJ cloud (1500) pushes Partials of games, advantageously without requiring any request, command, direct input or other indication of desire by a user, over a network (WAN) to a target rendering device (1510), which is connected to a display (1520), which may be visual, aural, haptic, or of any other form allowing communication to a user, and also connected to a controller (1530), which may be a game controller, mouse and/or keyboard, or any other form allowing input from a user.

In some embodiments, a target rendering device can be a low cost console ('micro-console'). Micro-consoles may attain Xbox 360-equivalent or greater performance. Such micro-consoles may be able to render 3D stereoscopic 720p HD graphics performance directly to a TV while consuming relatively low power. The performance trend may further continue to reach full 3D stereoscopic 1080p HD. A micro-console or console's functionality can be partially or completely integrated into a smart TV.

Figure 16:
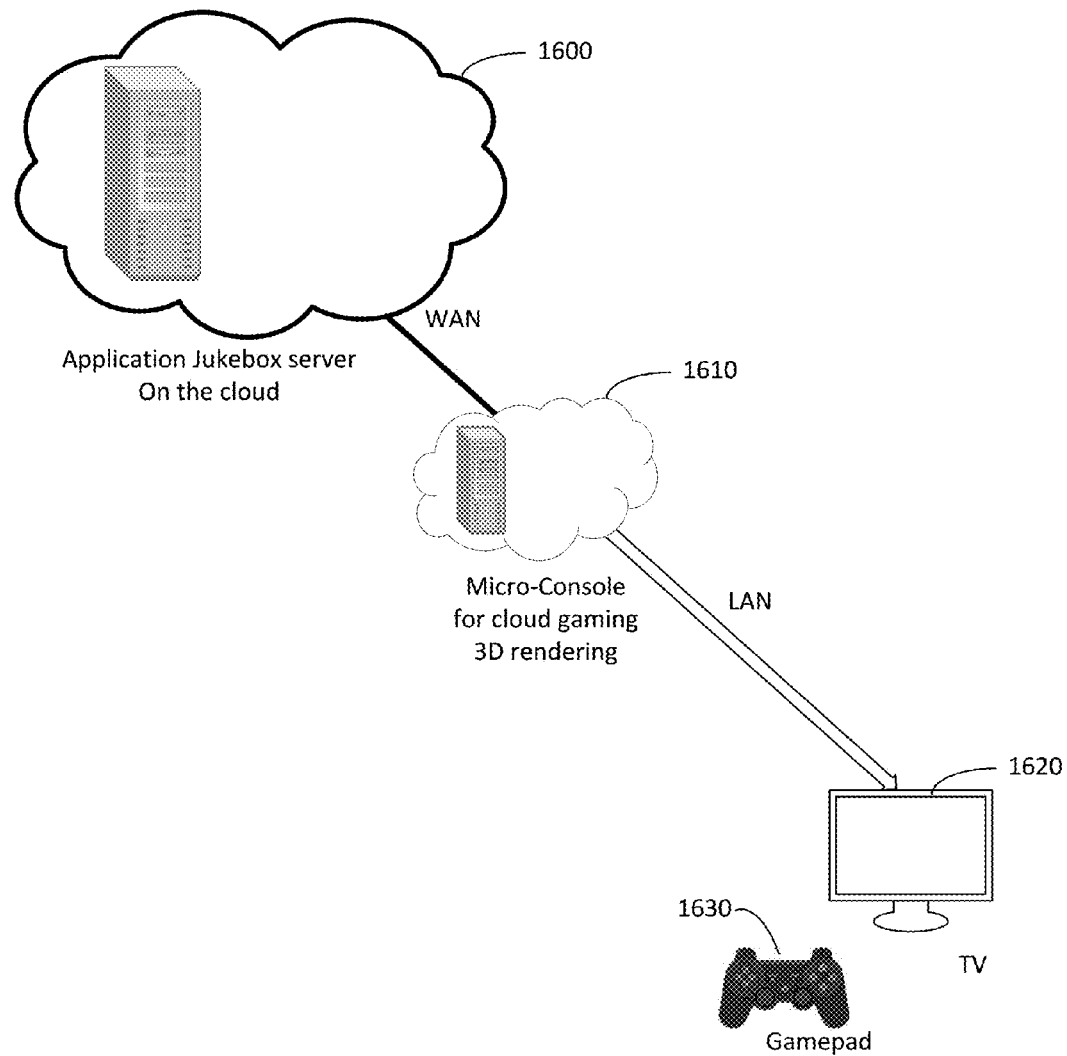
FIG. 16 shows an example of cloudpaging.

FIG. 16 shows an example of a hardware arrangement for cloudpaging games to a target device. An AJ cloud pushes Partials of games over a network (WAN) to a target rendering device, e.g., a micro-console which is connected over an HDMI connection, a network (LAN) with a very short ping time or another fast communications connection to a user's display such as a TV, with a controller such as a gamepad connected (directly or indirectly) to the LAN to allow user input.

Figure 17:
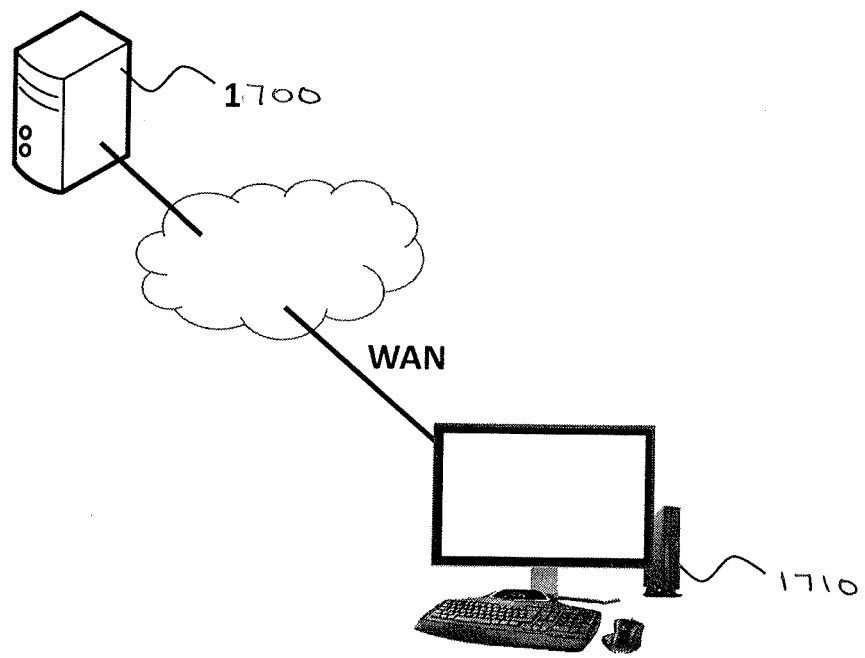
FIG. 17 shows an example of a cloudpaging.

FIG. 17 shows an example of a cloud server (1700) that serves games to a PC (1710), in accordance with some embodiments.

Figure 18:
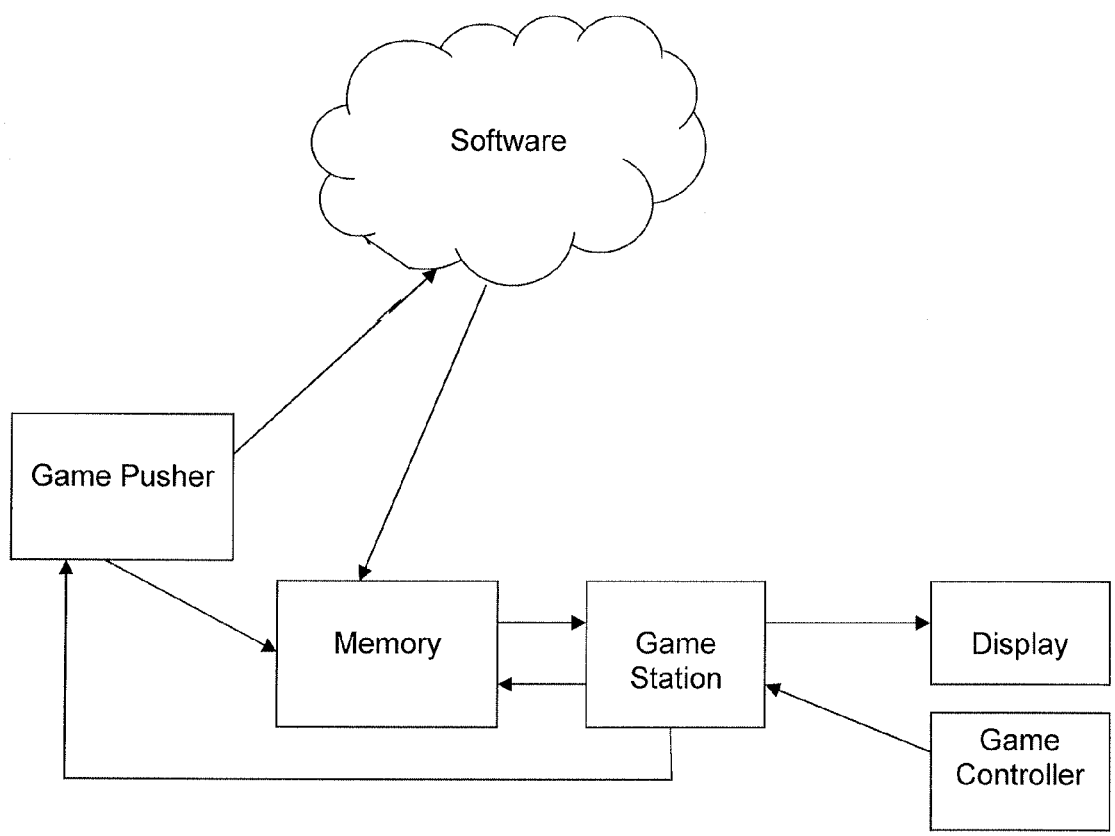
FIG. 18 shows an example of cloudpaging.

FIG. 18 shows an example of cloudpaging games to a game station. A game pusher controls software storage in the cloud to push Partials (or more) of games to a memory connected to at least one game station. The game pusher also, directly or indirectly, instructs the memory to accept the Partials (or more) from the software storage. Advantageously, the memory, and/or the connection between the memory and the game station, is disposed so that signals take a very brief time to travel between the memory and the game station. When a game is selected for play on the game station, if not all pages (or other software components) in the selected game are in the memory (or otherwise immediately available for execution by the game system), the game station (or, optionally, the memory) signals the game pusher to cause some or all of the remaining pages (or other software components) of the selected game to be streamed to the memory from the software storage during game play. The game pusher and/or the memory can also be configured so that the game pusher can instruct the memory to delete entire games, Partials, pages of games, and/or game components.

A license manager can be a component of the game pusher or may be a separate set of resources. For games with license control, the game pusher controls the license manager to allocate a license for a particular game to the game station on an appropriate event, e.g., on purchase or rental payment for the particular game from the game station or from a corresponding user account.

A display and a game controller are also connected to the game station. The game station can output content in a manner perceptible to a user on the display (e.g., video, aural or haptic output), and can accept input control (e.g., from a user) on a game controller (e.g., a mouse and keyboard combination, or a proprietary game controller). The game controller and display can optionally be integrated together.

The game station and/or the memory can be configured to send usage or purchase information to the game pusher for the purpose of, for example, improving predictive gaming for the game station or (or in addition) for other game stations served by the game pusher.

Figure 19:
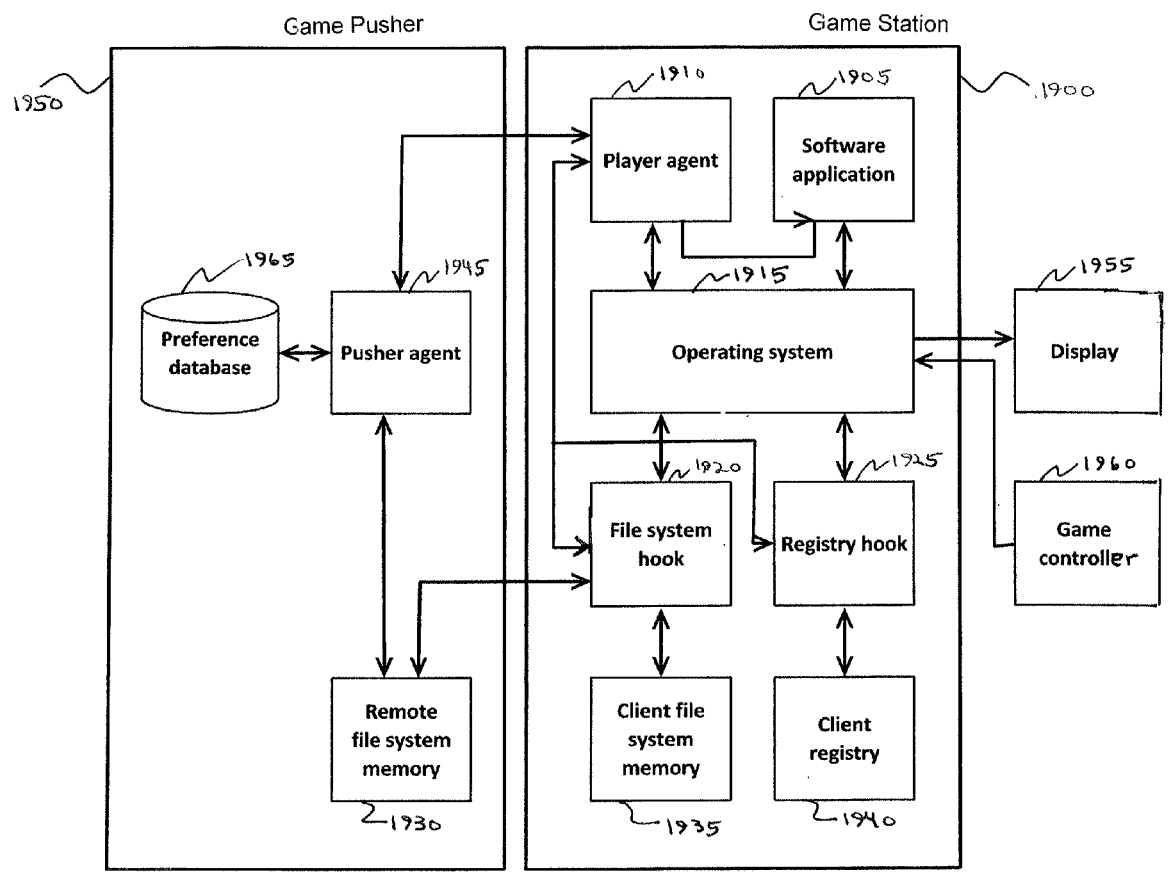
FIG. 19 shows an example of cloudpaging.

FIG. 19 shows an example of a software application execution environment with respect to a target device Game Station 1900 and a Game Pusher 1950. A Player Agent 1910 is employed to modify the Game Station environment to be able to execute a Software Application 1905 without installing it. In particular, the Player Agent 1910 configures a File System Hook (See reference numeral 1920 to intercept file system calls from the Operating System (See reference numeral 1915. The File System Hook 1920 augments a Client File System Memory (See reference numeral 1935 with a file system overlay that includes a Remote File System Memory 1930, and provides the Operating System 1915 with access (through the File System Hook) to the result. This allows the Software Application 1905 to be executed correctly without installation.

More specifically, a chain of File System Hooks is interposed between the Operating System 1915 and the Client File System Memory 1935. The File System Hooks take control of the file system calls. When called, the File System Hooks can perform one of four operations. First, the File System Hook can ignore the call and chain onto the next File System Hook in the hook chain. Second, the File System Hook can process the call and return the results directly to the Operating System 1915. Third, the File System Hook can change the call or make multiple calls to the Client File System Memory 1935 directly, and then return the results to the Operating System 1915. Lastly, the File System Hook can call down the hook chain and perform additional processing on the way back.

The Player Agent 1910 informs the File System Hook 1920 via a process database about the executing Software Application 1905 using the process identification assigned by the Operating System 1915. The Player Agent 1910 also informs the File System Hook 1920 about a token file which contains the file system paths and files (i.e. the file system overlay, which is essentially a private file system, since the File System Hook 1920 will only allow the Software Application 1905 to see it) through which files or pages of the Software Application can be accessed and which may include references to the Remote File System Memory 1930.

In some embodiments, this configuration of the File System Hook 1920 is implemented by the Player Agent 1910 modifying the process database to which both the Player Agent 1910 and the File System Hook 1920 have access. The File System Hook 1920 executes based on the contents of the process database.

The process database can be modified so that the File System Hook 1920 recognizes file system access requests from the Software Application 1905 to access information and file and directory structure in the overlay, and to (indirectly) access data from the Remote File System Memory 1930. For example, the File System Hook 1920 can be configured to access the Remote File System Memory 1930 (which holds files or portions of files containing data and program instructions, including, generally, a copy of the Software Application 1905) on behalf of the Software Application 1905 by a network file system driver via a data network.

Because the File System Hook 1920 is configured to grant visibility of/access to the file system overlay (as contained in the token file) only to the Software Application 1905 (more specifically, only to a process having the process ID of the Software Application 1905), other programs attempting to see information in the overlay will not be able to do so via the File System Hook 1920. For example, if a user attempts to use a different (e.g., conventionally installed) software application program to view the directory structure of the Game Station 1900, a file system call corresponding to the request will be generated by the Operating System 1915. However, because the File System Hook 1920 is not configured to grant visibility of the overlay other than to the Software Application 1905, the file system call will be passed by the File System Hook 1920 to the Client File System Memory 1935, which will return a view of the Game Station directory without the overlay information.

A Pusher Agent 1945 is also employed to push portions of the Software Application 1905 contained in the Remote File System Memory 1930 onto the Client File System Memory 1935 using information in a Preference Database 1965. The Preference Database 1965 can be used by the Pusher Agent 1945 to decide whether a particular Software Application 1905 which is not resident in the Client File System Memory 1935 would be desirable to (user(s) of) a particular Game Station 1900. Information from the Player Agent 1910, such as the current usage statistics of the Client File System 1935, can also be used in making this decision. If a particular Software Application 1905 is deemed desirable, the Pusher Agent 1945 pushes a token for the Software Application 1905 to the Player Agent 1910 and pushes an instruction to copy an immediately executable portion of the Software Application 1905 from the Remote File System Memory 1930 to the Client File System Memory 1935. Subsequent to the completion of this step, the Software Application 1905 can be immediately launched without requiring file system calls to the Remote File System Memory 1930 (file system calls to the Client File System Memory 1935 will generally be sufficient) for content corresponding to the immediately executable portion. Subsequent continued usage of the Software Application 1905 beyond the immediately executable portion can require the File System Hook 1920 to route calls to the Remote File System Memory 1930 and/or cause additional pages of the Software Application 1905 to be streamed to the Client File System Memory 1935.

A Display 1955 and Game Controller 1960 connected to the Operating System 1915 of the Game Station 1900 are used to enable the Software Application 1905 to be respectively displayed to and controlled by the user of the Game Station 1900.

By proceeding as described above, the File System Hook "mediates" execution of the Software Application. In general, the actions taken by an agent interposed between an operating system (or other agent controlling access to and allocation of hardware and/or software resources) and the hardware and/or resources corresponding to said operating system, where said actions effect virtualized execution of a software application using at least some of said resources, is defined herein as "mediating" execution of said software application.

In some embodiments, the Game Station can start the process of obtaining a Partial by pulling a Partial from the Game Pusher. This can be done without requiring user input. For example, if the Client File System Memory has sufficient space, the Player Agent can periodically check with the Game Pusher for additional Partials. These Partials can be filtered using selection heuristics available to the Player Agent, such as the application contents of a local applications library, or using a Preference Database (accessed remotely) in the cloud. The Player Agent then pulls one or more Partials that passed the filtration step into the Client File System Memory from a Remote File System Memory.

In some embodiments, the Game Pusher can push Partials in combination with the Game Station pulling partials.

Application Streaming Proxy Servers

In some embodiments, a target device serves an application, or portion of an application, it has received from a cloud server or a second target device, to another target device over a data network.

Figure 20:
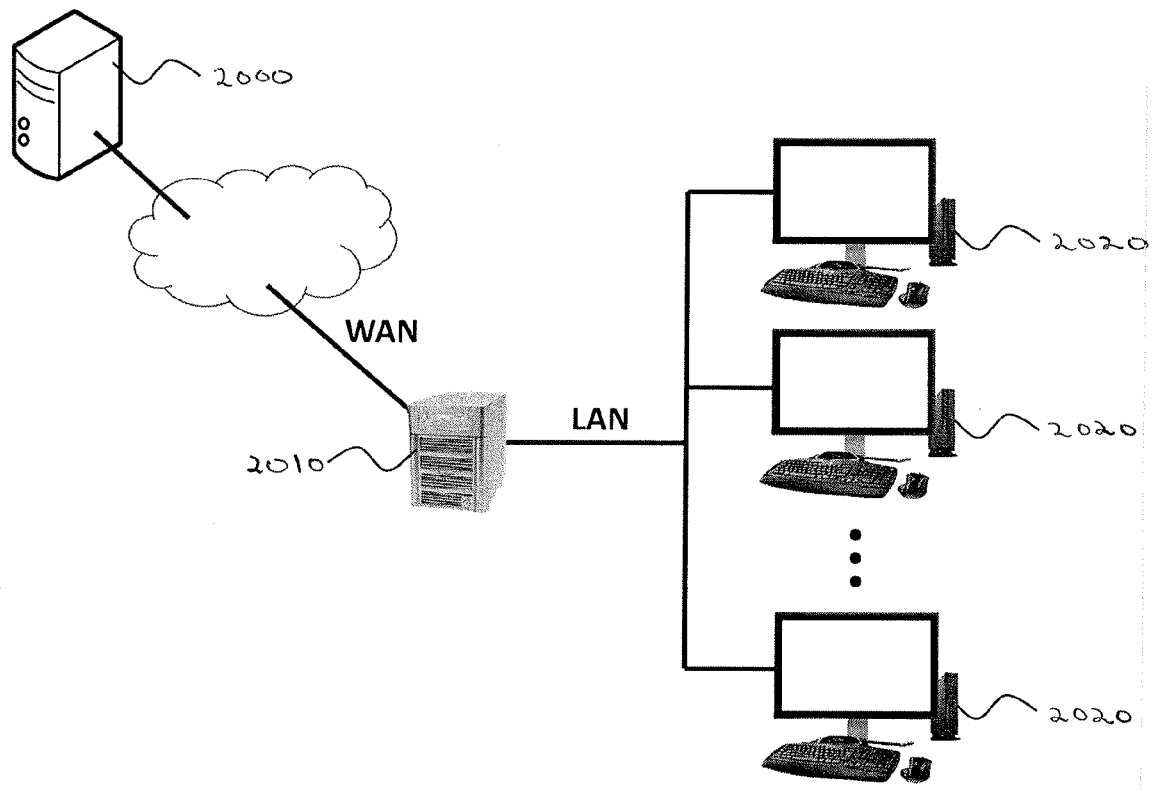
FIG. 20 shows an example of a target proxy device.

FIG. 20 shows an example of a target proxy device, such as a NAS drive (2010), serving games to multiple target rendering devices, such as PCs (2020), over a LAN, in accordance with some embodiments. Such embodiments are suited to environments such as Internet Cafes. Internet cafes may want to offer a large selection of games without having to install and upgrade them repeatedly on every PC (or other target device) in their network, and without having to stream them from the cloud for every PC. Instead, games can be delivered once from the cloud to a target proxy device, and subsequently delivered within the local network.

In some embodiments, even though at least a portion of application delivery is via an intermediary target device, license management is regulated from an Application Jukebox license service running on a cloud server. All end target devices continue to subscribe to licenses from an AJ cloud using a normal Application Jukebox protocol.

In some embodiments, the intermediary target device has the authority to issue licenses, using, for example, the system described in U.S. patent application 61/505,826.

In some embodiments, as shown in FIG. 20, the cloud server (100) is not aware of the target proxy device (2010). The cloud server pushes a Partial to the target rendering device (2020) in response to, for example, cloud based selection heuristics, or a request from the target rendering device (2020), or any combination of heuristics and request. The target proxy device (2010) intercepts the Partial from the cloud server (2000) and stores a local copy. The target proxy device can now serve the Partial to any connected target devices in the LAN. This method may be advantageous in scenarios where target rendering devices (2020) in a LAN are likely to require the same Partials, either because, for example, the same user operates multiple target devices, or the users of each target device have similar selection heuristics, or any combination. In another embodiment, a target rendering device (2020) copies all Partials it has obtained from a cloud server (2000) to all connected target proxy devices (2010) for the same aim.

Application Streaming Using Peer-to-Peer

Figure 21:
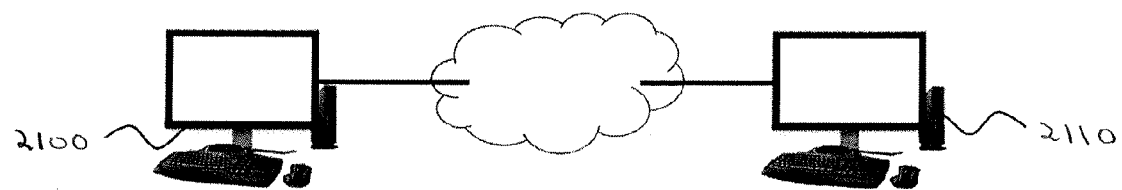
FIG. 21 shows an example of serving applications using P2P.

FIG. 21 shows an example of a PC (2100) serving games to another PC (2110) over a WAN using peer-to-peer ("P2P") technology, in accordance with some embodiments. In embodiments using an intermediate target proxy device, P2P, or a combination, a target device may need to perform a network discovery task to find available application sources.

In some embodiments, the target device pings the cloud server to see if it is accessible.

In some embodiments, the client software installed on a target device arrives coded with the locations of application sources.

Figure 22:
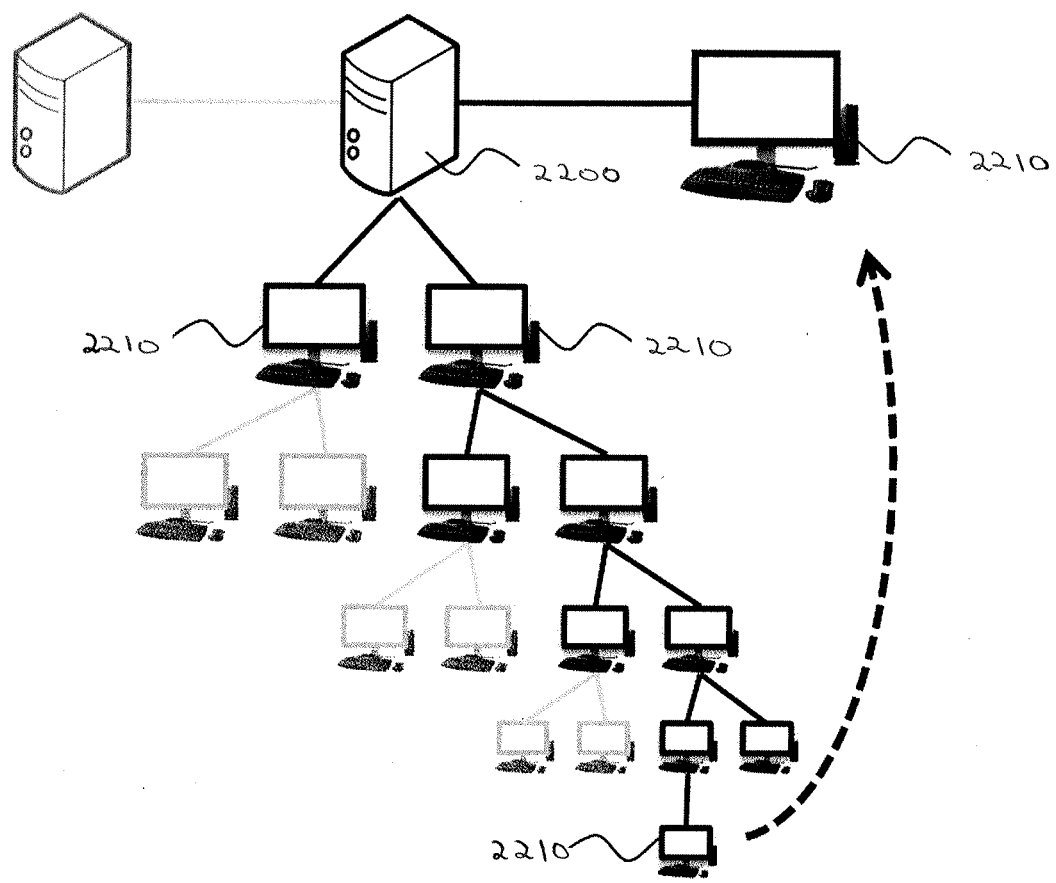
FIG. 22 shows an example of serving applications using P2P.

FIG. 22 shows an example of serving applications using P2P technology, in accordance with some embodiments. When a user installs the Application Jukebox client on a target device (2210), it comes coded with a list of cloud server addresses. Every time the target device (2210) wishes to launch an application, it registers with one of the cloud servers (2200), obtains a license, and sends a request for application pages. The cloud server (2200), which may communicate with other cloud servers, in turn connects to a number of target devices (2210), which in turn connect to even more target devices. The request is propagated through the network until either the correct set of pages is located, or until the request has been forwarded more than a threshold number of levels. If the correct set of pages is found, it is transferred directly using HTTP from the owner target device (2210) to the requestor target device (2210), and does not go through the cloud server (2200). If the correct set of pages is not found, the cloud server (2200) supplies them directly to the requestor target device (2210).

Figure 23:
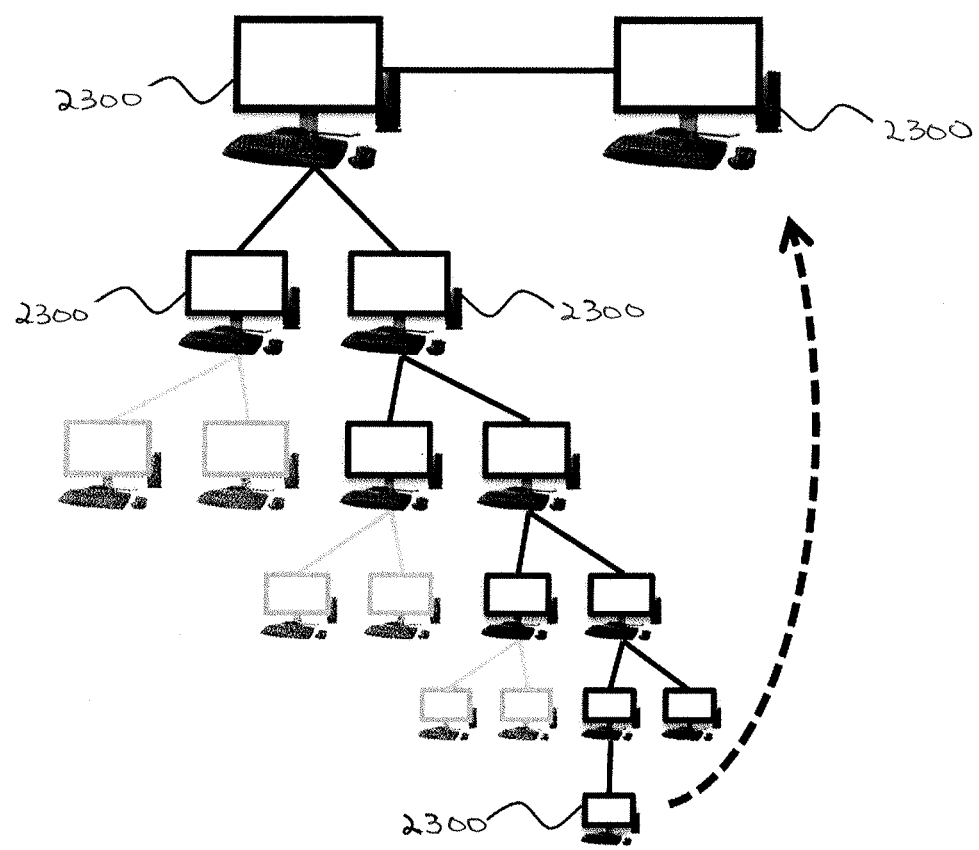
FIG. 23 shows an example of serving applications using P2P.

FIG. 23 shows an example of serving applications using P2P technology, in accordance with some embodiments. This embodiment serves applications that do not use license protection using P2P technology, without the need for a cloud server. When a user installs the Application Jukebox client on a target device (2300), it comes coded with a list of "super-node" target device addresses. Every time the requesting target device (2300) wishes to launch an application, it registers with one of the super-node target devices (2300), and sends a request for application pages. The super-node target device (2300), which may communicate with other super-node target devices, in turn connects to a number of regular target devices (2300), which in turn connect to even more target devices. The request is propagated through the network until either the correct set of pages is located, or until the request has been forwarded more than a threshold number of levels. If the correct set of pages is found, it is transferred directly using HTTP from the owner target device (2300) to the requestor target device (2300), and does not go through the super-node target device (2300). If the correct set of pages is not found, either the request for pages fails, or the pages can alternatively be delivered by cloudpaging from a cloud server as shown in (for example) FIG. 17.

Automatic Library Populating

In some embodiments, the library of games or other applications on a target device is automatically maintained by a cloud server.

In some embodiments, the cloud server chooses applications using selection heuristics and pushes corresponding Partials to one or more target devices. Selection heuristics may favor, for example, the sequel to a game that is already in a user's library; a different episode or level of a previously purchased game of the user; games belonging to a franchise that the user has previously made purchases from; games belonging to a specific game provider, publisher or developer; games similar to those previously played, downloaded or purchased by the user; games suggested by information available from a user's social network profile; games suggested by a user's behavioral history on websites such as shopping platforms; games recommended by other users; games selected for other users with similar preferences; or highly rated games. Selection heuristics may also be biased towards selection of games or other applications as paid or otherwise contracted for by a publisher, retailer, developer, or other third party.

Currently, while a user is shopping and browsing on a shopping portal, his or her movements and user initiated events are closely tracked. For example, as described in U.S. Pat. No. 7,337,127, one common approach creates a log entry each time a user clicks through a displayed advertisement. These events can be tracked through server-based programs and/or software executing on a user's target device. Such captured information can be routed to a central database, where it is stored and analyzed together with the user's profile, which can also include initial survey responses provided by the user during registration.

As described in U.S. Pat. Nos. 5,515,098 and 6,216,129, statistical information from a user's events and/or profile can be compared to statistical information collected from customers of particular products to determine the applicability of the products to the user. This technology ('preference tracking') can be used to, for example, propose games or other applications that are similar or complementary to those previously purchased, placed in a basket, placed in a favorites list, or browsed by a potential customer. In some embodiments, preference tracking technology is used to automatically decide which set of one or more Partials are pushed from a cloud server to a target device.

Figure 24:
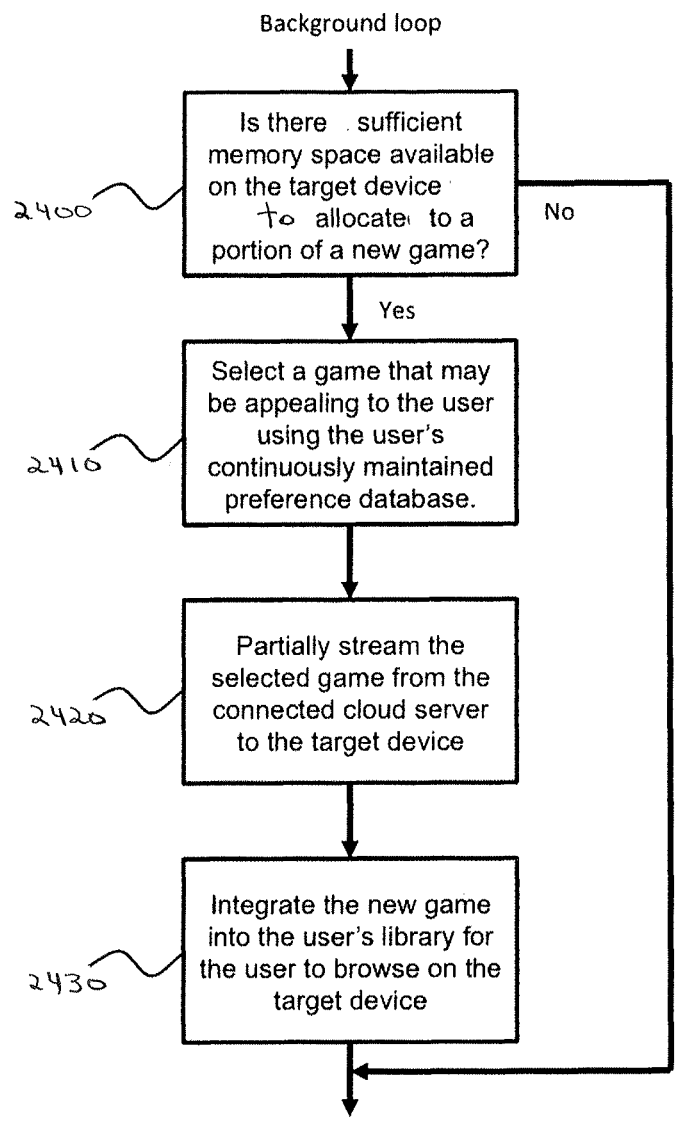
FIG. 24 shows an example of automatic library maintenance.

FIG. 24 shows an example of automatic library maintenance. A cloud server continuously monitors the available storage space on a target device (2400). If there is sufficient allocated memory available, then the cloud server chooses a game, with or without explicit request—or any action at all—by a user. The choice can be based on, for example, selection heuristics (2410). The cloud server initiates delivery of a Partial corresponding to the chosen game to the target device (2420). The delivered Partial is then integrated into the local library of the target device to appear as if the game is stored fully locally (2430).

Figure 25:
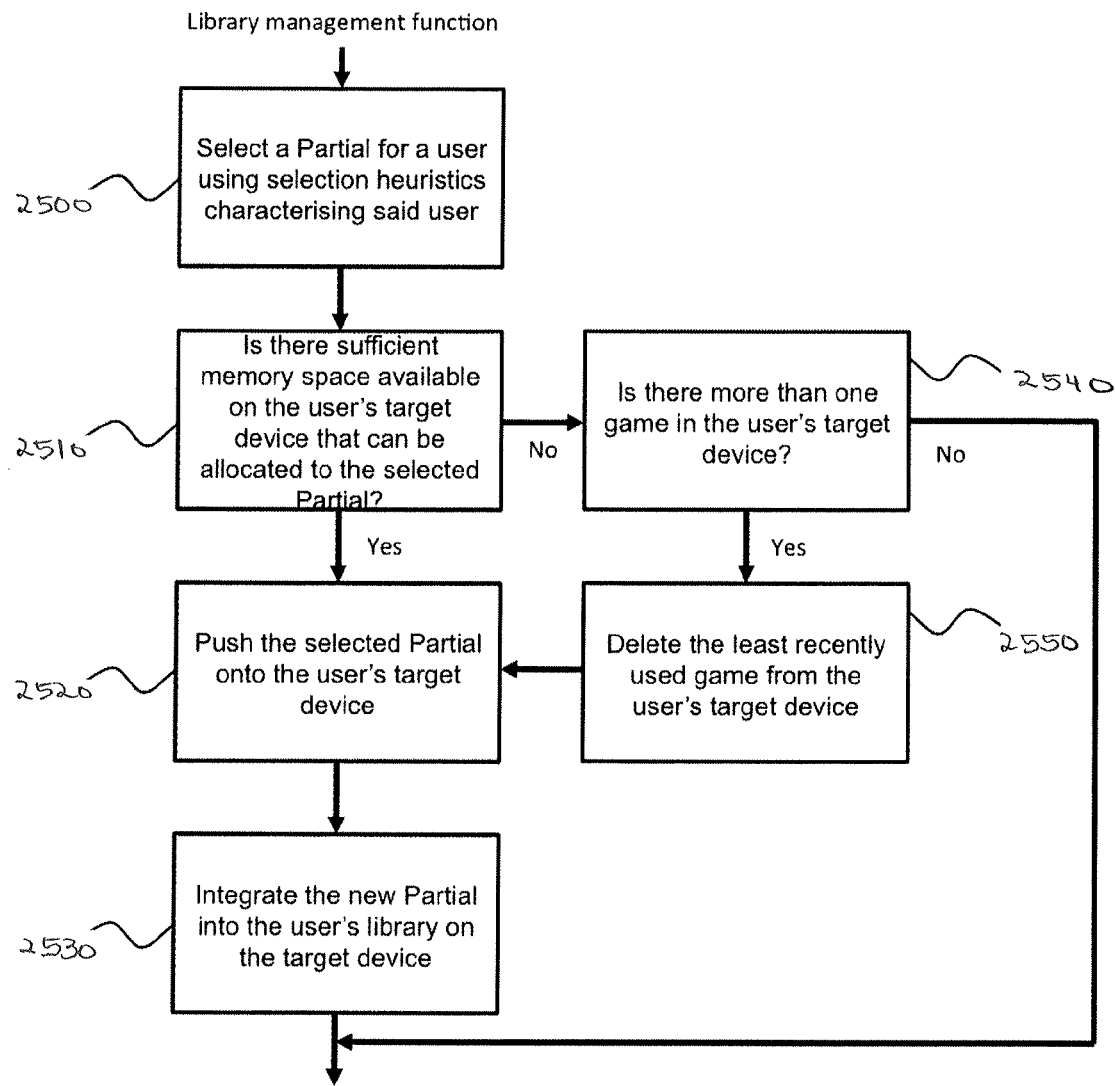
FIG. 25 shows an example of automatic library maintenance.

FIG. 25 shows another example of automatic library maintenance. A cloud server continuously monitors selection heuristics associated with a user and accordingly selects a new game Partial at an estimated optimum timing (2500). The cloud server monitors available storage space on the user's target device (2510). If there is sufficient allocated memory available for the selected Partial, then the cloud server pushes the selected Partial onto the available space on the user's target device (2520), and integrates the pushed Partial into the user's library (2530).

If there is insufficient allocated memory available for the selected Partial, the cloud server queries the number of games in the user's target device's library (2540). If more than one game exists, the entirety or portion of the least recently used game is deleted from the target device to free memory space (2550). Once sufficient free space is made available on the target device, the server proceeds with pushing (2520) and integrating (2530) the selected Partial into the user's target device library. In some embodiments, only games older than a given threshold duration can be automatically deleted in step (2550).

In some embodiments, the user is prompted for approval before any server-specified deletion takes place.

In some embodiments, different criteria are used to determine which game can be deleted. Deletion criteria can include, for example, the amount of memory used by a game; whether the game as resident in memory is a Partial, full game, or in-between; the duration since the game was first added to the library; the duration since last launch of the game; the number of times the game has been played; and whether the game has been superseded by a newer sequel or version.

In some embodiments, automatic library maintenance is accomplished using device specific depositories in the cloud. A depository is a virtual environment instantiated in the cloud and representing an individual target device. The depository, which is accessible by the cloud server, can be populated with the same applications and Partials as its paired target device. Advantageously, the contents of the depository are continuously made to replicate those of the target device. This can be achieved by, for example, replicating modifications to the target device in the depository, or by replicating modifications to the depository in the target device, or a combination of both. A combination replication technique may involve, for example, replicating the latest modifications in either environment in the other. Use of a depository enables a cloud server to have continuous and fast access to the status of a target device's application library.

In some embodiments, where a target device replicates a depository, the depository is populated with a set of applications that, when delivered in their entirety, would not fit in an allocated memory capacity of the paired target device. For example, the depository library may be populated with all of a user's previously selected applications and/or applications chosen using selection heuristics. Applications, or Partials of applications, may be pushed from a depository to a paired target device.

In some embodiments, the most recently used applications from the depository are kept on the paired target device in their entirety (enabling full offline access), and less recently used applications are resident only as a partial on the target device.

In some embodiments, an individual depository has a smaller memory footprint than its paired target device. For example, where a depository contains applications also contained by other depositories, duplicate applications or Partials may be stored in a central repository, and links placed in the depositories pointing to the respective duplicate applications on the central repository.

In some embodiments, automatic library maintenance is accomplished using cloud depositories that are paired with individual users instead of individual target devices. For example, where a user may utilize more than one target device, each of these target devices may pair with and replicate applications, or Partials of applications, with a common depository. In another embodiment, where a target device permits multiple users to access their own segregated user environments, each user environment may pair and replicate applications, or Partials of applications, with a different depository.

In some embodiments, a depository is used to assist application redelivery.

In some embodiments, a target proxy device performs automatic library maintenance, in addition to the automatic library maintenance performed in the cloud server.

FIG. 20 shows an example of a cloud server (2000) that can perform automatic library maintenance remotely for an NAS drive (2010) using combined selection heuristics of the group of users on target rendering devices (2020). This step ensures, for example, that Partials of new games that are likely to interest users within a home are available over the home LAN. The NAS drive acts as the access point for the target rendering devices (2020) to access applications on a day-to-day basis. The NAS drive (2010), in turn, concurrently performs automatic library maintenance for the locally connected target rendering devices (2020). If one of said target rendering devices has sufficient free allocated memory space, the NAS drive pushes one or more Partials onto the target rendering device, with or without selection heuristics (i.e., with or without the benefit of preference tracking) of the user of said target rendering device.

Episodic Content Delivery

In some embodiments, a game is served from the cloud server to a target device on an "episode-by-episode" basis using Application Jukebox. Application Jukebox has the ability to run virtualized games not only in an isolated mode, but also in integrated, or partially integrated, modes. In integrated modes, layers within the virtualized game are allowed to communicate with other processes on the operating system. With enterprise software, this allows optional plug-ins to be streamed separately to the main application, but still work together as if they had been streamed in one package. Similarly, for games, this allows different episodes, levels, entire games or other portion sizes of content to be streamed independently. The core game engine only needs to be delivered once, and episodes delivered at different times will fully function with the engine.

Partials of subsequent episodes or of downloadable content ("DLC") can be chosen by the cloud server for pushing to a target device. DLC comprising an expansion of a game (or Partial or other portion of the game) already present on a target device can be integrated into the game (or Partial or other portion of the game) so that, during gameplay of the game, a portion of the content of the DLC corresponding to its Partial can be played as context-appropriate within the game. A user may be prompted for purchase (or other payment model or fulfillment of requirement for license application) of the DLC during gameplay of its corresponding Partial (if appropriate). Alternatively, gameplay of a Partial corresponding to a DLC can automatically trigger payment based on a user's payment information on file.

Other Features of Application Streaming of Games

In some embodiments, as shown in FIG. 20, a target rendering device (2020) identifies a request for a new Partial in response to user input, such as completion of an episode of a game, an eCommerce store purchase, or the entry of new survey responses. The target device queries the available application sources for the Partial using a hierarchy defined by a weighting, which can be based on, for example, availability, ping time and the current loading of the application source (how much load the application source is handling). In this case, the target rendering device (2020) will most likely first look for the Partial in the LAN connected NAS drive (2010), before falling back onto the (likely) slower WAN connected cloud server (2000).

Figure 26:
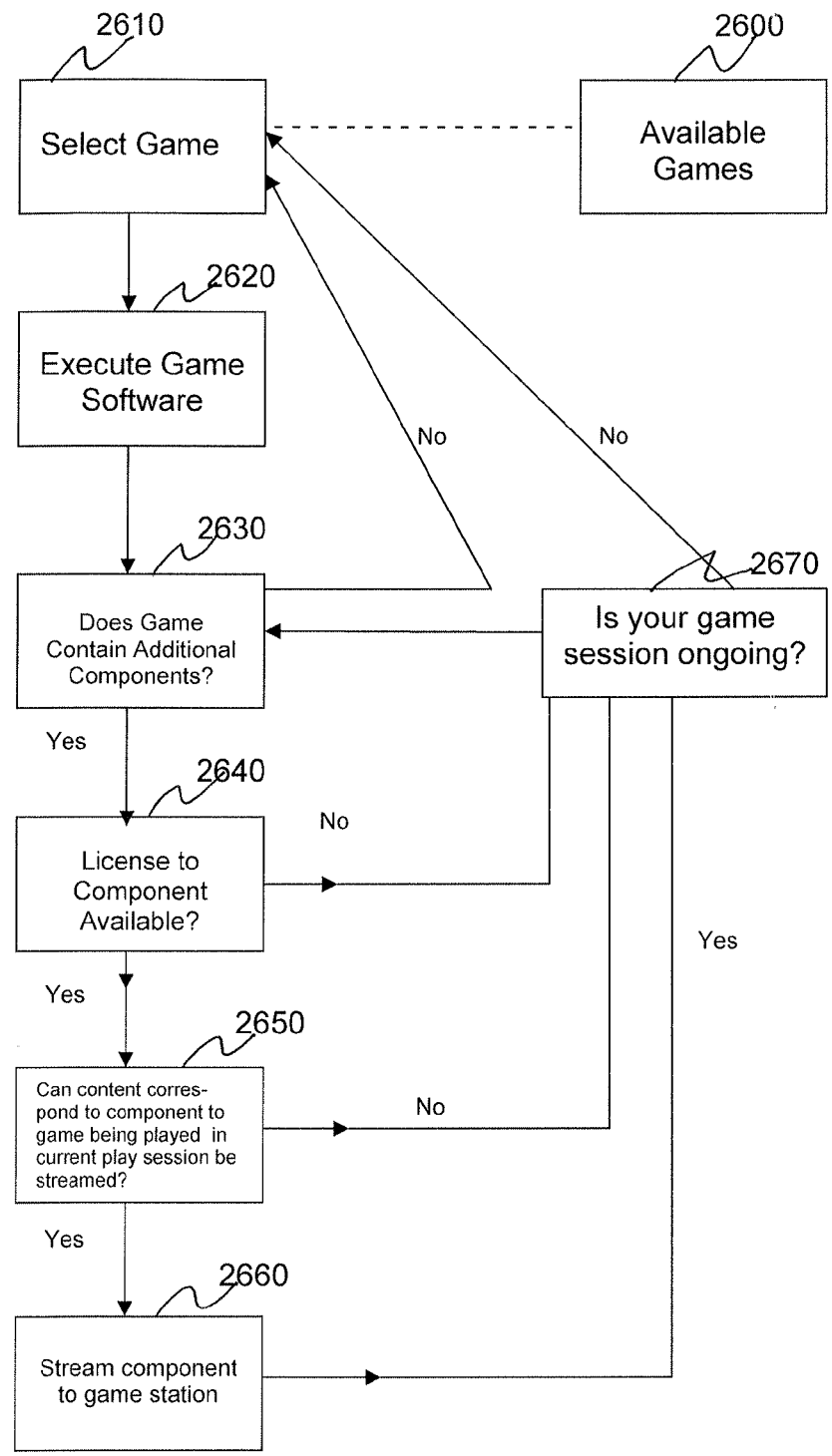
FIG. 26 shows an example of cloudpaging.

FIG. 26 shows an example of cloudpaging games. A user selects a game to play on a target rendering device. The target rendering device executes corresponding game software, which can be a Partial, a Partial plus some additional components (e.g., pages) or a complete game. If the game comprises additional components not currently resident in memory or otherwise quickly accessible by the target rendering device (the memory may or may not be integrated into—or even physically near—the target device), the target rendering device causes a signal to be sent to a game pusher requesting one or more of the non-resident additional components to be sent to the memory and/or target device. If the user and/or the target rendering device has license rights to the additional components, and if content corresponding to the additional components can be used during the current play session, then the game pusher causes the additional components to be streamed to the target rendering device. While the selected game continues to be played, the target rendering device continues to request additional components that may be needed during play that are not already being streamed or otherwise quickly accessible to the target rendering device. Requested additional components can include DLC or other add-ons or mods (user or official game modifications), or pages or Partials thereof.

FIG. 27 shows an example of a graphical user interface of a user's library (2700) on a target device containing four games (2710)-(2740). Games (2710) and (2720) are Partials that have been pushed from a cloud server to the user's target device and integrated into the user's local library to encourage the user to run the Partials as demos for the corresponding games. The Partials contain minimum pages required to launch the games, with any further required pages streamed on demand from the cloud server.

In some embodiments, licenses for Partial demos can be time-limited to enable the user to play for free for a predefined time period, after which a payment transaction is required for further play. Games (2730)-(2740) are previously purchased or rented games, or games that are available through an ongoing subscription service. Game (2730) comprises a Partial plus 50% of the remaining Body page segments, whereas game (2740) comprises the full game and can be played in its entirety offline, if the corresponding license permits.

In some embodiments, Partials are added from a cloud server to a target device in response to one or more requests made from the target device to the cloud server.

In some embodiments, the user of a target device may request a Partial of a game to demo the product.

Advantageously, in some embodiments, the contents of a Partial can be adapted to match characteristics of a target device. For example, target devices with slow network connections can have insufficient bandwidth for on-demand cloudpaging to deliver application pages with acceptable speed, in which case a game pusher can deliver a Partial that contains a larger portion of an application. A Partial can also be adapted in accordance with allocated memory or other hardware capacity of the target device. For example, high resolution textures can not be included in a Partial that is delivered to a target device with low memory. High resolution textures also may not be included in a Partial that is delivered to a target device with limited graphics capability. A Partial can also be adapted in accordance with license characteristics. For example, if a given license only permits a game to be played (e.g., for demo purposes) until the end of an introductory tutorial section, other portions of the game beyond the tutorial may not need to be included in a corresponding Partial.

In some embodiments, player software is required on the target device to stream virtualized games, where the streaming client is obtained by means of a digital download, and said streaming client arrives bundled with one or more Partials to the target device.

In some embodiments, a cloud server scans a target device, detects existing installed games, and automatically delivers Partials of said games to the target device with corresponding license keys.

In some embodiments, delivery of Partials of existing installed games occurs in response to user commands.

In some embodiments, Partials are broadcast to one or more target devices using one or more multicast packets.

Software-based gaming is an enormous global market. This market is driven heavily by instant gratification for the customers. The core set of players are predominantly (approximately) 12-35 year old males. Purchases are often impulsive.

Flagship ("AAA") game titles are advertised months—or even years—in advance, at trade shows and in online trade publications, to build up favorable advance notices. AAA title release week sales numbers are closely watched precisely because electronic gaming, regardless of platform, is so oriented towards instant gratification and the buildup towards a must-have purchase. Just as importantly for smaller-budget (often cheaper) titles, the ability to provide gamers a true impulse purchase that can be immediately played is critical to generating word-of-mouth leading to a wider audience. Gamers are, by the quickfire, rapid-reward nature of the pastime, an impatient group with a short attention span, and the faster that software can be loaded to a playable state on a gaming device, the more likely a gamer is to still feel like playing when the game is ready. The numerous inventions disclosed herein, and their various combinations, make the loading time to a playable state on gaming devices effectively zero. This provides enormous advantages for software makers generally, and most especially for gaming software. Gaming software, in this respect, is notably different from other software.

According to some but not necessarily all embodiments, there is provided: A method for providing a remote gaming service, comprising the actions of: when a user selects a particular game from available games on a game station, a) executing software corresponding to said particular game, said particular game being initially playable without download immediately following said selecting; and if said particular game comprises additional components not immediately playable without download, b) streaming over a network to said game station at least one of said additional components, said streaming beginning contemporaneously with and continuing at least partially concurrently with said executing.

According to some but not necessarily all embodiments, there is provided: A method for managing remote gaming, comprising the actions of: using a game pusher to push software over a network to a game station, said software corresponding to games chosen to be available for play on said game station, said software being initially playable without download immediately after selection using said game station, said game station being physically separated from said game pusher; and when a user selects a particular game for play, if said particular game requires additional components to provide aspects of said particular game available to a user upon selection but said additional components are not immediately playable without download, using said game pusher to control streaming to said game station of said additional components, said streaming beginning contemporaneously with said selection and continuing at least partially concurrently with said play.

According to some but not necessarily all embodiments, there is provided: A remote game push control system, comprising: a) a plurality of software-implemented games, at least one of said games comprising an immediately initially playable portion and at least one additional component separately transmissible from said portion, said components being integral to extended play of corresponding ones of said games; and b) a game pusher which: pushes portions of at least one of said games over a network to a game playing station, said portions of games including at least said immediately initially playable portions, said game playing station being physically separated from said game pusher; when a particular game is selected to be played on said game playing station, if respective components corresponding to said particular game are not immediately playable without download, streams at least one of said respective components to said game playing station.

According to some but not necessarily all embodiments, there is provided: A game playing system, comprising: a) at least one game input unit and at least one display; b) a stored list of games which receives, without instruction from a user, at least immediately initially playable portions of games in said list of games over a network from a game pusher, said list of games not being resident in game pusher; and c) a game player station, which: when a particular game is selected from said list of games, playably executes said immediately initially playable portion of said particular game from said list of games; if said particular game is not present in said list of games as a complete game, signals said game pusher and receives from said game pusher at least one additional component of said particular game into said list of games; interactively applies inputs from said game input unit to said particular game; sends output from said particular game to said display.

According to some but not necessarily all embodiments, there is provided: A method for locally managing cloud gaming where at least one user is playing on a game station, comprising: intercepting, by a local manager, local and remote file system calls with respect to available games on the game station, said local manager being operatively interposed between a file system and an operating system of said game station, said available games being immediately initially playable on the game station; selectively allowing interaction between local and remote file system calls and an execution state or a memory state of said available game; when the user selects a particular available game for play, executing, by said local manager, software corresponding to said particular game, said particular game being initially playable immediately following said selecting; if said particular game comprises additional components not resident in a memory of said game station at said time, transmitting, by said local manager, information relating to the user's activity over a network to a game pusher; and receiving from said game pusher, by said local manager, streamed additional components of said particular game, said streaming beginning contemporaneously with and continuing at least partially concurrently with said executing.

According to some but not necessarily all embodiments, there is provided: A system for locally managing cloud gaming on at least one game station, comprising: a plurality of games, at least one of said games comprising an immediately initially playable portion and at least one additional component separately transmissible from said portion, said components being integral to extended play of corresponding ones of said games; and a local manager, said local manager operatively interposed between a file system and an operating system of the game station, which: intercepts local and remote file system calls with respect to at least one available game on the game station; selectively allows interaction between local and remote file system calls and an execution state or a memory state of said available game; when a user selects a particular available game for play on the game station, mediates execution of software corresponding to said particular available game, said particular available game being initially playable immediately following said selecting; if respective additional components corresponding to said available game are not present in said memory, transmits a signal to a game streamer and receives from said game streamer a stream comprising at least one of said respective additional components.

According to some but not necessarily all embodiments, there is provided: A method for providing a remote gaming service, comprising the actions of: a) downloading over a network to a game station, without explicit user designation, at least an initially immediately playable portion of at least one game, said game being chosen at least partially in dependence on at least some of: usage information of said game station, usage heuristics of said game station, current and prior amounts of storage used of said game station, and available bandwidth; when a user selects a particular game from said downloaded games, b) executing software corresponding to said particular game and resident in said game station at a time of said selection, said particular game being initially playable immediately following said selecting; and if said particular game comprises additional components not resident in said game station at said time, c) streaming over a network to said game station at least one of said additional components, said streaming beginning contemporaneously with and continuing at least partially concurrently with said executing.

According to some but not necessarily all embodiments, there is provided: A game playing system, comprising: a) at least one game input unit and at least one display; b) software comprising at least immediately initially playable portions of at least one game downloaded over a network, without explicit user designation, from a game supplier, said software not being resident in said game supplier, said game being chosen at least partially in dependence on at least some of: usage information of said game station, usage heuristics of said game station, current and prior amounts of storage used of said game station, and available bandwidth; c) a game player station, connected to execute said software, which: when a particular game is selected from said software, playably executes from said software said immediately initially playable portion of said particular game; if said particular game is not present in said software as a complete game, signals said game supplier and receives from said game supplier at least one additional component of said particular game into said software; interactively applies inputs from said game controller to said particular game; and sends output from said game to said display.

According to some but not necessarily all embodiments, there is provided: A method for providing a remote gaming service, comprising the actions of: a) collecting user preference data using a game station and a push controller, said user preference data comprising at least some of: usage information of said game station, usage heuristics of said game station, current and prior amounts of storage used of said game station, and available bandwidth; b) downloading by said game station from said push controller or pushing by said push controller to said game station, without explicit user designation, at least an initially immediately playable portion of at least one game, said game being chosen at least partially in dependence on said user preference data; when a user selects a particular game from said downloaded or pushed games, c) executing software corresponding to said particular game; and if said particular game comprises additional components not immediately available for execution by said game station without downloading, d) streaming over a network to said game station at least one of said additional components, said streaming beginning contemporaneously with and continuing at least partially concurrently with said executing.

According to some but not necessarily all embodiments, there is provided: A method for providing a remote gaming service proxy, comprising the actions of: using an appfeeder, supplying software over a network to a proxy game pusher, said software corresponding to games chosen to be available for pushing on said proxy game pusher, said software comprising at least immediately initially playable portions of said games, said proxy game pusher being physically separated from said appfeeder; pushing software over a network, directed by said proxy game pusher, to a game station, said software corresponding to games chosen to be available for play on said game station, said software being initially playable without download immediately after selection using said game station; and streaming to said game station additional components of a particular game selected for play using said game station, if said particular game requires said additional components to provide aspects of said particular game available to a user upon selection and said additional components are not immediately playable without download, said additional components being streamed by said proxy game pusher if resident in said proxy game pusher, and caused to be streamed by said appfeeder if said additional components are not resident in said proxy game pusher, said streaming by said proxy game pusher or caused by said game pusher beginning contemporaneously with said selection and continuing at least partially concurrently with said play.

According to some but not necessarily all embodiments, there is provided: A system for managing application distribution, comprising: one or more global appfeeders, ones of said global appfeeders controlling at least some of application downloading and permission allocation to ones of at least one group pagefeeders; and said group pagefeeders controlling at least some of application pagefeeding and permission allocation to ones of a plurality of clients.

According to some but not necessarily all embodiments, there is provided: A method for managing application distribution, comprising: a) controlling, using one or more global appfeeders, at least some of application downloading and permission allocation to ones of one or more group pagefeeders; and b) controlling, using said group pagefeeders, at least some of application pagefeeding and permission allocation to ones of a plurality of clients.

According to some but not necessarily all embodiments, there is provided: A system for managing license service failover in an application distribution network, comprising: one or more global appfeeders, ones of said global appfeeders controlling at least some of application downloading and permission allocation to ones of at least one group pagefeeders; ones of said group pagefeeders controlling at least some of application pagefeeding and permission allocation to ones of a plurality of clients; and at least one sync agent communicating permission allocation information among group pagefeeders; wherein, when communications between a particular client and a particular group pagefeeder currently controlling at least some application pagefeeding or allocating permissions to said particular client fail, at least one of any available communicating group pagefeeders assumes control of at least some corresponding application pagefeeding and permission allocation for said particular client.

According to some but not necessarily all embodiments, there is provided: A method for managing license service failover in an application distribution network, comprising: a) controlling, using at least one global appfeeder, at least some of application downloading and permission allocation to ones of a at least one group pagefeeders; b) controlling, using ones of said group pagefeeders, at least some of application pagefeeding and permission allocation to ones of a plurality of clients; and c) communicating permission allocation information, using at least one sync agent, among group pagefeeders; wherein, when communications between a particular client and a particular group pagefeeder currently controlling at least some application pagefeeding or allocating permissions to said particular client fail, at least one of any available communicating group pagefeeders assumes control of at least some corresponding application pagefeeding and permission allocation for said particular client.

According to some but not necessarily all embodiments, there is provided: A system for managing application distribution, comprising: at least one global appfeeder, ones of said global appfeeders controlling at least some of application pagefeeding and permission allocation to ones of a plurality of group pagefeeders; and ones of said group pagefeeders controlling at least some of application pagefeeding and permission allocation to ones of a plurality of clients; wherein at least some particular applications are virtualized before pagefeeding to said group pagefeeders, and permissions are applied to corresponding particular applications after pagefeeding of said corresponding particular applications to said group pagefeeders.

According to some but not necessarily all embodiments, there is provided: A method for managing application distribution, comprising: a) controlling, using at least one global pagefeeder, at least some of application pagefeeding and permission allocation to ones of a plurality of group pagefeeders; and b) controlling, using ones of said group pagefeeders, at least some of application pagefeeding and permission allocation to ones of a plurality of clients; wherein at least some particular applications are virtualized before pagefeeding to said group pagefeeders, and permissions are applied to corresponding particular applications after pagefeeding of said corresponding particular applications to said group pagefeeders.

According to some but not necessarily all embodiments, there is provided: Methods and systems for remotely provisioning immediately executable games with license control in secure environments. Immediately initially executable portions of games are pushed onto user desktops, and when games are selected for play, additional components of selected games are streamed to said desktops.

According to some but not necessarily all embodiments, there is provided: Methods and systems for remotely provisioning immediately executable applications with license control in secure environments. Immediately initially executable portions of applications are pushed onto user desktops, and when applications are selected for use, additional components of selected applications are streamed to said desktops.

According to some but not necessarily all embodiments, there is provided: Methods and systems for remotely provisioning applications from the cloud in secure environments with robust license control failover options using a hierarchical server topology. Cloud-based servers provide applications and licenses to an organization's local servers, which in turn serve applications and licenses to end user devices. By synchronizing information including license and application provision information among the local and cloud-based servers, an organization's local servers can continue to serve applications and licenses when one or more of the organization's local servers fail.

According to some but not necessarily all embodiments, there is provided: A method for providing a remote software service, comprising the actions of: a) selecting a particular application from available applications on an application station; b) executing software corresponding to said particular application, said particular application being initially executable without download immediately following said selecting; and, if said particular application comprises additional components not immediately playable without download, c) streaming over a network to said memory at least one of said additional components, said streaming beginning contemporaneously with and continuing at least partially concurrently with said executing.

According to some but not necessarily all embodiments, there is provided: A method for remote application management, comprising the actions of: pushing software over a network, directed by an application pusher, to an application station, said software corresponding to applications chosen to be available for play on said application station, said software being initially playable without download immediately after selection using said application station, said application station being physically separated from said application pusher; and streaming to said application station from said application pusher additional components of a particular application selected for execution using said application station, if said particular application requires said additional components to provide aspects of said particular application available to a user upon selection but said additional components are not immediately executable without download, said streaming beginning contemporaneously with said selection and continuing at least partially concurrently with said execution.

According to some but not necessarily all embodiments, there is provided: A method for managing remote gaming, comprising the actions of: a) using one or more global appfeeders to control at least some of game downloading and permission allocation to ones of one or more game pushers; b) using said game pushers to push software over a network to a game station, said software corresponding to games chosen to be available for play on said game station, said software being initially playable without download immediately after selection using said game station, said game station being physically separated from said game pusher; and when a user selects a particular game for play, if said particular game requires additional components to provide aspects of said particular game available to a user upon selection but said additional components are not immediately playable without download, c) using said game pushers to control play of said particular game based on an allocation state and parameters of corresponding permissions; and d) using said game pushers to control pagefeeding to said game station of said additional components, said pagefeeding beginning, if allowed by respective permissions, contemporaneously with said selection and continuing at least partially concurrently with said play.

According to some but not necessarily all embodiments, there is provided: A remote game push control system, comprising: a) a plurality of software-implemented games, at least one of said games comprising an immediately initially playable portion and at least one additional component separately transmissible from said portion, said components being integral to extended play of corresponding ones of said games; and b) one or more global appfeeders, ones of said global appfeeders controlling at least some of game downloading and permission allocation to ones of one or more game pushers; and c) said game pushers, which: push portions of at least one of said games over a network to a game playing station, said portions of games including at least said immediately initially playable portions, said game playing station being physically separated from said game pushers; when a particular game is selected to be played on said game playing station, control play of said particular game based on an allocation state and parameters of corresponding permissions, and if respective components corresponding to said particular game are not immediately playable without download, and if allowed by respective permissions, pagefeed at least one of said respective components to said game playing station.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

In some embodiments, functions corresponding to Application Jukebox services can be divided up into a different number or different arrangement of services.

In some embodiments, license types can be divided into a different number or different arrangement of permission types.

In some embodiments, one or more of the local boxes or target devices in a local network can be preloaded with a list of application sources.

In some embodiments, local boxes or target devices can supplement a resident list of application sources with any additional application sources known by ADN components with which the local boxes or target devices communicate.

In some embodiments, a local box (or local boxes) can be assigned to as the primary local box of a group of users, group of target devices, or a mix.

In some embodiments, users and/or target devices can be dynamically allocated to local boxes on connection to the local network.

In some embodiments, the ADN cloud can not be included in the set of devices synchronized by a sync agent.

In some embodiments, when one or more local boxes is offline, the number of license seats allocated for provisioning by at least some of the remaining local boxes is less than the total number of license that were available for provisioning immediately prior to loss of communications divided by the number of remaining local boxes.

In some embodiments, local portal functions use different processing resources from at least some other local box functions, so that a local box being under heavy load or offline does not necessarily mean that a corresponding local portal is heavily loaded or offline.

In some embodiments, communication among local boxes may not be transitive.

In some embodiments, not all local boxes that communicate with each other may be able to serve all target devices served by each other local box.

In some embodiments, an ADN local network can be served by multiple ADN clouds.

In some embodiments corresponding to FIG. 19, the network file system driver can instead be a CD-ROM file system driver (or other removable-memory driver) that accesses files or portions of files from a CD-ROM drive (or other removable memory device) that is connected locally to the client terminal, where the File System Hook 1920 is configured to retrieve data on behalf of the Software Application 1905 from the CD-ROM file system driver.

In some embodiments, applications available from local boxes within an organization can be specified by a vendor or vendor's agent.

Some present embodiments have been described in connection with computer games. In general, inventions disclosed herein can be applied to other software applications, as well.

Some present embodiments have been described in connection with Windows-type operating systems. In general, inventions disclosed herein can be applied to other operating systems (e.g., operating systems that do not use registry keys), as well.

Some present embodiments have been described in connection with Application Jukebox. In general, serving resources with functionality similar to the functionality of Application Jukebox discussed in corresponding embodiments can be employed instead of Application Jukebox.

In some embodiments, a target device can comprise any device or arrangement of devices on which a user can execute interactive applications.

In some embodiments, DRM can be built into hardware.

In some embodiments, a target rendering device can comprise any device or arrangement of devices on which content can be rendered and a user can execute interactive applications.

In some embodiments, a target rendering device can comprise any device or arrangement of devices which can act as a proxy server.

In some embodiments, a local box can comprise any arrangement of resources performing the functions described herein with respect to local boxes. For example, such functions can executed by one or more physical devices. Local box functions of a single local box can be executed consistently by the same physical device(s), or one or more functions of a local box can be executed by different device(s) at different times. Also, some or all local box functions of multiple local boxes can be executed by a single device.

In some embodiments, applications are downloaded from an ADN cloud to local boxes without streaming.

In some embodiments, a local network can use more than one sync agent.

In some embodiments, protocols other than SOAP/XML based API calls can be used for synchronization.

In some embodiments, a target device can not be able even to see the ADN cloud.

In some embodiments, a target device is any arrangement of resources that can execute software applications and interact with a user.

In some embodiments, data in addition to required data can be delivered to a target device.

In some embodiments, required data can be prioritized for delivery to accelerate availability of particular functionality at a destination target device.

In some embodiments, an application source can not contain the whole of an application, and can instead contain only a portion of an application corresponding to some functions of the application.

In some embodiments, a Partial can be larger or smaller than 5-10% of an application. For example, a Partial can be larger for small applications or applications requiring a large amount of data to be cached for initial execution.

In some embodiments, Partials can contain more than the minimum required pages for initial execution of a game or other application.

In some embodiments, applications can be accessed through portal software or other middleware.

In some embodiments, ones or groups of end users or target devices are restricted to accessing particular ones of the local boxes within a respective local network.

In some embodiments, numbers and details of failover levels can be varied as appropriate with respect to, and based on (for example), a particular ADN cloud's and/or a particular organization's hardware and software details, network topology, or network management requirements.

In some embodiments, some or all storage information can not be displayed to a user of the target device. For example, memory used and whether or not the complete software—or a Partial—is resident in memory can be hidden from a user.

In some embodiments, multiple corresponding game pushers can be capable of pushing Partials (or more) and streaming Bodies onto a given game station.

In some embodiments, a given game pusher can have multiple corresponding game stations that it is capable of pushing Partials (or more) and streaming Bodies onto.

In some embodiments, a game station can have multiple displays and/or multiple controllers attached.

In some embodiments, a pusher can be used to manage Partials for portable environments.

In some embodiments, where there are multiple target devices available in a given location or otherwise disposed for convenient user access, Partials can be managed so that different target devices can fit or partially accommodate different sets of potential user roaming profiles.

In some embodiments, a game station and/or game station memory can also play and/or store games that are not virtualized and/or streamed.

In some embodiments, only games that have not been used within a defined period can be deleted from a target device by automatic library management.

In some embodiments, only games that have been played with less than a defined frequency can be deleted from a target device by automatic library management.

In some embodiments, an automatic library management decision to delete a game from a target device can be made by a local box or other server with push or other write privileges over the target device, or by ADN client software located on the target device.

In some embodiments, an application can begin execution with no pages of the application on the target device; e.g., the application can be selected for execution through a portal program, with application functions made available as corresponding pages are streamed to the target device.

In some embodiments, pages can be delivered when already present on a target device, e.g., to repair an application error or as part of a patch.

In some embodiments, when a particular game is being played on a game station, streaming continues when play of the particular game concludes of pages of the particular game that are not resident on the game station. In some embodiments, when a particular game is being played on a game station, streaming ends when play of the particular game concludes of pages of the particular game that are not resident on the game station.

Some present embodiments have been described in connection with organizations. In general, inventions described herein with respect to organizations can also be applied to any permanent or transient group of target devices or users.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

Additional general background, which helps to show variations and implementations, as well as some features which can be synergistically combined with the inventions claimed below, may be found in the following references, all of which are incorporated herein by reference in their entireties: U.S. Pat. No. 6,453,334, "Method And Apparatus To Allow Remotely Located Computer Programs And/Or Data To Be Accessed On A Local Computer In A Secure, Time-Limited Manner, With Persistent Caching"; U.S. Pat. No. 7,451,196, "Method And System For Executing A Software Application In A Virtual Environment"; U.S. Pat. No. 7,062,567, "Intelligent Network Streaming And Execution System For Conventionally Coded Applications"; U.S. Pat. No. 6,918,113, "Client Installation And Execution System For Streamed Applications"; U.S. Pat. No. 6,959,320, "Client-Side Performance Optimization System For Streamed Applications"; U.S. Pat. No. 7,043,524, "Network Caching System For Streamed Applications"; U.S. Pat. No. 7,096,253, "Method And Apparatus For Streaming Software"; U.S. Pat. No. 7,577,751, "Software Streaming System And Method"; U.S. Pat. No. 5,796,952, "Method and apparatus for tracking client interaction with a network resource and creating client profiles and resource database"; U.S. Pat. No. 7,149,761, "Systems And Method For Managing The Synchronization Of Replicated Version-Managed Databases"; U.S. Pat. No. 7,240,162, "System and Method for Predictive Streaming"; U.S. Pat. No. 5,515,098, "System and method for selectively distributing commercial messages over a communications network"; U.S. Pat. No. 6,216,129, "Advertisement Selection System Supporting Discretionary Target Market Characteristics"; U.S. Pat. No. 7,337,127, "Targeted Marketing System and Method"; U.S. application Ser. No. 10/005,729, "Optimized Server For Streamed Applications"; U.S. application Ser. No. 11/273,862, "Streaming From A Media Device"; U.S. application Ser. No. 11/388,381, "System And Method For Tracking Changes To Files In Streaming Applications"; U.S. application Ser. No. 11/453,301, "Intelligent Network Streaming And Execution System For Conventionally Coded Applications"; U.S. application Ser. No. 11/977,187, "Rule-Based Application Access Management"; U.S. application Ser. No. 12/062,766, "Deriving Component Statistics For A Stream Enabled Application"; U.S. application Ser. No. 12/062,789, "Opportunistic Block Transmission With Time Constraints"; U.S. application Ser. No. 12/509,210, "Software Streaming System And Method"; U.S. Prov. App. No. 61/480,333, "Adaptive Application Streaming In Cloud Gaming"; U.S. Prov. App. No. 61/505,826, "Application Distribution Network"; U.S. Prov. App. No. 61/600,390, "Application Scan and Redelivery"; U.S. Prov. App. No. 61/602,069, "Application Scan and Redelivery"; and U.S. Prov. App. No. 61/609,941, "Application Distribution Network".

The following additional literature is also incorporated herein by reference: Application Jukebox User Guide v 8.3 by Endeavors Technologies Inc.; Application Jukebox Server Administration Guide v 8.2 by Endeavors Technologies Inc.; Software2 Reporting Interface for Application Jukebox; Magento User Guide, Community Edition v 1.6, Magento Inc.; and all public information disclosed, as of Apr. 26, 2012, on the websites of Onlive, Inc., Gaikai Inc., and Otoy, Inc.

The claims as filed are intended to be as comprehensive as possible, and NO subject matter is intentionally relinquished, dedicated, or abandoned.

What is claimed is:

1. A method for providing a remote gaming service, comprising the actions of:
   when a user selects a particular game from available games on a game station at a target device,
   a) executing software corresponding to said particular game at the target device, said particular game being virtualized by being initially playable without download of the entire particular game at the target device immediately following said selecting; and
   if said particular game comprises additional components for use in continued execution of the particular game and absent from the target device,
   b) streaming over a network to said game station at least one of said additional components, said streaming beginning contemporaneously with and continuing at least partially concurrently with said executing of the particular game at the target device, the at least one of said additional components streamed to the game station from a local portal residing on local devices or, if the local portal fails, an application delivery network application server implemented remote from the target device in a wide area network, the local portal regulating license provisioning of streaming virtualized applications including the particular game executing at a plurality of game stations including the game station and providing the at least one of said additional components to the game station at the target device, wherein a local device of the local devices to stream the at least one of said additional components is selected from the local devices according to load weights of the local devices in streaming virtualized games, the load weights based on a number of active sessions of the local devices in a running state for streaming the virtualized games and in a buffering state for streaming the virtualized games.

2. The method of claim 1, wherein ones of said additional components are immediately executable once they are streamed to said game station.

3. The method of claim 1, wherein said software corresponding to said particular game is a pre-virtualized packaged version of said particular game.

4. The method of claim 1, wherein additional components may be elected by the user to be streamed to said game station.

5. The method of claim 1, wherein at least one choice made during play of said particular game causes streaming of at least one additional component of said particular game or of optional additional content of said particular game.

6. The method of claim 1, wherein playability of said particular game or said additional components depends at least partially on availability and details of applicable permissions.

7. A system comprising:
   at least one processor;
   memory storing instructions configured to cause the at least one processor to perform:
      when a user selects a particular game from available games on a game station at a target device,
      a) executing software corresponding to said particular game at the target device, said particular game being virtualized by being initially playable without download of the entire particular game at the target device immediately following said selecting; and
      if said particular game comprises additional components for use in continued execution of the game and absent from the target device,
      b) streaming over a network to said game station at least one of said additional components, said streaming beginning contemporaneously with and continuing at least partially concurrently with said executing of the particular game at the target device, the at least one of said additional components streamed to the game station from a local portal residing on local devices or, if the local portal fails, an application delivery network application server implemented remote from the target device in a wide area network, the local portal regulating license provisioning of streaming virtualized applications including the particular game executing at a plurality of game stations including the game station and providing the at least one of said additional components to the game station at the target device, wherein a local device of the local devices to stream the at least one of said additional components is selected from the local devices according to load weights of the local devices in streaming virtualized games, the load weights based on a number of active sessions of the local devices in a running state for streaming the virtualized games and in a buffering state for streaming the virtualized games.

8. A method for managing remote gaming, comprising the actions of:
   using at least one game pusher to push software over a network to a game station at a target device, said software corresponding to games chosen to be available for play on said game station, said software being virtualized by being initially playable without download of the entire games at the target device immediately after selection using said game station, said game station being physically separated from said game pusher; and
   when a user selects a particular game for play, if said particular game requires additional components to provide aspects of said particular game available to the user upon selection but said additional components are absent from the target device,
   using said game pusher to control streaming to said game station of said additional components, said streaming beginning contemporaneously with said selection and continuing at least partially concurrently with said play of the particular game, said additional components streamed to the game station from a local portal residing on local devices or, if the local portal fails, an application delivery network application server implemented remote from the target device in a wide area network, the local portal regulating license provisioning of streaming virtualized applications including the particular game executing at a plurality of game stations including the game station and providing the at least one of said additional components to the game station at the target device, wherein a local device of the local devices to stream said additional components is selected from the local devices according to load weights of the local devices in streaming virtualized games, the load weights based on a number of active sessions of the local devices in a running state for streaming the virtualized games and in a buffering state for streaming the virtualized games.

9. The method of claim 8, wherein at least one choice made during play of said particular game causes streaming of at least one additional component of said particular game or of optional additional content of said particular game.

10. The method of claim 8, further comprising controlling, without explicit user designation, creation and update of a list of games available for play on said game station.

11. A remote game push control system, comprising:
a) a plurality of software-implemented games, at least one of said games comprising an immediately initially playable portion and at least one additional component separately transmissible from said portion, said at least one additional component being integral to extended play of corresponding ones of said games; and
b) at least one game pusher which:
pushes portions of at least one of said games over a network to a game station at a target device, said portions of said games including at least said immediately initially playable portions, said game station being physically separated from said game pusher;
when a particular game is selected to be played on said game station, if respective components corresponding to said particular game are absent from the target device, streams, concurrently, with the playing of the particular game, at least one of said respective components to said game station, the at least one of said respective components streamed to the game station from a local portal residing on local devices or, if the local portal fails, an application delivery network application server implemented remote from the target device in a wide area network, the local portal regulating license provisioning of streaming virtualized applications including the particular game executing at a plurality of game stations including the game station and providing the at least one of said respective components to the game station at the target device, wherein a local device of the local devices to stream the at least one of said respective components is selected from the local devices according to load weights of the local devices in streaming virtualized games, the load weights based on a number of active sessions of the local devices in a running state for streaming the virtualized games and in a buffering state for streaming the virtualized games.

\* \* \* \* \*